(12) United States Patent
Bierenbaum

(10) Patent No.: US 6,970,844 B1
(45) Date of Patent: Nov. 29, 2005

(54) FLOW DESIGNER FOR ESTABLISHING AND MAINTAINING ASSIGNMENT AND STRATEGY PROCESS MAPS

(75) Inventor: Steven E. Bierenbaum, Winter Park, FL (US)

(73) Assignee: Computer Sciences Corporation, Austin, TX (US)

(*) Notice: Subject to any disclaimer, the term of this patent is extended or adjusted under 35 U.S.C. 154(b) by 288 days.

(21) Appl. No.: 09/648,247

(22) Filed: Aug. 25, 2000

Related U.S. Application Data

(60) Provisional application No. 60/151,031, filed on Aug. 27, 1999.

(51) Int. Cl.[7] .............................................. G06F 17/00
(52) U.S. Cl. ..................... 705/39; 707/104.1; 707/100; 707/103
(58) Field of Search ........................... 717/108, 2, 137, 717/3, 7; 714/100; 705/39; 707/103, 101, 707/113, 104, 100, 104.1, 7; 709/100, 303

(56) References Cited

U.S. PATENT DOCUMENTS

| | | | |
|---|---|---|---|
| 4,878,167 A | 10/1989 | Kapulka et al. | |
| 5,099,422 A | 3/1992 | Foresman et al. | |
| 5,191,522 A | 3/1993 | Bosco et al. | |
| 5,201,044 A | 4/1993 | Frey, Jr. et al. | |
| 5,233,513 A * | 8/1993 | Doyle ........................ | 354/401 |
| 5,386,566 A | 1/1995 | Hamanaka et al. | |
| 5,394,555 A | 2/1995 | Hunter et al. | |
| 5,434,994 A | 7/1995 | Shaheen et al. | |
| 5,455,947 A | 10/1995 | Suzuki et al. | |
| 5,483,632 A | 1/1996 | Kuwamoto et al. | |
| 5,499,330 A | 3/1996 | Lucas et al. | |

(Continued)

FOREIGN PATENT DOCUMENTS

EP  0 280 773  9/1988

(Continued)

OTHER PUBLICATIONS

IBM Technical Disclosure Bulletin; vol. 40 Title: Hierarchical Data Model For a Relational Database Based. Mar. 1, 1997.*

(Continued)

*Primary Examiner*—Elisca Pierre Eddy
(74) *Attorney, Agent, or Firm*—Meyertons, Hood, Kivlin, Kowert & Goetzel, P.C.; Eric B. Meyertons

(57) ABSTRACT

A system, method and carrier medium for modeling a Financial Service Organization (FSO) business in a computer software program and for storing the model of the FSO business in a database. An object-oriented business model representing the FSO may be created and stored in a business model database. The one or more business objects included in the business model may be configured to describe various products, methods, functions and properties associated with an FSO. A process map business object may describe a process workflow. The process workflow may identify a sequence of tasks to be performed by an FSO production system to process an FSO transaction. The sequence of tasks associated with an FSO transaction may be consistent with pre-defined business logic for the transaction. Selecting a task object from a plurality of task objects and transferring the task object to a process map display representing the process map business object may create the process workflow. Additional task objects may be transferred and connected to the transferred task objects in a manner consistent with the business logic. An FSO production system, which may be configured to process FSO transactions, may access the database to request data associated with a particular FSO transaction. On receiving the requested data from the business model database, the FSO production system may complete the processing of the FSO transaction.

32 Claims, 28 Drawing Sheets

U.S. PATENT DOCUMENTS

| | | | |
|---|---|---|---|
| 5,504,674 | A | 4/1996 | Chen et al. |
| 5,523,942 | A | 6/1996 | Tyler et al. |
| 5,530,861 | A | 6/1996 | Diamant et al. |
| 5,550,976 | A | 8/1996 | Henderson et al. |
| 5,586,310 | A | 12/1996 | Sharman |
| 5,630,069 | A | 5/1997 | Flores et al. |
| 5,638,508 | A | 6/1997 | Kanai et al. |
| 5,689,706 | A | 11/1997 | Rao et al. |
| 5,699,527 | A | 12/1997 | Davidson |
| 5,734,837 | A | 3/1998 | Flores et al. |
| 5,745,901 | A | 4/1998 | Entner et al. |
| 5,764,989 | A | 6/1998 | Gustafsson et al. |
| 5,768,505 | A | 6/1998 | Gilchrist et al. |
| 5,768,506 | A | 6/1998 | Randell |
| 5,797,134 | A | 8/1998 | McMillan et al. |
| 5,832,481 | A | 11/1998 | Sheffield |
| 5,870,711 | A | 2/1999 | Huffman |
| 5,873,066 | A | 2/1999 | Underwood et al. |
| 5,878,403 | A | 3/1999 | DeFrancesco et al. |
| 5,900,870 | A | 5/1999 | Malone et al. |
| 5,907,848 | A | 5/1999 | Zaiken et al. |
| 5,928,082 | A | 7/1999 | Clapper, Jr. |
| 5,930,759 | A | 7/1999 | Moore et al. |
| 5,930,776 | A | 7/1999 | Dykstra et al. |
| 5,933,816 | A | 8/1999 | Zeanah et al. |
| 5,937,189 | A | 8/1999 | Branson et al. |
| 5,950,169 | A | 9/1999 | Borghesi et al. |
| 5,987,434 | A | 11/1999 | Libman |
| 5,991,733 | A | 11/1999 | Aleia et al. |
| 6,023,572 | A | 2/2000 | Lautzenheiser et al. |
| 6,023,578 | A | 2/2000 | Birsan et al. |
| 6,035,300 | A * | 3/2000 | Cason et al. ............... 707/102 |
| 6,038,393 | A | 3/2000 | Iyengar et al. |
| 6,049,665 | A | 4/2000 | Branson et al. |
| 6,061,057 | A | 5/2000 | Knowlton et al. |
| 6,064,983 | A | 5/2000 | Koehler |
| 6,081,832 | A | 6/2000 | Gilchrist et al. |
| 6,092,049 | A | 7/2000 | Chislenko et al. |
| 6,101,481 | A | 8/2000 | Miller |
| 6,105,007 | A | 8/2000 | Norris |
| 6,115,690 | A | 9/2000 | Wong |
| 6,119,103 | A | 9/2000 | Basch et al. |
| 6,122,627 | A | 9/2000 | Carey et al. |
| 6,134,582 | A | 10/2000 | Kennedy |
| 6,134,706 | A | 10/2000 | Carey et al. |
| 6,163,770 | A | 12/2000 | Gamble et al. |
| 6,167,564 | A | 12/2000 | Fontana et al. |
| 6,185,540 | B1 | 2/2001 | Schreitmueller et al. |
| 6,226,623 | B1 | 5/2001 | Schein et al. |
| 6,236,975 | B1 | 5/2001 | Boe et al. |
| 6,336,096 | B1 | 1/2002 | Jernberg |
| 6,347,307 | B1 | 2/2002 | Sandhu et al. |
| 6,381,640 | B1 | 4/2002 | Beck et al. |
| 6,434,590 | B1 | 8/2002 | Blelloch et al. |
| 6,505,176 | B2 | 1/2003 | DeFrancesco, Jr. et al. |
| 6,591,300 | B1 | 7/2003 | Yurkovic |
| 6,601,034 | B1 | 7/2003 | Honarvar et al. |
| 6,604,114 | B1 | 8/2003 | Toong et al. |

FOREIGN PATENT DOCUMENTS

| | | | |
|---|---|---|---|
| EP | 0 465 018 | 1/1992 | |
| EP | 0 926 608 | 6/1999 | |
| JP | 9237181 | 9/1997 | |
| JP | 09237181 A * | 9/1997 | ............. G06F 9/06 |

OTHER PUBLICATIONS

"@ Fault A Commitment to Consistency," Computer Sciences Corporation, Copyright 2000, pp. 1-2.

Mead, Jay, Technical Communication, Aug. 1998, V. 45, N.3, p. 353-380.

Scopus Introduces World's Most Complete Call Center Solution for Financial Services; PR Newswire dated Nov. 5, 1997.

Juhl, Randy P., "The OTC Revolution"; Drugtopics.com; Mar. 3, 1997, pp. 1-9.

Borland, Russel; "Running Microsoft Outlook 97", Microsoft Press, 1997.

Deitel & Deitel, C++ How to Program, 1998, Prentice Hall.

Fabrik A Visual Programming Environment, 1998, ACM Inc.

Introduction to Visual Basic 5.0 Programming, Last Updated 1999, printed from http://www.dcs.napier.ac.uk/hci/VB50/home.html.

Programmer's Guide Microsoft Visual Basic, 1992, Microsoft.

"Enterprise Customer Acquisition: CSC Assessment Solutions" CSC Brochure, 1998.

Basic Aspect Of Squeak And The Smalltalk-80 Programming Language, Jun. 22, 1998.

Corrano, Helman, Veroff, Data Abstraction And Problem Solving With C++, 1998 Addison Wesley Longman, Inc.

Scopus and Entrust Technologies to Deliver World's First Secure Customer Care Solution for the Financial Services Market; PR Newswire dated Nov. 5, 1997.

Office Action in U.S. Appl. No. 09/648,929 mailed Jan. 31, 2003.

Office Action in U.S. Appl. No. 09/648,929 mailed Sep. 9, 2003.

Office Action in U.S. Appl. No. 09/648,929 mailed Apr. 16, 2004.

Office Action in U.S. Appl. No. 09/648,912 mailed May 18, 2004.

Office Action in U.S. Appl. No. 09/648,912 mailed Oct. 7, 2003.

Steyer, "The World Bank's Open Network", Datamation, v.36, n4, p109(3), Feb. 15, 1990, ISSN: 1062-8363 (4 pages).

U.S. Patent and Trademark Office, "Office Action" for U.S. Appl. No. 09/648,929 mailed Oct. 26, 2004 (20 pages).

Continuum Connections, vol. I, No. 1, The Continuum Company, Inc., Nov. 1991.

Continuum Connections, vol. I, No. 2, The Continuum Company, Inc., Jan./Feb. 1992.

Continuum Connections, vol. I, No. 3, The Continuum Company, Inc., Mar./Apr. 1992.

Continuum Connections, vol. I, No. 4, The Continuum Company, Inc., Jul./Aug. 1992.

Continuum Connections, vol. II, No. 1, The Continuum Company, Inc., Oct./Nov. 1992.

Continuum Connections, vol. II, No. 2, The Continuum Company, Inc., Dec./Jan. 1993.

Continuum Connections, vol. II, No. 3, The Continuum Company, Inc., Mar./Apr. 1993.

Continuum Connections, vol. II, No. 4, The Continuum Company, Inc., Jul./Aug. 1993.

Continuum Connections, vol. II, No. 5, The Continuum Company, Inc., Nov./Dec. 1993.

Continuum Connections, vol. II, No. 6, The Continuum Company, Inc., Jan./Feb. 1994.

Continuum Connections, vol. III, No. 1, The Continuum Company, Inc., Mar./Apr. 1994.

Continuum Connections, vol. III, No. 2, The Continuum Company, Inc., Nov./Dec. 1994.

Continuum Connections, vol. III, No. 3, The Continuum Company, Inc., Mar./Apr. 1995.

Continuum Connections to the Americas, vol. 1, No. 1, The Continuum Company, Inc., Sep. 1995.
Continuum Connections, vol. III, No. 4, The Continuum Company, Inc., Oct./Nov. 1995.
Continuum Connections to the Americas, vol. II, No. 1, The Continuum Company, Inc., Jan. 1996.
Continuum Connections to the Americas, vol. II, No. 2, The Continuum Company, Inc., Mar. 1996.
Continuum Connections to the Americas, vol. II, No. 3, The Continuum Company, Inc., May 1996.
Continuum Connections to the Americas, vol. II, No. 4, The Continuum Company, Inc., Jul. 1996.
Continuum Connections to the Americas, vol. II, No. 5, The Continuum Company, Inc., Sep. 1996.
Connections to the Americas, vol. III, No. 1, CSC Continuum, Jan. 1997.
Connections to the Americas, vol. III, No. 2, CSC Continuum, Feb. 1997.
Connections to the Americas, vol. III, No. 3, CSC Continuum, Mar. 1997.
Connections to the Americas, vol. III, No. 4, CSC Continuum, Apr. 1997.
Connections to the Americas, vol. III, No. 5, Computer Sciences Corporation, May/Jun. 1997.
Connections to the Americas, vol. III, No. 6, Computer Sciences Corporation, Jul./Aug. 1997.
Connections to the Americas, vol. III, No. 7, Computer Sciences Corporation, Sep./Oct. 1997.
Connections to the Americas, vol. 4, No. 1, Computer Sciences Corporation, Jan. 1998.
Connections to the Americas, vol. 4, No. 2, Computer Sciences Corporation, Feb./Mar. 1998.
Connections to the Americas, vol. 4, No. 3, Computer Sciences Corporation, May/Jun. 1998.
Connections to the Americas, vol. 4, No. 4, Computer Sciences Corporation, Sep./Oct. 1998.
Insurance Connections, Computer Sciences Corporation, Feb./Mar. 1999.
Banking Connections, Computer Sciences Corporation, Apr./May 1999.
Insurance Connections, Computer Sciences Corporation, Jun./Jul. 1999.
Banking Connections, Computer Sciences Corporation, Aug./Sep. 1999.
Insurance Connections, Computer Sciences Corporation, Oct./Nov. 1999.
Cost Containment: Products and Solutions for the Property and Casualty Insurance Industry, Computer Sciences Corporation, Oct. 1999.
Banking Connections, Computer Sciences Corporation, Dec. 1999.
Insurance Connections, Computer Sciences Corporation, Feb./Mar. 2000.
Banking Connections, Computer Sciences Corporation, Apr./May 2000.
Insurance Connections, Computer Sciences Corporation, Jun./Jul. 2000.
Insurance Connections, Computer Sciences Corporation, Sep./Oct. 2000.
Banking Connections, Computer Sciences Corporation, Nov./Dec. 2000.

* cited by examiner

FLOW DESIGNER FOR ESTABLISHING AND MAINTAINING ASSIGNMENT AND STRATEGY PROCESS MAPS

PRIORITY CLAIM

This application claims the benefit of U.S. Provisional Application No. 60/151,031 entitled "Flow Designer For Establishing And Maintaining Assignment And Strategy Process Maps," filed Aug. 27, 1999.

BACKGROUND OF THE INVENTION

1. Field of the Invention

The present invention generally relates to computer software programs to be used in Financial Service Organizations. More particularly, the present invention relates to a system for modeling a Financial Service Organization (FSO) production system for processing FSO transactions.

2. Description of the Related Art

FSOs such as banks, credit unions, insurance companies, mutual fund companies, credit card companies, brokerage houses, etc., market many types of financial products to their customers, such as savings accounts, brokerage accounts, commercial loans, mortgage loans, auto loans, personal loans, and credit cards. To acquire a credit product, for example, a customer of a FSO is typically required to submit an application for the credit product. The FSO then follows an application processing procedure for the credit product to determine whether the application is approved or rejected.

The application procedure includes such steps as gathering financial related information of the customer applying for the credit product, requesting credit reports on the customer, and examining and scoring the credit product application to see if the customer's credit a product application is to be approved or rejected. This application procedure is typically referred to as account acquisition.

Another function of a FSO is the management of existing FSO credit products. Part of this function is tracking the status of a customer's credit products such as loans and credit cards to determine if the customer's payments on a credit product or products are delinquent. If the customer is delinquent in payments to a credit product for more than a certain period of time, typically 30 days, the customer may be submitted to a collections process in an attempt to resolve the customer's delinquency status. The collections process may involve many steps, such as an FSO representative calling the customer, sending delinquency notices to the customer, contacting an attorney or collections agency for funds collection, or repossession of property used to secure the credit product. The process of attempting to resolve delinquent customer accounts may be called account collections.

Account acquisition and account collections computer software programs are used in FSOs to implement account acquisition and account collection. These software programs are typically executed on mainframe-based computer systems. Collectively, these software programs executing on mainframe-based computer systems may be referred to as customer credit systems. Being mainframe-based, customer credit systems are centralized, typically with a mainframe computer including the software and databases located at a central computing center, and user workstations for accessing the software and databases distributed among local and remote offices. These workstations are typically computer terminals, or in some cases microcomputers running terminal emulation software. Mainframe-based customer credit systems are not easily scalable. If the demands on a mainframe-based customer credit system outgrow the processing, storage, or workstation support capacity of the mainframe computer, the only recourse may be to replace the existing mainframe with a new, more powerful mainframe. As mainframe systems cost from the hundreds of thousands to millions of dollars, upgrading can be very expensive. Further, downtime associated with the rollover to a new system with a larger mainframe may be disruptive to the account acquisition and account collection operations of the FSO.

Data such as credit product applications may be entered into existing customer credit systems by file access. File access involves copying files into the mainframe computer's memory or disk storage for processing by the customer credit system software. The formats of files to be read into the customer credit system are hard-coded into the system. As used herein, "hard-coded" indicates behavior that is inserted directly into a program, where it cannot be easily modified without the intervention of a computer programmer to make code changes, re-compile, and test the changes. Thus, all files copied into the mainframe for processing by the system must be in a fixed, correct format. Data may also be entered at a workstation by filling in fields on a computer screen presented on the workstation by the customer credit system. An example of data entered at a workstation is a loan application. The format and contents of an application displayed on a workstation, including titles and labels on fields, are hard-coded in the customer credit system.

Some FSO customer credit systems for implementing account acquisition and collection are static in that each customer application for product or each customer with a delinquent account is processed the same regardless of whether the customer is a new customer or an existing customer or whether the customer has an extensive and good credit history. Static account acquisition processes follow a preprogrammed, linear, fixed series of steps for all customers applying for the loan. For example, a long-term customer of a bank may apply for a credit card. The bank's customer credit system follows a fixed series of steps for all customers applying for the credit card, the first step of which is to request a full credit report from an external agency. The bank may have to pay for the credit report. If the customer has a large savings account, maintains a significant balance in a checking account, has little outstanding debt with the bank, and has a spotless credit history with the bank, it may not be necessary to request a credit report from an external agency before approving the credit card. However, since all customers are processed the same, a credit report will be requested for the customer. The same is true for the collections process. All customers entered into an account collections process in a customer credit system follow a preprogrammed, linear, fixed series of steps attempting to resolve a delinquency status.

The fixed linear hierarchy of steps in existing customer credit systems often result in redundant data entry. For example, one or more steps in the process may be to get a customer's credit history. Notwithstanding the existence of this data in the FSO's customer database, one or more of the steps require access to an external source to retrieve the same information.

Processing steps are programmed into existing customer credit system's software during the system's development. Data such as values used in approving or declining a credit product applications, time limits in the collections process, and screen formats to be presented at workstations are hard-coded into the software during the system's development. This makes customer credit systems inflexible and difficult to modify, limiting the adaptability of the systems to changing business environments. The process to modify a customer credit system typically requires the following steps: officers of the FSO determining the changes to be made to the system; communicating the changes to the Information Technology department of the FSO; systems analysts in the Information Technology department creating software design and specification documents; a team of software engineers modifying and compiling source code based upon the design and specification documents; database analysts modifying databases to meet the new specifications; testing and verification of the modified system, and; operations personnel replacing the customer credit system production system. This modification process is time-consuming and expensive, and may take months or even years to complete. Some desired changes may be lost or modified in the process of transferring the desired changes from business officers to source code changes. Business requirements may change during the modification process, requiring either a delay in the modification process so that new requirements can be added, or starting a new modification process overlapping the modification process in progress.

Existing customer credit systems are mainframe-based and are therefore not easily scalable. It is therefore desirable to provide a customer credit system that is easily scalable to meet increased processing demands in an FSO. Modifying existing customer credit systems to meet changing business needs is a long process requiring many steps, including code changes by programmers that may have limited business knowledge in the customer credit marketplace. It is therefore desirable to provide a customer credit system that may be modified quickly and easily by business officers that understand the customer credit marketplace and know what changes need to be made to address changes in the marketplace. All customers are treated the same in an existing customer credit system, regardless of the customers' current or previous history with the FSO. It is therefore desirable to provide a customer-centric customer credit system that may be tailored to handle customer transactions dynamically, allowing different customer credit strategies to be applied to customers with distinctly different credit profiles.

Current customer credit system software is designed in one step on paper and later implemented in computer programming languages. This makes it difficult to visualize the credit product processing actually implemented in the customer credit system software. It is therefore desirable to provide an integrated, graphical design and implementation process to better visualize and understand the credit product processing implemented in the system. Current customer credit system software also does not provide a way to model the business structure of a FSO. It is therefore desirable to provide a modeling tool for describing the business structure of a FSO, and for describing the credit product processing relationships among the organizational units in the FSO. It is also desirable to provide a method for adapting a customer credit system to a variety of credit products, including developing custom documents such as product applications and correspondence and developing custom product processing strategies, without a lengthy design and coding process.

The following is hereby incorporated by reference: Method for performing operations on informational objects by visually applying the processes defined in utility objects in an IT (information technology) architecture visual model (U.S. Pat. No. 6,091,893), System and method for providing a high level language for mapping and accessing objects in data stores (U.S. Pat. No. 6,061,515), Goal based tutoring system with behavior to control flow of presentation (U.S. Pat. No. 6,023,692), and Decentralized distributed asynchronous object oriented system and method for electronic data management, storage, and communication (U.S. Pat. No. 5,550,976).

SUMMARY OF THE INVENTION

A system, method and carrier medium for modeling a Financial Service Organization (FSO) business in a computer software program and for storing the model of the FSO business in a database. In one embodiment, an object-oriented business model representing the FSO may be created and stored in a business model database. The one or more business objects included in the business model may be configured to describe various products, methods, functions and properties associated with the FSO.

In one embodiment, a process map business object may describe a process workflow. The process workflow may identify a sequence of tasks to be performed by an FSO production system to process an FSO transaction. The sequence of tasks associated with an FSO transaction may be consistent with pre-defined business logic for the transaction. Selecting a task object from a plurality of task objects and transferring the task object to a process map display representing the process map business object may create the process workflow. Additional task objects may be transferred and connected to the transferred task objects in a manner consistent with the business logic. An FSO production system, which may be configured to process FSO transactions, may access the database to request data associated with a particular FSO transaction. On receiving the requested data from the business model database, the FSO production system may complete the processing of the FSO transaction.

In one embodiment, the business modeler program executing on a computer system may provide a graphical user interface that may allow a user of the program to define business model objects. In one embodiment, the business objects may be represented by icons on a display screen. A business model object may be defined by one or more properties that describe the object and its relationship to other objects. Objects may be created within, or as children of, other objects. An object including a child object may be referred to as a parent of the child object. A child object may inherit properties from its parent object if the parent object is of the same object type as the child object. Objects may also reference other objects effective to access properties of referenced objects. An object may also be able to prevent other objects from referencing the object and from referencing children of the object.

In one embodiment, a method may be provided for displaying and modifying an object's properties on an object property display screen. Types of business model objects may include, but are not limited to, objects that represent organizational units of the FSO, processing tasks to be performed on business product transactions, data elements, collections of data elements in data dictionaries, document templates, business product transaction processing flow maps, credit products such as credit cards, external interfaces, users, queues, and job seats.

In one embodiment, a method may be provided for displaying business model objects in a representation of the inheritance, or parent-child, relationship among the objects. In one embodiment, the business model objects may be displayed in a hierarchical tree structure, with the highest-level parent object displayed as an icon at the top of the tree.

Object names may be listed to the right of the object icons. The object icons may be connected by lines to represent the branching of the tree. A parent object's icon may be expanded to show the child objects of the parent object, or collapsed to hide the child objects of the parent object. In one embodiment, an icon for expanding and collapsing an object may be disposed to the left of the object.

In one embodiment, a method may also be provided for displaying organizational unit objects in a business relationship that shows the reporting structure of the modeled FSO. In one embodiment, the business model objects may be displayed in a hierarchical tree structure, with the highest-level organizational unit object displayed as an icon at the top of the tree. Object names may be listed to the right of the object icons. The object icons may be connected by lines to represent the branching of the tree. A parent organizational unit object's icon may be expanded to show the child objects of the parent object, or collapsed to hide the child objects of the parent object. In one embodiment, an icon for expanding and collapsing an organizational unit object may be disposed to the left of the object.

In one embodiment, one or more menus may be provided with menu selections for performing operations on objects, such as creating new objects, deleting objects, expanding objects, collapsing objects, and displaying object properties. In some embodiments, toolbars may be provided with icons for performing similar tasks as those performed by the menu items.

In one embodiment, a method may be provided for creating document template objects. In one embodiment, the method may include a graphical interface that allows icons representing business model objects such as data elements to be dragged and dropped onto a document template and to be positioned on the template where the objects will appear on the document in a production system.

In one embodiment, a process map business object may describe a process workflow. The process workflow may identify a sequence of tasks to be performed by an FSO production system to process an FSO transaction. The sequence of tasks associated with an FSO transaction may be consistent with pre-defined business logic for the transaction. In one embodiment, a method may also be provided for creating process map objects, including assignment maps configured to route a business product transaction to one of several processing strategy maps or to other organizational units, and also including strategy maps configured to process FSO transactions. For example, the strategy map objects may be configured to apply a custom credit product processing strategy to a business product transaction or to post the business product transaction to a queue for manual processing. In one embodiment, the method may include creating processing task objects, using a modeler object configuration program in one embodiment, configured to perform a series of processing steps such as data gathering, calculations, and decisions on business product transactions.

In one embodiment, the method may also include adding processing task objects to a processing map and connecting the processing task objects in a processing flow hierarchy. In one embodiment, the method may include a graphical interface to allow icons representing processing task objects to be dragged and dropped onto a processing map display template, representing a processing task workflow object, and to be graphically connected in a business product transaction processing task workflow order. In one embodiment, selecting a task object from a plurality of task objects and transferring the task object to a process map display representing the process map business object may create the process workflow. Additional task objects may be transferred and connected to the transferred task objects in a manner consistent with the business logic. An FSO production system, which may be configured to process FSO transactions, may access the database to request data associated with a particular FSO transaction. On receiving the requested data from the business model database, the FSO production system may complete the processing of the FSO transaction.

Figure 1A:
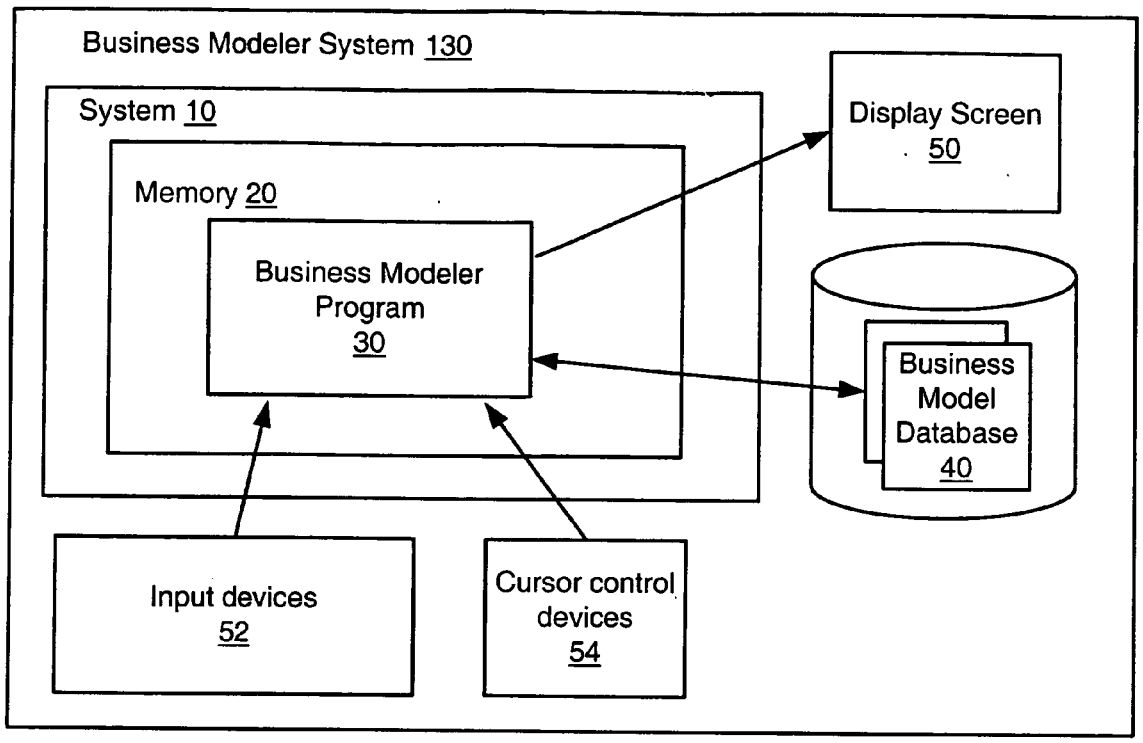
FIG. 1a is a block diagram illustrating the architecture of one embodiment of a business modeler system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION OF THE DRAWINGS

The term "computer system" as used herein generally describes the hardware and software components that in combination allow the execution of computer programs. The computer programs may be implemented in software, hardware, or a combination of software and hardware. A computer system's hardware generally includes a processor, memory media, and input/output (I/O) devices. As used herein, the term "processor" generally describes the logic circuitry that responds to and processes the basic instructions that operate a computer system. The term "memory medium" includes an installation medium, e.g., a CD-ROM, or floppy disks; a volatile computer system memory such as DRAM, SRAM, EDO RAM, Rambus RAM, etc.; or a non-volatile memory such as optical storage or a magnetic medium, e.g., a hard drive. The term "memory" is used synonymously with "memory medium" herein. The memory medium may comprise other types of memory or combinations thereof. In addition, the memory medium may be located in a first computer in which the programs are executed, or may be located in a second computer which connects to the first computer over a network. In the latter instance, the second computer provides the program instructions to the first computer for execution. In addition, the computer system may take various forms, including a personal computer system, mainframe computer system, workstation, network appliance, Internet appliance, personal digital assistant (PDA), television system or other device. In general, the term "computer system" can be broadly defined to encompass any device having a processor that executes instructions from a memory medium.

The memory medium preferably stores a software program or programs for defining an object-oriented process map which describes a process workflow sequence associated with processing a transaction and storing the object-oriented process map in a database which may be accessed by a production Financial Service Organization (FSO) production system as described herein. The software program (s) may be implemented in any of various ways, including procedure-based techniques, component-based techniques, and/or object-oriented techniques, among others. For example, the software program may be implemented using ActiveX controls, C++ objects, JavaBeans, Microsoft Foundation Classes (MFC), or other technologies or methodologies, as desired. A CPU, such as the host CPU, executing code and data from the memory medium includes a means for creating and executing the software program or programs according to the methods, flowcharts, and/or block diagrams described below.

A computer system's software generally includes at least one operating system such as Windows NT available from Microsoft Corporation, a specialized software program that manages and provides services to other software programs on the computer system. Software may also include one or more programs to perform various tasks on the computer system and various forms of data to be used by the operating system or other programs on the computer system. The data may include but are not limited to databases, text files, and graphics files. A computer system's software generally is stored in non-volatile memory or on an installation medium. A program may be copied into a volatile memory when running on the computer system. Data may be read into volatile memory as the data is required by a program.

A server program may be defined as a computer program that, when executed, provides services to other computer programs executing in the same or other computer systems. The computer system on which a server program is executing may be referred to as a server, though it may contain a number of server and client programs. In the client/server model, a server program awaits and fulfills requests from client programs in the same or other computer systems. An example of a computer program that may serve as a server is Windows NT server, available from Microsoft Corporation.

As used herein, production build scripts may include DDL and DML scripts. A Data Definition Language (DDL) script is a file including a list of statements for physically changing the structure, including the database definition, tables, schema, and index structure, of a database. For a new database, a DDL script may generate the database definition, tables, and schema. A Data Manipulation Language (DML) script is a file including a list of statements for changing the data values stored in a database. The statements in DDL and DML scripts may be implemented in a database programming language for getting information from and updating a database, for example, Structured Query Language (SQL). Scripts may be automatically created or manually created and edited. A script may be executed by a database administrator from a database management program. The database administrator may select a script, select a target database, and execute the script. As a script is executing, the database changes specified by each statement are applied to the selected database. A script may be executed on a database when the database is online, or being accessed by one or more users or processes, or when the database is offline, or not being accessed by any users or processes.

As used herein, display and printing templates may include files containing programming instructions for displaying documents on computer screens, outputting documents to printers, and sending documents on other delivery channels. Display and printing templates may be implemented in a programming language specifically designed for configuring delivery channels such as computer display screens and printers. An example of a commonly used programming language for configuring data delivery channels is Hypertext Markup Language (HTML). Specialized programming languages may be used for hardcopy output delivery channels such as printers. These specialized languages may be configurable to efficiently support batch output of large quantities of documents, such as mass mailings of letters.

As used herein, a Financial Service Organization (FSO) is a business organization that provides credit products, such as loans and credit cards, to customers. Examples of FSOs include, but are not limited to, banks and credit unions. An FSO may include one or more organizational units. Examples of organizational units include, but are not limited to, main offices, divisions, regional offices, and branch offices.

As used herein, an FSO business product transaction may be defined as a service of an FSO. Examples of business product transactions include, but are not limited to, financial transactions such as deposits, withdrawals, loan application servicing, and credit card application servicing. Business product transactions may also include services related to previously issued financial products such as loans and credit cards. The services may include collection of payments, including delinquent payments, by the financial institution or an agent thereof from a customer who previously obtained a financial product.

As used herein, an FSO production system is a series of instructions executed by a computer system for processing an FSO's business product transactions. A production system may include multiple processing tasks. As used herein, a processing task may be defined as a sequence of one or more atomic transactions, or processing steps, associated with the business product transaction to be processed by the production system. As used herein, an atomic transaction may be defined as a sequence of information exchange and related work that is treated as a unit for the purposes of satisfying a production system business product transaction request and for ensuring data integrity in the production system. Examples of atomic transactions may include reading a value from a database, updating a field in a database, and filling in a field on a form on a computer screen.

As used herein, an FSO business modeler is a computer system configured to allow an officer of the FSO who is not necessarily an information technology professional to graphically or otherwise create a business model of the FSO which may then be implemented in a production system. A business model may be defined as a computer representation of a transaction processing system for executing the business logic of an FSO's account acquisition and account collections functions. To facilitate the design of the business model, and to ease the management of the model, the model may be represented in an object-oriented architecture. In an object-oriented architecture, the business model is comprised of a collection of business objects. Some business objects may represent features of the FSO such as organizational units (branches, offices, etc.), job seats (collections agent, loan officer, etc.), products (credit cards, mortgage loans, etc.), data elements (interest rates, account balance limits, etc.), data dictionaries (collections of data elements), and external interfaces for sending and receiving information to computer systems external to the FSO production system. Other objects may represent functions of the FSO such as tasks for performing calculations, tasks for making decisions, processing strategies for account acquisition, processing strategies for account collections, and for invoking external interfaces. Business objects may also be referred to as business model objects. A business object may be represented on a computer display screen graphically, for example, as an icon, or a business object may be represented on the computer display screen textually, for example, a name of the business object may be displayed on the computer display screen.

Each business object is a logical collection of information describing the feature or function it represents in the business model. A business object may have methods and properties associated with it. The information describing the feature or function may be stored in the business object as properties of the business object. A business object may be defined as a collection of properties. Properties may be data values or references to other business objects. The properties of each object may be stored in the business model database. Each business object may therefore be built from a collection of properties stored in the business model database. A business object may define methods to accomplish various tasks such as manipulate object properties, perform actions, send a message. For example, credit_limit_check may be a name of method associated with a credit card object. When the credit_limit_check method is invoked, a program may be executed to obtain the credit card limit for a specified credit card account. An object-oriented business model may include relationships among business objects in the business model. Business objects may inherit properties from other objects, may be related to other objects, and may reference and be referenced by other objects.

A business object stored in a business model database may have a corresponding business object stored in a production database for use in a production system. The business model database may store business objects in a different format than a production system database stores business objects. A translation program, or production build program, may translate the business objects stored in a business model database into business objects stored in a production database.

The following is an example of how a business model created by an embodiment of a business modeler system may be used in an embodiment of a production system. An organizational unit includes process maps. Process maps may also be referred to as processing maps, processing workflow, processing flowchart and process flow maps. Assignment maps and strategy maps are examples of types of process maps. One or more process maps may be linked to form an overall process map in a business model. Each process map includes one or more tasks linked in a transaction processing hierarchy, with one task as the entry point for the process map. A transaction enters the production system and is sent to an organization unit based upon product type, entry method, etc. The organizational unit starts transaction processing at the entry point task in the process map. Each task in the process map may perform one or more processing functions on documents and data elements included in the transaction. A task may interface with one or more other business objects representing features of the FSO to facilitate processing of the transaction by the task. Examples of features that may be interfaced with may include external interfaces for sending and receiving documents such as correspondences, queues for manual processing of transactions, other organizational units for forwarding the transaction for further processing.

As an example of the use of an object-oriented business model, an FSO may include a branch office. The branch office may be represented by an organizational unit object in the FSO's business model. The organizational unit object may include a process map object. The organizational unit object may include a property representing the mailing address of the branch office. The branch office may have a branch manager. The branch manager may be represented in the business model by a user object. The branch manager's user object may have security access to modify the organizational unit object, its properties, and its child objects such as the process map object. If the branch office moves, it may be necessary to change the mailing address stored as properties in the organizational unit object. The branch manager may access the business model using the branch manger user object in the business modeler program and may change the mailing address property in the organizational unit object. The mailing address may be changed in one place in the business model. Other business objects that need the address, such as task objects and other organizational unit objects, reference the branch office organizational unit object to get the address. The organizational unit object may then be production built by the branch manager, and the scripts produced by the production build may be applied to the production database by a database administrator to effect the updates in the organizational unit. After the production database is updated, any tasks in the production system that require the mailing address of the branch office get the updated address by referencing the updated branch office organizational unit object stored in the production database. For example, a task that sends a letter including the branch office's address to a customer will automatically read the new branch office address from the production database, without requiring modification of the task object.

A business model may include business relationships among organizational units and other business objects that make up the FSO. One relationship among the elements of an FSO is the hierarchical relationship among the organizational units used for reporting. For example, a business model may include a relationship with a main office, one or more divisions under the main office, and one or more branch offices under the divisional offices. A second relationship among the elements of an FSO is the processing flow for a credit product or service. The processing flow relationship may differ significantly from the reporting relationship. For example, a branch office may receive an application for a credit card and may forward the application to a divisional office for assignment. The divisional office may evaluate the credit card application, decide the applicant is too high-risk for the division, and forward the application to another division specializing in high-risk, high-interest-rate credit cards.

The elements of an FSO are represented by business model objects. In this application, a business model object may be defined as a computer data structure representing a business element. A business model object may include a number of methods and properties that define the business model object. A business model object may also include other business model objects. Business model objects may be representations of real-world features of businesses. Examples of types of business features business model objects may represent include, but are not limited to: business entities such as divisions, offices, positions in the company, and employees; business products such as loan applications and correspondence; interfaces to external business organizations; work tasks such as calculations, decisions, and assignment to organizational units; temporal objects such as calendars, schedulers, and timers; and elemental data necessary to accomplish work tasks such as interest rates, risk factors, and loan limits. There may be several types of business model objects. Examples of types of business model objects include, but are not limited to, root or desktop, organizational unit, product, processing task, assignment map, strategy map, external interface, data element, user, queue, and job seat. A business model object may be represented on the computer screen by a graphical icon or by a display listing the properties of the business model object in graphic and alphanumeric format. A business modeler system may include one or more pre-defined business model objects. In one embodiment, the pre-defined business model objects may be referred to as a class of objects. For example a global data object may include pre-defined data elements that are provided with the business modeler program; the data elements in the global data set may be common across all FSO functions. Some pre-defined business model objects may be locked to prevent them from being modified.

Organizational unit objects represent offices or functional business units of an FSO, such as headquarters, divisional offices, and branch offices. Scheduler objects may be used to hold a business product transaction for future processing; for example, in a collections process, a letter may be sent to a customer expecting a response within 30 days. A scheduler object may be used to hold further processing of the business product pending a user response or the expiration of the 30-day period.

A business model may be constructed by defining the business model objects that represent the elements of an FSO and arranging the business model objects in a relationship that represents the FSO from an organizational viewpoint. This relationship may be called a "business relationship" or "inheritance relationship." In one embodiment, the relationship among business model objects may be described as a hierarchical tree structure. The business model objects on the tree may be referred to as "nodes" on the tree. The tree may be viewed as an inverted tree, with a root object as the highest level node in the tree. All business model objects added under the root object may be descendents of the root object. The root object may be an ancestor of all business model objects in the tree. A business model object that is included in another business model object may be called a child of the business model object. A business model object that includes another business model object may be called a parent of the included business model object. Business model objects that are included in the same parent object may be called sibling objects.

The relationships of the business model objects are governed by the rules of inheritance and reference. If a child object is of the same type as the parent object, it may inherit the properties of the parent object and of ancestors of the parent object. For example, if a parent object includes a "Name" property set to "Main Office" and a "City" property set to "New York," a child object of the parent object may inherit the "Name" property set to "Main Office" and the "City" property set to "New York". Child objects may override properties inherited from a parent object. In the example above, the child object may override the "Name" property with a value of "West Branch Office".

A business model object may be able to reference other business model objects in the tree. If a business model object references another business model object, the referenced business model object, or a property thereof, may be included as a property of the referencing business model object. For example, a business model object in the tree may be able to reference a sibling business model object in the tree, and thus have access to the properties of the sibling business model object. A business model object may also be able to prevent other business model objects from referencing the object and from referencing children of the object.

For example, an organizational unit object may wish to prevent another organizational unit object from accessing certain data stored in data element objects that are children of the organizational unit object.

In one embodiment, for definition and display purposes, business model objects may be represented as icons in a business model design window. An object name may be displayed next to an icon. The business model object icons may be displayed in a hierarchical order in the business model design window representing the hierarchical tree relationship described above. When a business model object icon is selected, properties and child objects of the selected business model object may be displayed.

A second relationship may be created among business model objects created in a business view relationship as described above. The second relationship may be called a process flow map. A process flow map may be a representation of how a business product transaction is processed in an organization. Each organizational unit object may include at least one assignment map object and at least one strategy map object. An assignment map object may be configured to gather information for the business product transaction and to assign the business product transaction to an appropriate strategy map object. An assignment map object may be created by adding a number of processing task objects to an assignment map and linking the processing task objects in the order in which business product transactions will proceed through the assignment map object. Each processing task object may include one entry point for business product transactions and one or more exit points for the business product transactions. Each exit point on a processing task object is linked to one entry point on another processing task object. One processing task object may serve as the starting point for business product transactions in the assignment map. If, during the processing of a business product transaction, an assignment map determines the business product transaction should be processed by another organizational unit, the business product transaction may be sent to the appropriate organizational unit object through a "send to organizational unit" task object. The receiving organizational unit object may then start processing the received business product transaction at the starting point task of an assignment map object included in the receiving organizational unit object.

If, during processing of a business product transaction, an assignment map determines the current organizational unit should process the business product transaction, an appropriate strategy map object may be selected and the business product transaction may be sent to the selected strategy map object through a "send to strategy map object" task object.

A strategy map object may be configured to gather and evaluate data for the business product transaction and to automatically make decisions about the business product transaction. A strategy map object may be created by adding a number of processing task objects to a strategy map and linking the processing task objects in the order in which business product transactions will proceed through the strategy map object. Each processing task object may include one entry point for business product transactions and one or more exit points for the business product transactions. Each exit point on a processing task object is linked to one entry point on another processing task object. One processing task object may serve as the starting point for business product transactions in the strategy map. If, during the processing of a business product transaction, a strategy map determines the business product transaction cannot be automatically processed and requires human intervention, the business product transaction may be added to a queue of business product transactions to be manually processed through a "send to queue" task object. An FSO employee working at a client system may then iterate through the business product transactions and resolve the transactions as necessary.

An organizational unit may have a master assignment map object, where all business product transactions initially enter the processing map for the organizational unit. A product object may also have an assignment map object that may route a business product transaction to the appropriate organizational unit or strategy for processing. A product object may be used to model an FSO product, such as a credit card, auto loan, or mortgage loan. Product objects may exist as child objects of organizational units.

A business modeler program may store each property of a business model object as a separate row in a business model database. While this storage format is useful for supporting features like relationships, inheritance and inherited relationships, accessing data stored in this format may be slower than data stored in other formats, and therefore this format may not be appropriate for a production FSO transaction-processing system. Since the data entered into the business modeler program must be available in some form during production transaction processing, it is desirable to translate the data into a structure that is more suitable for use in the production FSO transaction-processing system. Production build is provided to perform the translation between the business model database format and a database format suitable for use in the production FSO transaction-processing system.

In one embodiment, the business object definitions, properties, processing task maps, and other FSO attributes may be prepared and stored during the configuration of the FSO system. Configuration of the FSO system may occur at the time the FSO system software programs and databases are initially installed and set up for processing FSO transactions. During runtime an FSO system may be executing the installed, set up and configured FSO software programs to process FSO transactions. Configuration of the FSO system may also occur after the initial configuration performed during the installation of the FSO system. A configuration of the FSO system that occurs after the initial configuration may be called a reconfiguration of the FSO system. Reconfiguration may also occur during runtime of the FSO system. During reconfiguration, the business object definitions, properties, processing task maps, and other FSO attributes constructed during the initial configuration may be modified or deleted, and new values may be added to the FSO system. Some data and/or transactions may be processed differently in the FSO system after a reconfiguration of the FSO system than before the reconfiguration.

FIG. 1a—A Block Diagram Illustrating the Architecture of One Embodiment of a Business Modeler System In FIG. 1a, an embodiment of a business modeler system 130 may include a computer system 10, a display screen 50 connected to the computer system, and a business model database 40 residing on external storage. System 10 includes memory 20 configured to store computer programs for execution on system 10, and a central processing unit (not shown) configured to execute instructions of computer programs residing on system 10. Business modeler program 30 may be stored in memory 20. Upon startup, business modeler program 30 may access business model database 40, use the contents of business model database 40 to construct a business model in memory, and may display a representation of the business model on display screen 50. A user may view the representation of the business model on display screen 50, and may make modifications, additions, and deletions to the business model. System 10 may also include one or more user input devices 52 such as a keyboard for entering data and commands into business model program 30 and one or more cursor control devices 54 such as a mouse for using a cursor to modify a business model viewed on display screen 50. In response to the updating of the business model, business modeler program 30 may convert the business model to a business model database format and store the updated business model in business model database 40.

Figure 1B:
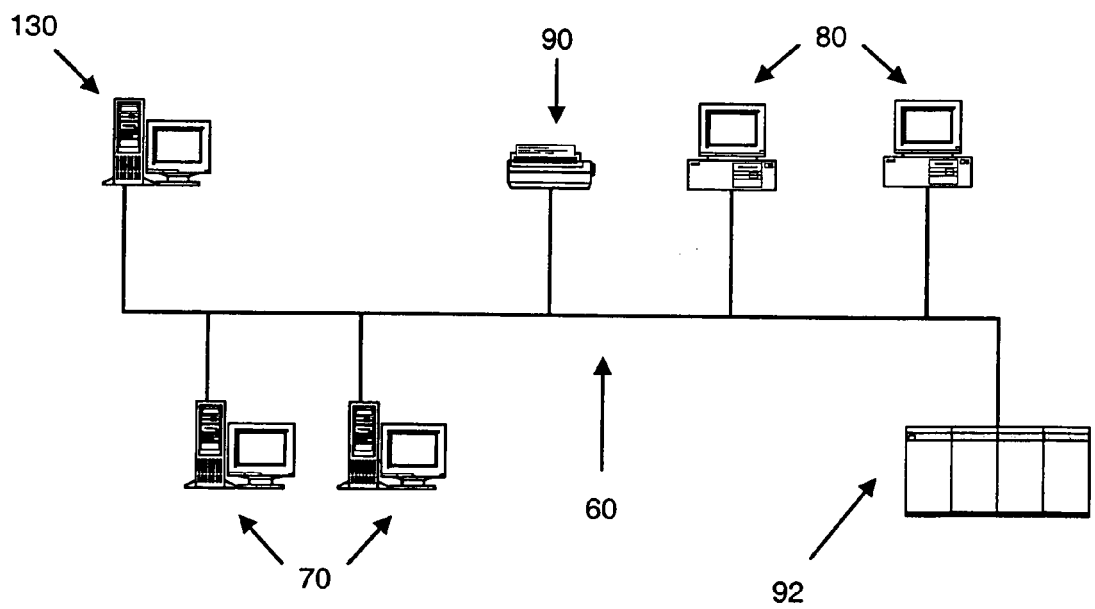
FIG. 1b illustrates one embodiment of an FSO business product transaction processing system with a business modeler system, a production system, and client systems in the network.

FIG. 1b—One Embodiment of an FSO Business Product Transaction Processing System

FIG. 1b illustrates one embodiment of an FSO business product transaction processing system. In this embodiment, the system is shown as a client/server system with the server systems and client systems connected by a network 60. Network 60 may be a local area network or wide area network, and may include communications links including, but not limited to, Ethernet, token ring, internet, satellite and modem. One or more production system servers 70 may be connected to network 60. The production system software and production system database may be distributed among the one or more production system servers 70 to provide a distributed processing system for business product transactions. In other words, a business product transaction being processed by the production system may be routed to a production server based upon the workload distribution among servers 70 at the time of the transaction. Production system servers 70 may be located on a local area network or may be geographically dispersed in a wide area network.

Business modeler system 130 may also be connected to network 60. Business modeler system 130 may also be a server in the client-server system. Business modeler system 130 may include a business modeler program and a business model database as illustrated in FIG. 1a. In one embodiment of an FSO business product transaction processing system, business modeler system 130 may also include a production build program and a production build database as illustrated in FIG. 1b. In another embodiment of an FSO business product transaction processing system, the production build program and production build database may be located on a server in the client-server system other than business modeler system 130. Business modeler system 130 may be accessed directly or may be accessed from production system servers 70 and client systems 80.

One or more client systems 80 may also be connected to network 60. Client systems 80 may reside at one or more organizational units within the FSO. In a wide area network, client systems 80 may be geographically dispersed. Client systems 80 may be used to access production system servers 70 and business modeler system 130. An FSO employee may use a client system 80 to access a queue of business product transactions in the production system for manually processing business product transactions that the production system has determined cannot be automatically processed. An employee may also use a client system 80 to enter business product transactions into a production system. An example of a business product transaction that may be entered by an employee at a client system 80 is a credit card application. Some employees of the FSO may also be given security access to business modeler system 130. Examples of tasks an employee may perform on a client system 80 include, but are not limited to, defining or modifying business models, defining or modifying assignment and strategy maps, and applying updated business models to the production system. One or more printers 90 may also be connected to network 60 for printing documents associated with business product transactions.

One or more host systems 92 may also be connected to network 60 and included in an FSO business product transaction processing system. A host system is a computer system that may feed data into production systems 70. Host systems 92 may also hold and process FSO transaction data for the FSO.

External systems (not shown) may also be connected to network 60. Production systems 70 may connect to external systems through external interfaces designed in business modeler and implemented in the production system.

Figure 1C:
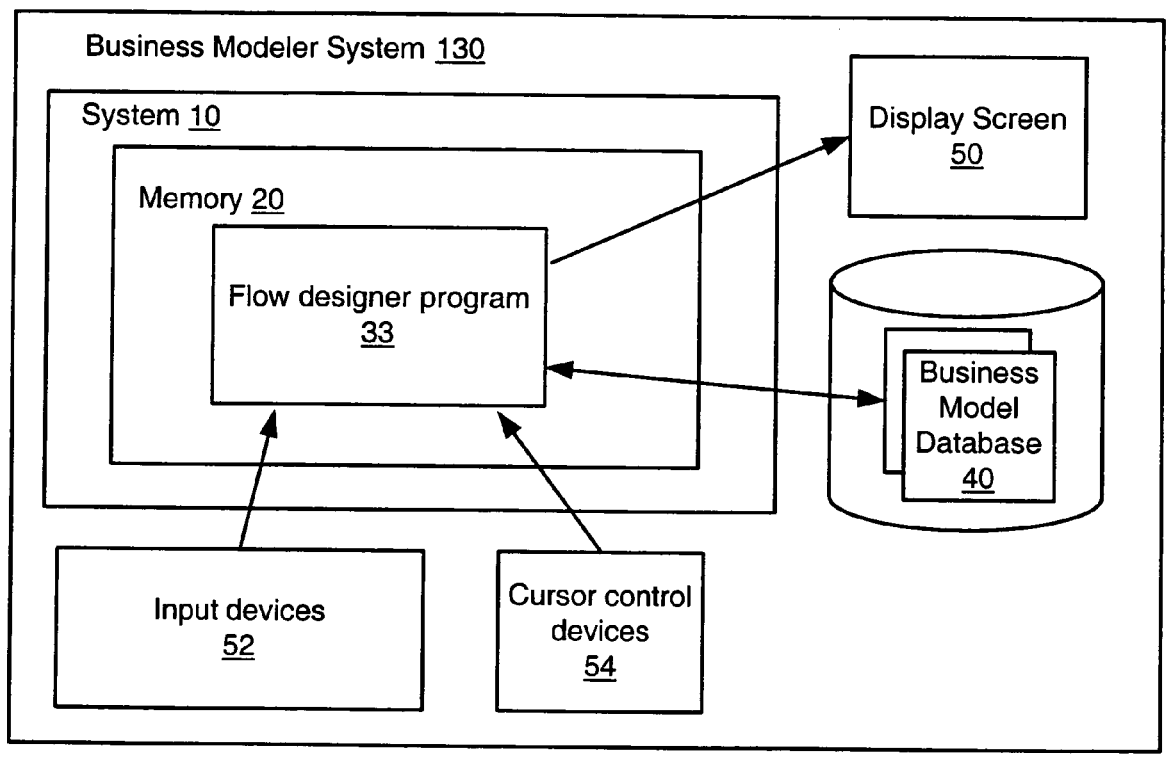
FIG. 1c is a block diagram illustrating the architecture of one embodiment of a business modeler system with a flow designer program.

FIG. 1c—A Block Diagram Illustrating the Architecture of One Embodiment of a Business Modeler System with Flow Designer Program In FIG. 1c, an embodiment of a business modeler system 130 may include a computer system 10, a display screen 50 connected to the computer system, and a business model database 40 residing on external storage. System 10 includes memory 20 configured to store computer programs for execution on system 10, and a central processing unit (not shown) configured to execute instructions of computer programs residing on system 10. Flow designer program 33 may be stored in memory 20. Flow designer program 33 may access business model database 40, use the contents of business model database 40 to construct assignment and strategy maps in memory, and may display a representation of the assignment and strategy maps on display screen 50. A user may view the representation of the assignment and strategy maps on display screen 50, and the user may make modifications, additions, and deletions to the assignment and strategy maps. System 10 may also include one or more user input devices 52 such as a keyboard for entering data and commands into flow designer program 33, and one or more cursor control devices 54 such as a mouse for using a cursor to modify assignment and strategy maps viewed on display screen 50. In response to the updating of assignment and strategy maps, flow designer program 33 may convert the assignment and strategy maps to a business model database format and store the new or updated assignment and strategy maps in business model database 40.

In one embodiment, flow designer program 33 may be a stand-alone computer program. In another embodiment, flow designer program 33 may be a subprogram of a business modeler program as illustrated in FIG. 1a. In yet another embodiment, flow designer program 53 may be a subsystem of a business modeler system 130. In still yet another embodiment, flow designer program 33 may be split into an assignment designer subsystem and a strategy designer subsystem of a business modeler system 130.

Figure 2A:
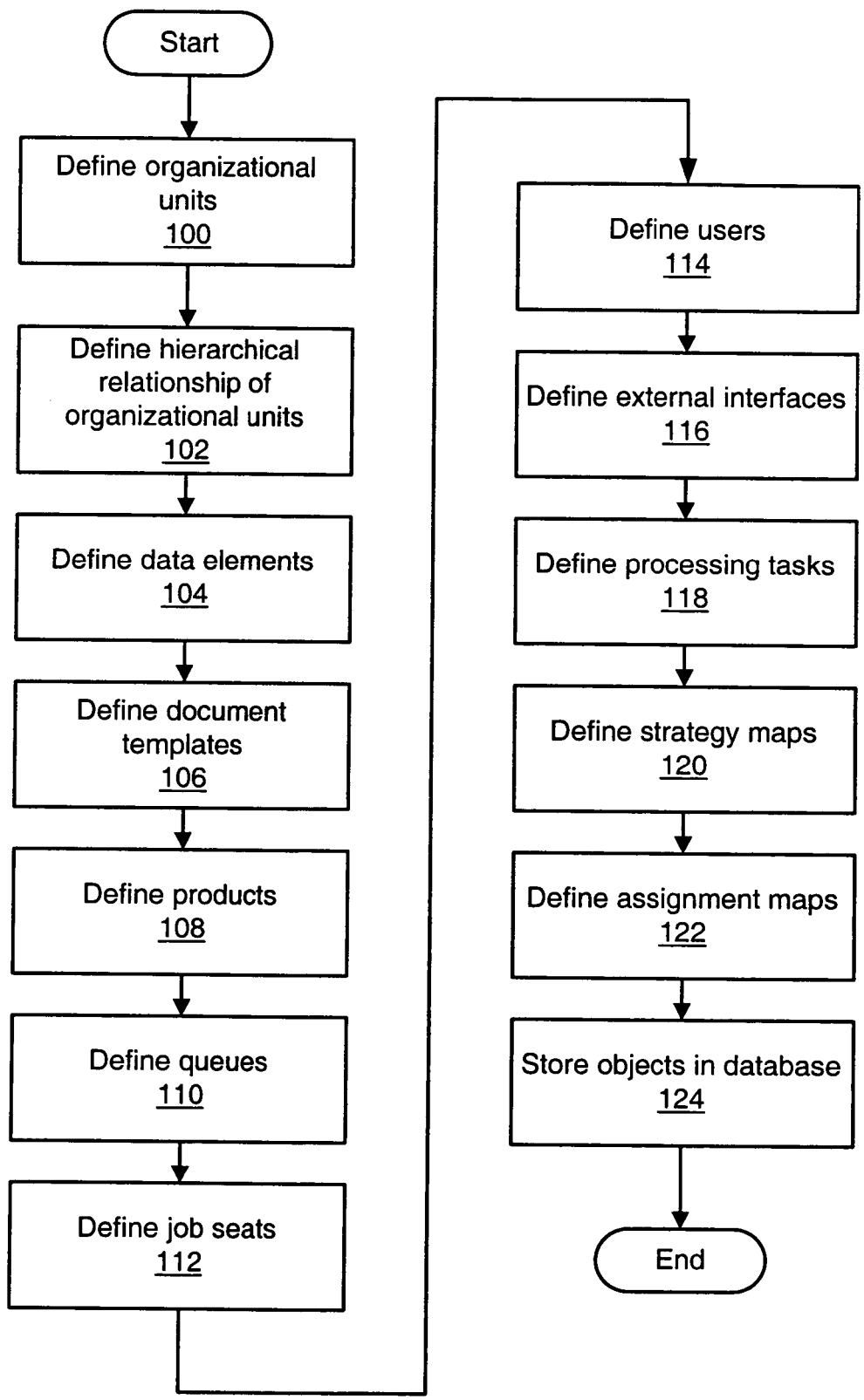
FIG. 2a is a flow diagram illustrating an example of a business model design process using one embodiment of a business modeler system.

FIG. 2a—A Flow Diagram Illustrating an Example of the Business Model Design Process Using One Embodiment of a Business Modeler System FIG. 2a illustrates an example of a business model design process in one embodiment of a business modeler system. In step 100, the organizational units making up the real-world business to be modeled are identified, and an object representing each organizational unit may be created and initialized with the properties of the organizational unit, such as name, address, and contact persons. In step 102, a hierarchical relationship among the organizational units may be established. The hierarchical relationship among organizational units may be established by the location of the organizational units in the hierarchical tree structure. An organizational unit object created directly below another organizational unit object may report to the higher organizational unit. For example, a main office may be created as the highest organizational unit in the hierarchical tree structure, a division office reporting to the main office may be created in the main office organizational unit, and a branch office reporting to the division office may be created in the division office organizational unit.

Data element objects may be defined in step 104. Data element objects are the smallest pieces of information in the business model. Data element objects may represent alphanumeric and numeric items such as customer name, customer address, interest rates, loan terms, dates and risk factors. Data element objects may include properties such as data type, display parameters, and storage parameters. Data types may include, but are not limited to, alphanumeric string, character, date, real number, and integral number. Display parameters may include, but are not limited to, display width. Storage parameters may include, but are not limited to, numerical value precision and storage width. Data elements may be given a default value or may be empty until initialized in a production system.

In step 106, document template objects may be defined. Document templates may be computer representations of paper documents from a customer file used in the FSO. Document templates may include one or more data elements as fields in the template, and may include graphical objects such as pictures and icons. Examples of documents modeled by document templates include, but are not limited to, loan applications, credit card applications, and correspondence letters. In a production system, the fields on a document template may be automatically filled in by the production system, the document may be presented on a computer screen to an employee of the FSO or to a customer who may manually enter data in the fields on the document, or fields in the document may be filled with data retrieved from an external data source via an external interface. Examples of uses of a document in a production system include, but are not limited to, forwarding the document to another organizational unit, printing and mailing the document to a customer of the FSO, and electronically archiving the document in the customer's files in an FSO customer database.

In step 108, products of the FSO may be defined as product objects. Product objects may be defined for organizational units that handle account acquisitions. Examples of products include, but are not limited to, consumer finance products such as mortgages, auto loans, and credit cards. Properties of products may include, but are not limited to, product name, interest rates, terms, duration, and payment schedules. A product may have one or more associated document templates that serve as customer applications for the product. A product may also be associated with one or more assignment objects and strategy objects that combine to define the processing flow for a customer application for the product.

In step 110, queues may be defined. Queue objects may be used in strategy objects. A queue object may receive work packets representing business product customer transactions and present the transactions for manual intervention. Work packets may include one or more electronic documents, defined in step 106, related to the customer transaction. Associated with queue objects are job seats. Job seat objects may be created in step 112. Job seat objects represent employee positions in the business organization. A job seat object may be associated with one or more queue objects. User objects may be created in step 114. User objects may include properties defining an employee's name and security access rights. User objects may grant employees security access to the business modeler system and to the production system. User objects may be granted security access to "occupy" job seats. In a production system, an employee may use an assigned user object to occupy a job seat and to manually process queued work packets presented on a workstation computer screen. Documents from the work packet may be displayed on the screen, and the employee may have security access from the user object to view, modify, or act upon the customer transaction.

At step 116, external interfaces may be defined. External interfaces may allow the production system to send information from data elements to external systems and organizations, and to receive information from external systems and organizations and store the information in data elements. An external interface may include a channel object specifying the electronic communications channel on which the information is to be sent and received. Channels may include any electronic communications channel suitable for transmitting or receiving data on the production system. An external interface may also be associated with one or more documents for displaying the data elements to be transmitted and for displaying received data elements.

Processing task objects may be defined at step 118. Processing tasks are used in assignment maps and strategy maps. Processing tasks perform operations on work packets. Examples of operations that may be performed on work packets include, but are not limited to, adding documents to a work packet, modifying data elements in the documents, performing calculations with data elements, making decisions based upon data elements, invoking external interfaces, sending work packets to queues, and sending work packets to other organizational units.

In step 120, strategy maps may be defined for the organizational units. A strategy map may be created by adding one or more processing tasks to the strategy map and connecting the processing tasks in a non-linear flow from a first processing task to one or more end processing tasks. Work packet exit nodes on a processing task may be connected to work packet entry points on other processing tasks. A work packet may begin at the first processing task, proceed through a series of processing tasks, and end at an end processing task. End processing tasks for strategy maps may include assign to queue tasks and end processing tasks. Thus, a strategy map may end by assigning the work packet to a queue for manual processing or by completing automatic processing of the customer transaction.

In step 122, assignment maps may be defined for the organizational units. An assignment map may be created by adding one or more processing tasks to the assignment map and connecting the processing tasks in a non-linear flow from a first processing task to one or more end processing tasks. Work packet exit nodes on a processing task may be connected to work packet entry points on other processing tasks. A work packet may begin at the first processing task, proceed through a series of processing tasks, and end at an end processing task. End processing tasks for assignment maps may include assign to organizational unit tasks and assign to strategy tasks. Thus, an assignment map may always end at the first processing task of another organizational unit's assignment map or at the first processing task of a strategy map for this organizational unit. Thus, in a production system, a work packet entering at an assignment map of one organizational unit may be routed to a second organizational unit better suited to handle the customer transaction, and the assignment map for the second organizational unit may route the work packet to the appropriate strategy map for final disposition of the customer transaction.

The business model may be stored in a business model database in step 124. In one embodiment, business modeler may iterate through the objects, decompose each object into its component properties, and store the objects' properties as records in the business model database. In another embodiment, an object may be decomposed into its component properties, and the properties stored as records in the business model database in response to the object being created or updated. The object property records in the business model database may include enough information to reconstruct the business model and all of the business model objects included in the business model in a subsequent execution of the business modeler program.

Figure 2B:
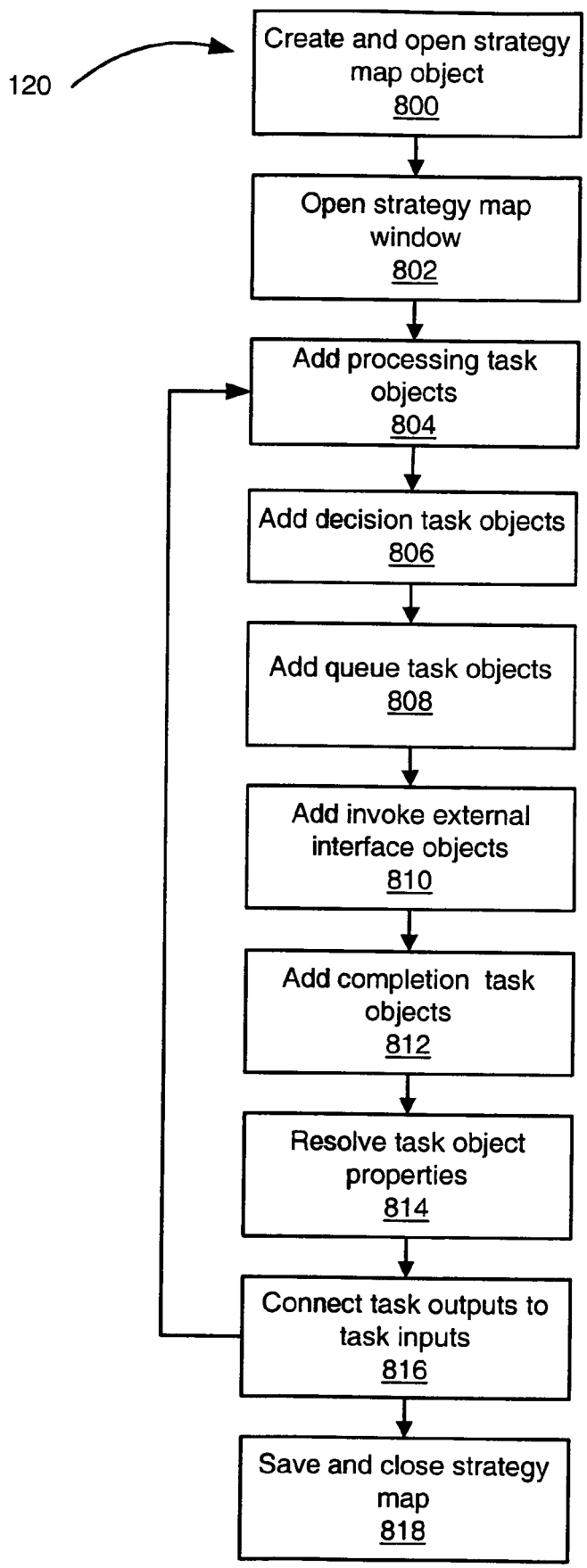
FIG. 2b is a flow diagram illustrating an example of a strategy design process using one embodiment of a flow designer program.

FIG. 2b—A Flow Diagram Illustrating an Example of a Strategy Design Process Using One Embodiment of a Flow Designer Program FIG. 2b is a flow diagram showing step 120 from FIG. 2a in detail. This flow diagram describes the process of creating a strategy map with a flow designer program. A similar process may be applied to an existing strategy map object to modify the strategy map. In one embodiment, strategy maps end in either queue task objects or completion task objects as described below. In step 800, a strategy map object may be created and opened. Creating a strategy map object may involve selecting an organizational unit object or a product object as a parent object for the strategy map object, and creating the strategy map object as a child object of the selected parent object in the hierarchical tree. A strategy map object may also be created as a child object of other types of objects.

Figure 19:
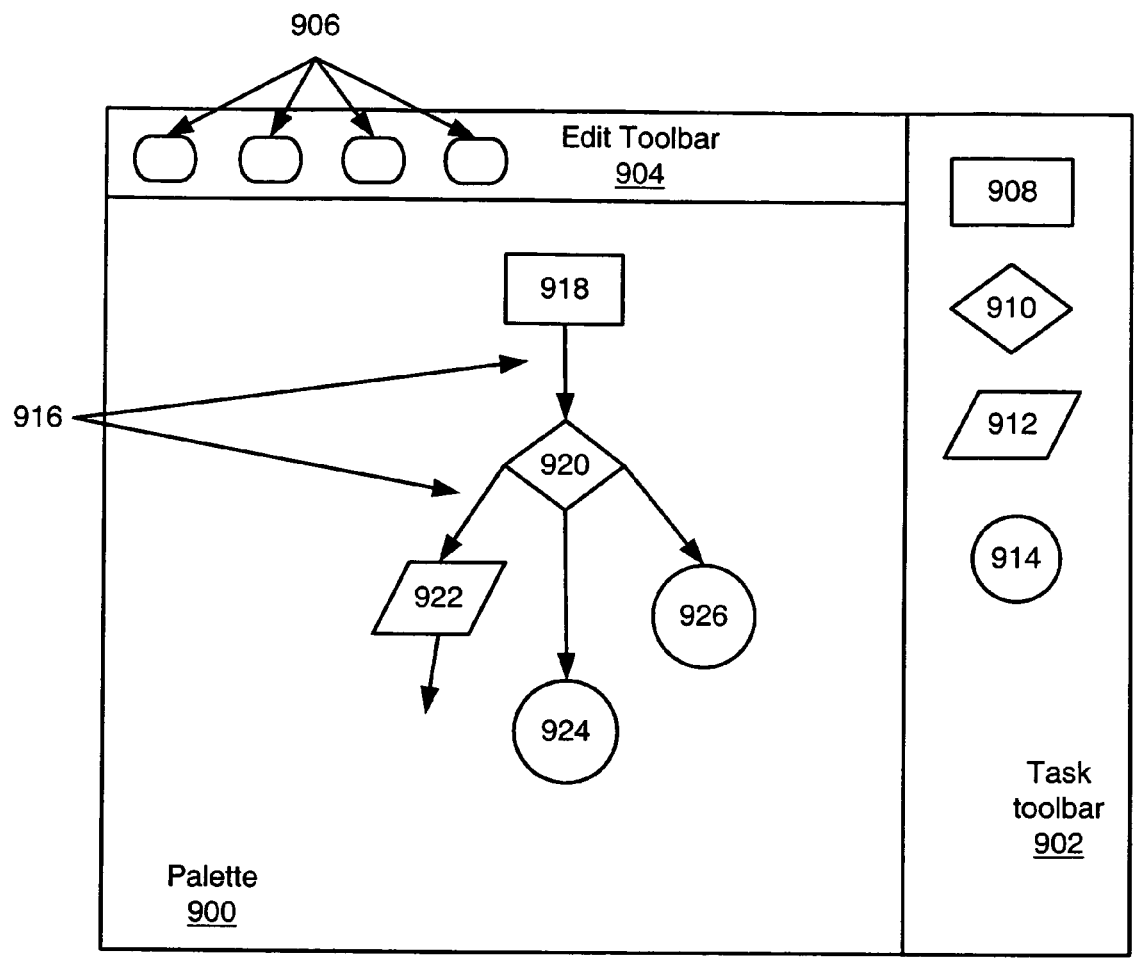
FIG. 19 is an illustration of one embodiment of a flow designer window.

In step 802, a strategy map window may be opened for the strategy map object created in step 800. FIG. 19 illustrates one embodiment of a flow designer window which may be used to design a strategy map. Turning to FIG. 2b, in one embodiment, the strategy map window may be opened by selecting the strategy map object and choosing an "open object" menu choice from a menu in a flow designer program window. In another embodiment, the strategy map window may be opened by opening a properties sheet for the strategy map object and selecting a strategy map panel in the property sheet.

In steps 804–816, task objects are added to the strategy map, resolved, and connected in a strategy flow. These steps may be iterative, with one or more task objects added, their properties resolved, connections made, more task objects added, and so on. Steps 804–816 may also be performed in other orders than shown in FIG. 2b. In one embodiment, task objects may be added by selecting a task icon from a toolbar and dragging and dropping the task icon onto the strategy map. The toolbar may include task icons representing each of the task types available for use in a strategy map. Task objects may be added to the strategy map as pre-defined tasks or as generic tasks. A pre-defined task is a task that was defined previously in the business modeler program. These tasks are reusable, that is, the same task may be added to one or more strategy and assignment maps. Generic tasks are defined in the flow designer program as they are added to an assignment or strategy map. Generic tasks exist only for the assignment or strategy map in which they are created. Generic tasks cannot be reused in other assignment and strategy maps.

In one embodiment of a flow designer, some tasks may be available only for account acquisition assignment and strategy maps, some tasks may be available only for account collections assignment and strategy maps, and some tasks may be available for both account acquisition and account collections assignment and strategy maps.

In step 804, one or more processing task objects may be added. Processing tasks may be configured to perform operations on one or more data elements. Examples of processing tasks include, but are not limited to: calculation tasks, which are configured to perform mathematical operations on one or more data elements or data constants, and; score tasks, which grade or rank one or more data elements. In step 806, decision task objects may be added. Decision task objects provide branching within an assignment or strategy map by comparing data elements or results of previous tasks or operations within the decision task object. Decision task objects manage the flow of business product transactions in an assignment or strategy map by representing possible outcomes of conditions, and the desired result(s) that correspond to the conditions.

In step 808, queue task objects may be added. Queue task objects may hold one or more business product transactions to await manual processing by an FSO employee. Queue task objects may be termination points in strategy maps. Queue task objects may only be available in strategy maps. In step 810, invoke external interface task objects may be added. Invoke external interface task objects launch an external interface, which may have been previously defined in business modeler. External interfaces send and receive information from outside sources such as credit bureaus and FSO mainframe systems. In step 812, completion task objects may be added. Completion task objects may immediately follow archive task objects. A completion task object terminates the process flow of a strategy map. Completion task objects remove the business product transaction from the strategy process, and may delete files and free memory associated with the transaction.

Other types of task objects may be added to a strategy map. Examples of other types of task objects that may be added to a strategy map may include, but are not limited to, the following. Agency assignment task objects may be used to automatically assign a business product transaction to an outside collections agency in an account collections system. Archive task objects may be used to save one or more document in a business product transaction to a storage medium, and may remove the documents from the business product transaction. Timer task objects may be use to hold or delay processing of a business product transaction for a specific time span before continuing processing. Invoke correspondence tasks may be used to send correspondence defined as a document template in business modeler to a customer, business, or person associated with a business product transaction.

In step 814, task objects that have been added to the strategy map may be resolved. In one embodiment of a flow designer program, resolution of tasks objects may involve selecting the added task object and opening the property sheet for the task object. In one embodiment of a flow designer program, a task object resolution property sheet may be opened automatically when a task object is added. Data elements included as properties of the task object may be resolved during the resolution of the task. During resolution of a task object, the source(s) from which the task object is to receive data during processing is specified. The sources may be from data elements included in other business objects and document templates previously defined in business modeler, from external sources through external interfaces, from a list of predefined values in a menu, or from other sources.

In step 816, the business product transaction processing flow for the strategy map may be defined by connecting outputs of task objects to inputs of other task objects. In one embodiment of a flow designer program, task objects may have one or more arrows projecting from the bottom, representing output links. An output link may be defined as an exit point for business product transactions from a task. An output link may be connected to another task to define the processing flow for business product transactions from the first task to the second task. An output link connected from a first task to a second task may be disconnected from the second task and connected to a third task. Decision task objects may have two or more output links. Some task objects, such as queue and completion task objects, may not have output links. In one embodiment of a flow designer program, to connect a first task object to a second task object, an arrow, or output link, on the first object may be dragged on the computer screen to contact the second object. In one embodiment of a flow designer program, all output links must be connected to task objects for the strategy map to be complete. In one embodiment of a flow designer program, circular links may not be allowed; that is, task objects may not be linked in a pattern in which a business product transaction may end up in a circular processing path.

Task objects may be added to the strategy map, resolved, and connected in a processing flow until the desired strategy map for processing business product transactions is completed. At this point, the process goes to step 818. Here, the strategy map may be saved and closed. Saving the strategy map may include writing the strategy map object, and all the task objects added to the strategy map, to a business model database, as described in step 124 of FIG. 2*a*.

Figure 2C:
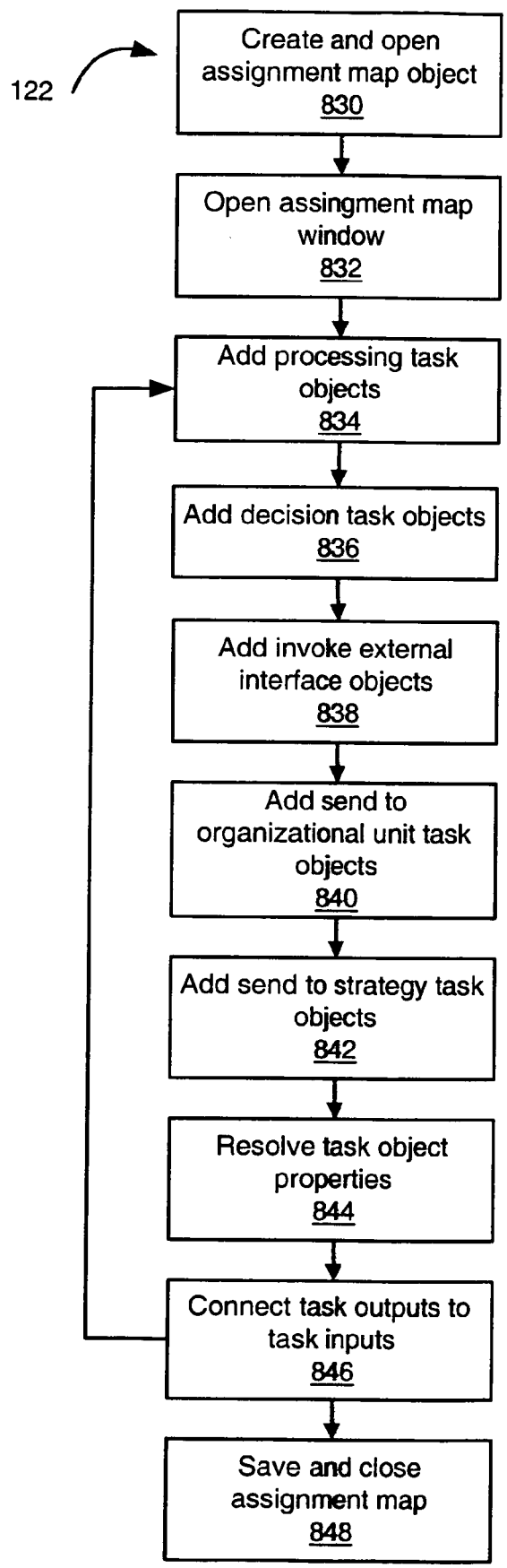
FIG. 2c is a flow diagram illustrating an example of an assignment design process using one embodiment of a flow designer program.

FIG. 2*c*—A Flow Diagram Illustrating an Example of an Assignment Design Process Using One Embodiment of a Flow Designer Program FIG. 2*c* is a flow diagram showing step 122 from FIG. 2*a* in detail. This flow diagram describes the process of creating an assignment map with a flow designer program. A similar process may be applied to an existing assignment map object to modify the assignment map. The process of defining an assignment map may be very similar to the process of defining a strategy map as illustrated in FIG. 2*b*, but may include task objects of other types and other outcomes. In one embodiment of a flow designer, assignment maps may end in send to organizational unit task objects or send to strategy task objects. In step 830, an assignment map object may be created and opened. Creating an assignment map object may involve selecting an organizational unit object or a product object as a parent object for the assignment map object, and creating the assignment map object as a child object of the selected parent object in the hierarchical tree. An assignment map object may also be created as a child object of other types of objects.

In step 832, an assignment map window may opened for the assignment map object created in step 830. FIG. 19 illustrates one embodiment of a flow designer window which may be used to design an assignment map. Turning to FIG. 2*c*, in one embodiment, the assignment map window may be opened by selecting the assignment map object and choosing an "open object" menu choice from a menu in a flow designer program window. In another embodiment, the assignment map window may be opened by opening a properties sheet for the assignment map object and selecting an assignment map panel in the property sheet.

In steps 834–846, task objects are added to the assignment map, resolved, and connected in an assignment flow. These steps may be iterative, with one or more task objects added, their properties resolved, connections made, more task objects added, and so on. Steps 834–846 may also be performed in other orders than shown in FIG. 2*c*. In one embodiment, task objects may be added by selecting a task icon from a toolbar and dragging and dropping the task icon onto the assignment map. The toolbar may include task icons representing each of the task types available for use in an assignment map. Task objects may be added to the assignment map as pre-defined tasks or as generic tasks. A pre-defined task is a task that was defined previously in the business modeler program. These tasks are reusable, that is, the same task may be added to one or more strategy and assignment maps. Generic tasks are defined in the flow designer program as they are added to an assignment or strategy map. Generic tasks exist only for the assignment or strategy map in which they are created. Generic tasks cannot be reused in other assignment and strategy maps.

In one embodiment of a flow designer, some tasks may be available only for account acquisition assignment and strategy maps, some tasks may be available only for account collections assignment and strategy maps, and some tasks may be available for both account acquisition and account collections assignment and strategy maps.

In step 834, one or more processing task objects may be added. Processing tasks may be configured to perform operations on one or more data elements. Examples of processing tasks include, but are not limited to: calculation tasks, which are configured to perform mathematical operations on one or more data elements or data constants, and; score tasks, which grade or rank one or more data elements. In step 836, decision task objects may be added. Decision task objects provide branching within an assignment or strategy map by comparing data elements or results of previous tasks or operations within the decision task object. Decision task objects manage the flow of business product transactions in an assignment or strategy map by representing possible outcomes of conditions, and the desired result (s) that correspond to the conditions.

In step 838, invoke external interface task objects may be added. Invoke external interface task objects launch an external interface, which may have been previously defined in business modeler. External interfaces send and receive information from outside sources such as credit bureaus and FSO mainframe systems. In step 840, send to organizational unit task objects may be added. Send to organizational unit task objects may be configured to assign a business product transaction to another organizational unit for processing. A send to organizational unit task object may be invoked when a decision task object has determined that the organizational unit that is the parent of this assignment task object is not the preferred organizational unit for processing a business product transaction. In step 842, send to strategy task objects may be added. A send to strategy task object may be resolved to send a business product transaction to a strategy map as illustrated in FIG. 2*b*.

Other types of task objects may be added to an assignment map. Examples of other types of task objects that may be added to an assignment map include, but are not limited to, the following. Champion challenger task objects may be configured to assign business product transactions with similar characteristics to different strategies based upon a random sampling scheme, and may be used to measure and compare the results of alternative strategies.

In step 844, task objects that have been added to the assignment map may be resolved. In one embodiment of a flow designer program, resolution of tasks objects may involve selecting the added task object and opening the property sheet for the task object. In one embodiment of a flow designer program, a task object resolution property sheet may be opened automatically when a task object is added. Data elements included as properties of the task object may be resolved during the resolution of the task. During resolution of a task object, the source(s) from which the task object is to receive data during processing is specified. The sources may be from data elements included in other business objects and document templates previously defined in business modeler, from external sources through external interfaces, from a list of predefined values in a menu, or from other sources.

In step 846, the business product transaction processing flow for the assignment map may be defined by connecting outputs of task objects to inputs of other task objects. In one embodiment of a flow designer program, task objects may have one or more arrows projecting from the bottom, representing output links. Decision task objects may have two or more output links. Some task objects, such as send to organizational unit objects, may not have output links. In one embodiment of a flow designer program, to connect a first task object to a second task object, an arrow, or output link, on the first object may be dragged on the computer screen to contact the second object. In one embodiment of a flow designer program, all output links must be connected to task objects for the assignment map to be complete. In one embodiment of a flow designer program, circular links may not be allowed; that is, task objects may not be linked in a pattern in which a business product transaction may end up in a circular processing path.

Task objects may be added to the assignment map, resolved, and connected in a processing flow until the desired assignment map for assigning business product transactions is completed. At this point, the process goes to step 848. Here, the assignment map may be saved and closed. Saving the assignment map may include writing the assignment map object, and all the task objects added to the assignment map, to a business model database, as described in step 124 of FIG. 2*a*.

Figure 3A:
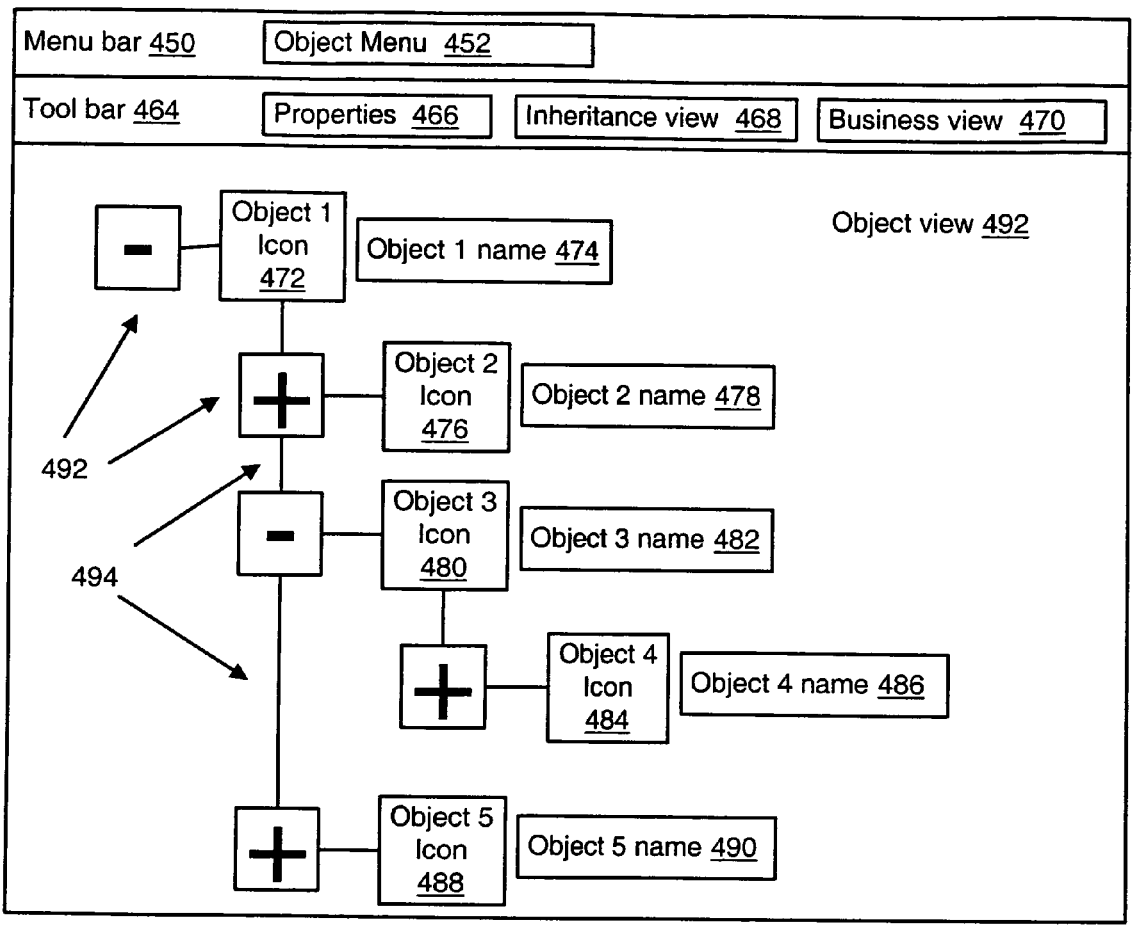
FIG. 3a illustrates one embodiment of a business modeler display screen with business model objects.

FIG. 3*a*—One Embodiment of a Business Modeler Display Screen with Business Model Objects FIG. 3*a* illustrates one embodiment of a business modeler display screen with business model objects. A menu bar 450 may be disposed at the top of the screen. Menu bar 450 may include an object menu 452 as well as several other menus (not shown) including menu choices for managing the business model program, defining and managing business model objects, and defining relationships among the objects. A tool bar 464 may be disposed below the menu bar. Tool bar 464 may include several icons which, when selected, may perform functions similar to menu functions. Shown as examples are a properties icon 466 that may be used to open a properties sheet for a selected business model object, an inheritance view icon 468, and a business view icon 470. An object view 492 may be disposed below the toolbar 464. In object view 492, the business model objects may be displayed in either the inheritance relationship or the business relationship. Inheritance view icon 468 and business view icon 470 may be used to toggle the object view between the inheritance and business relationship viewing mode. In some embodiments, menu selections may also be used to toggle between the viewing modes.

The business model objects defined for a business model may be displayed in object view 492. The objects may be displayed in a top-to-bottom sequence corresponding to the inheritance relationship or the hierarchical business relationship of the objects. In one embodiment, the business model objects may be displayed as icons representing the type of object, with the name of the object displayed to the right of the icon. Shown as an example are object 1 icon 472 with object 1 name 474, object 2 icon 476 with object 2 name 478, object 3 icon 480 with object 3 name 482, object 4 icon 484 with object 4 name 486, and object 5 icon 488 with object 5 name 490. An object expansion icon 492 may be displayed to the left of each object icon. Object expansion icons 492 may be used to expand an object icon, that is, to show the children of the object icon. In one embodiment, an expanded object's expansion icon 492 may be displayed as a minus sign (−), and an unexpanded, or collapsed, object's expansion icon 492 may be displayed as a plus sign (+). In this example, object 1 is expanded, showing object 2, object 3, and object 5 as children of the object. Object 2 is not expanded. In some embodiments, children objects' icons may be inset below and to the right of the parent object's icon. In some embodiments, lines 494 may be drawn between object expansion icons 492 and between object expansion icons 492 and object icons.

Figure 3B:
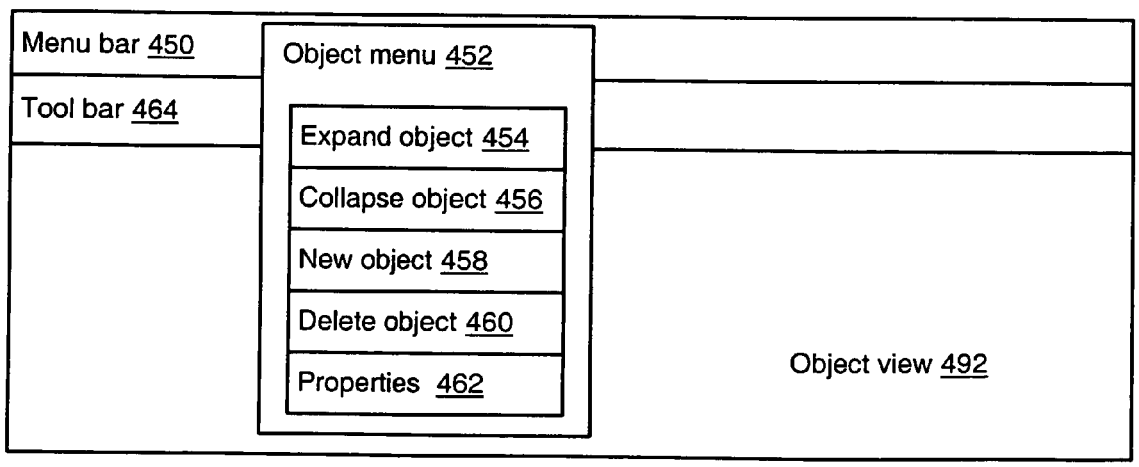
FIG. 3b illustrates one embodiment of a business modeler display screen with an object menu.

FIG. 3*b*—One Embodiment of a Business Modeler Display Screen with an Object Menu FIG. 3*b* illustrates an embodiment of the business modeler display screen of FIG. 3*a* with the object menu 452 opened to reveal some example menu choices that may be included. Some menu choices in object menu 452 may perform an action on a currently selected business model object in object view 492. Expand object menu choice 454 may be used to expand the currently selected business model object in object view 492. Collapse object menu choice 456 may be used to collapse the currently selected business model object in object view 492. New object menu choice 458 may present for selection a list of business model object types and create a new instance of a business model object of the selected type. Delete object menu choice 460 may delete the currently selected business model object in object view 492. Properties menu choice 462 may open a properties sheet for the currently selected business model object in object view 492. In some embodiments, object menu 452 may include other menu choices to perform other operations on business model objects. In some embodiments, the business modeler display screen may include other menus with menu choices for performing other operations in the business modeler system.

Figure 4:
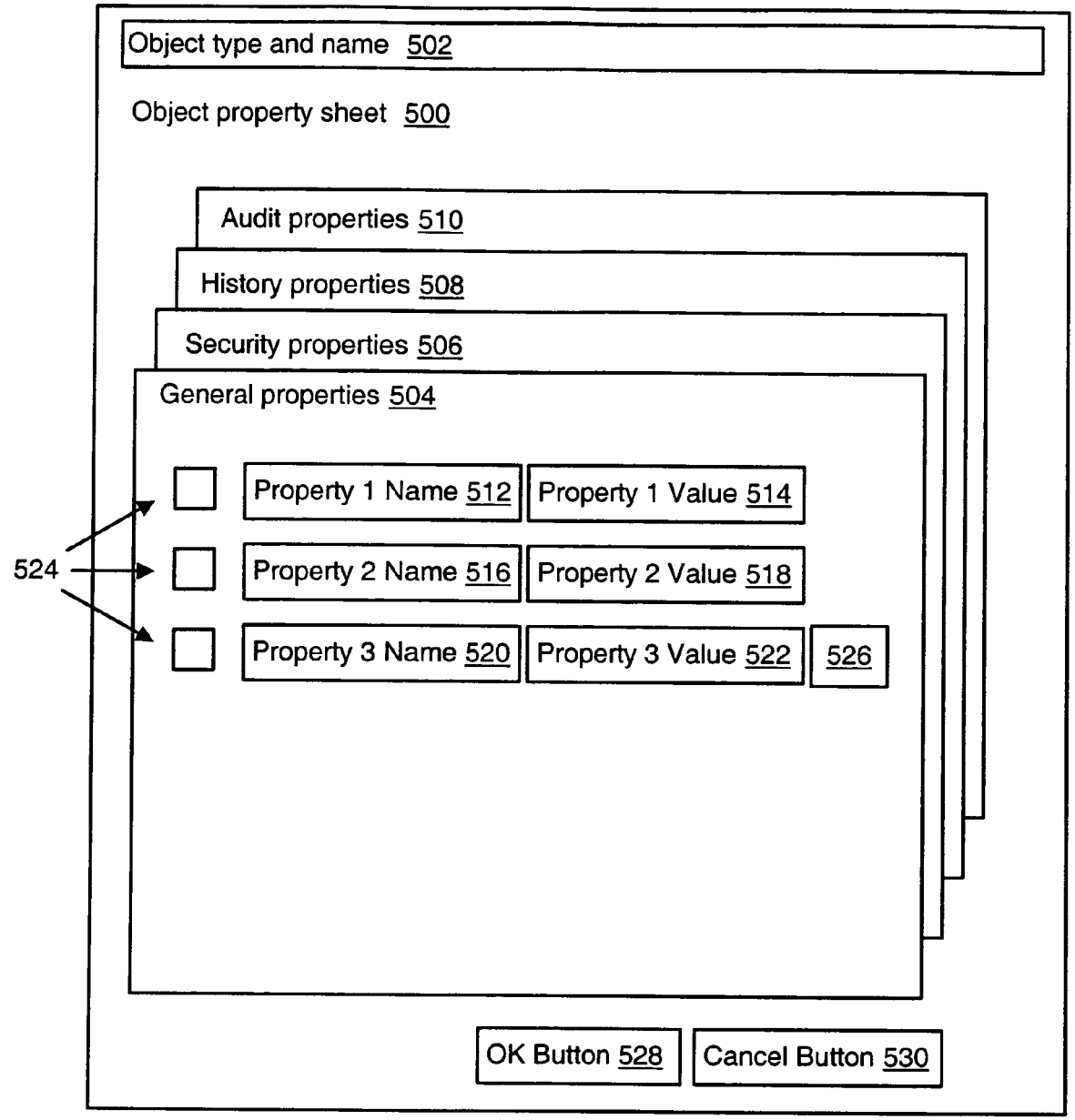
FIG. 4 illustrates one embodiment of a business model object property sheet.

FIG. 4—One Embodiment of a Business Model Object Property Sheet

FIG. 4 illustrates one embodiment of a business model object property sheet 500. In one embodiment, a business model object's property sheet may be displayed in response to the selection of a properties icon 466 from a toolbar 464 on the business modeler display screen as shown in FIG. 3*a*, or alternatively in response to the selection of a properties menu choice 462 from an object menu 452 as shown in FIG. 3*b*. The business model object's type and name 502 may be displayed at the top of property sheet 500. An object's properties may be grouped into one or more property categories. In one embodiment, the categories of object properties may be shown on separate, selectable panels in the property sheet. Shown as examples of property categories are general properties 504, security properties 506, history properties 508, and audit properties 510. Fields in the property category panels may display the names and values of the object's properties. The inheritance status of the property may also be displayed. In one embodiment, the property value field may be disposed to the right of the property name field. In one embodiment, an inheritance indicator may be disposed to the left of the property name. In the example shown in FIG. 4, general properties panel 504 includes property 1 name 512 with property 1 value 514, property 2 name 516 with property 2 value 518, and property 3 name 520 with property 3 value 522. To the left each property name is an inheritance indicator 524. In one embodiment, inheritance indicators may be colored black to indicate that this is an original property value, gray to indicate that this property value was inherited from an ancestor, or green to indicate that the inherited property value has been overridden, or replaced, for this business model object property.

Property names and values may be modified on the business model object property sheet 500. For example, property 1 value 514 may be selected and a new value entered in the field. Changing property 1 value 514 may result in a change in the inheritance indicator 524 for property 1. In some embodiments, property values may be selectable from a list of predefined values. In this example, a property value selection icon 526 is disposed to the right of property 3 value 522. Selecting property value selection icon 526 may result in a list of possible values for property 3 to be displayed for selection. In some embodiments, business model object property sheet 500 may include one or more buttons for controlling property sheet 500. The example in FIG. 4 includes an OK button 528 and a cancel button 530. Selecting OK button 528 may result in the saving of all changes made to the object properties and the closing of property sheet 500. Selecting cancel button 530 may result in the loss of any changes made to the object properties and the closing of property sheet 500.

Figure 5A:
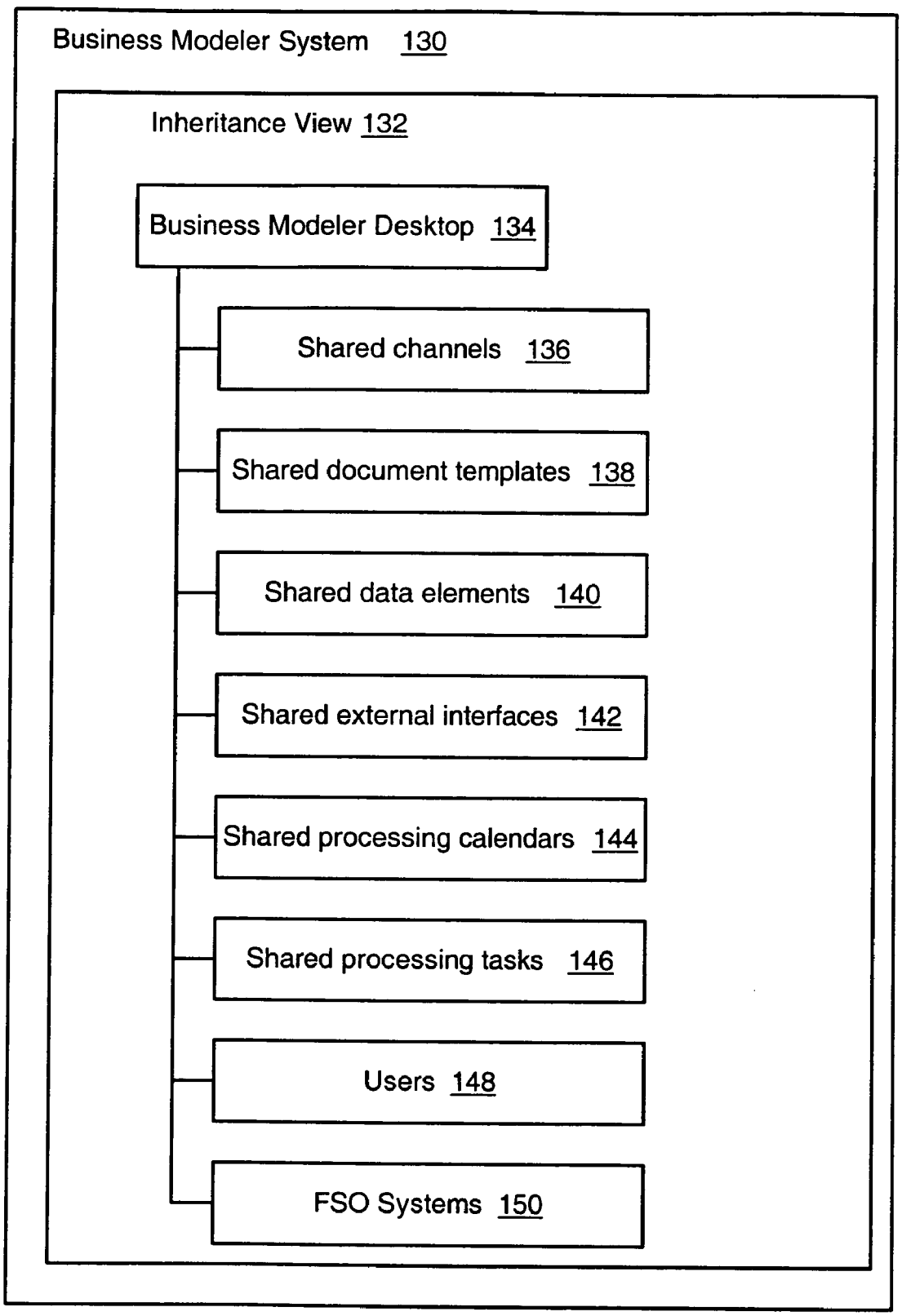
FIG. 5a illustrates one embodiment of business model objects at the highest level of the inheritance view.

FIG. 5a—Business Model Objects at the Highest Level of the Inheritance View

FIGS. 5a–5d illustrate the inheritance relationship of business model objects in a business modeler system 130. The business model objects may be displayed in an inheritance view 132 on a computer screen as described in FIG. 3a. FIGS. 5a–5d may be used to illustrate the relationship of the objects in memory as well as the relationship of the objects as displayed on the computer screen. Referring to FIG. 5a, business modeler desktop 134 may be the root object and may be the ancestor of all other business model objects in the business model. Created as children of business modeler desktop object 134 are several types of business model objects that may be shared by organizational unit objects and other business model objects in the business model. Shared objects may be referenced by any organizational unit in the business model. An advantage of shared objects is that an object that is common among many organizational units, such as a business calendar, may be created once, stored as a shared object in the business model hierarchical tree, and used by many organizational units. Shown are examples of shared objects including channels 136, document templates 138, data elements 140, external interfaces 142, processing calendars 144, and processing tasks 146. A shared object, when expanded, may include on or more sharable descendent objects of the same type as the shared object.

User objects 148 are shown as children of the root object. User objects may be defined at this level because user objects may be used to give employees of the business organization security access to functions of the business modeler and the production system. Properties of user objects may include user name, user title, password, and security information defining what facilities in the business modeler and the production system a particular user may access. FSO systems 150 may be the parent object of the account acquisition and account collections systems, which are in turn the parent objects of the organizational unit objects included in the business model.

Figure 5B:
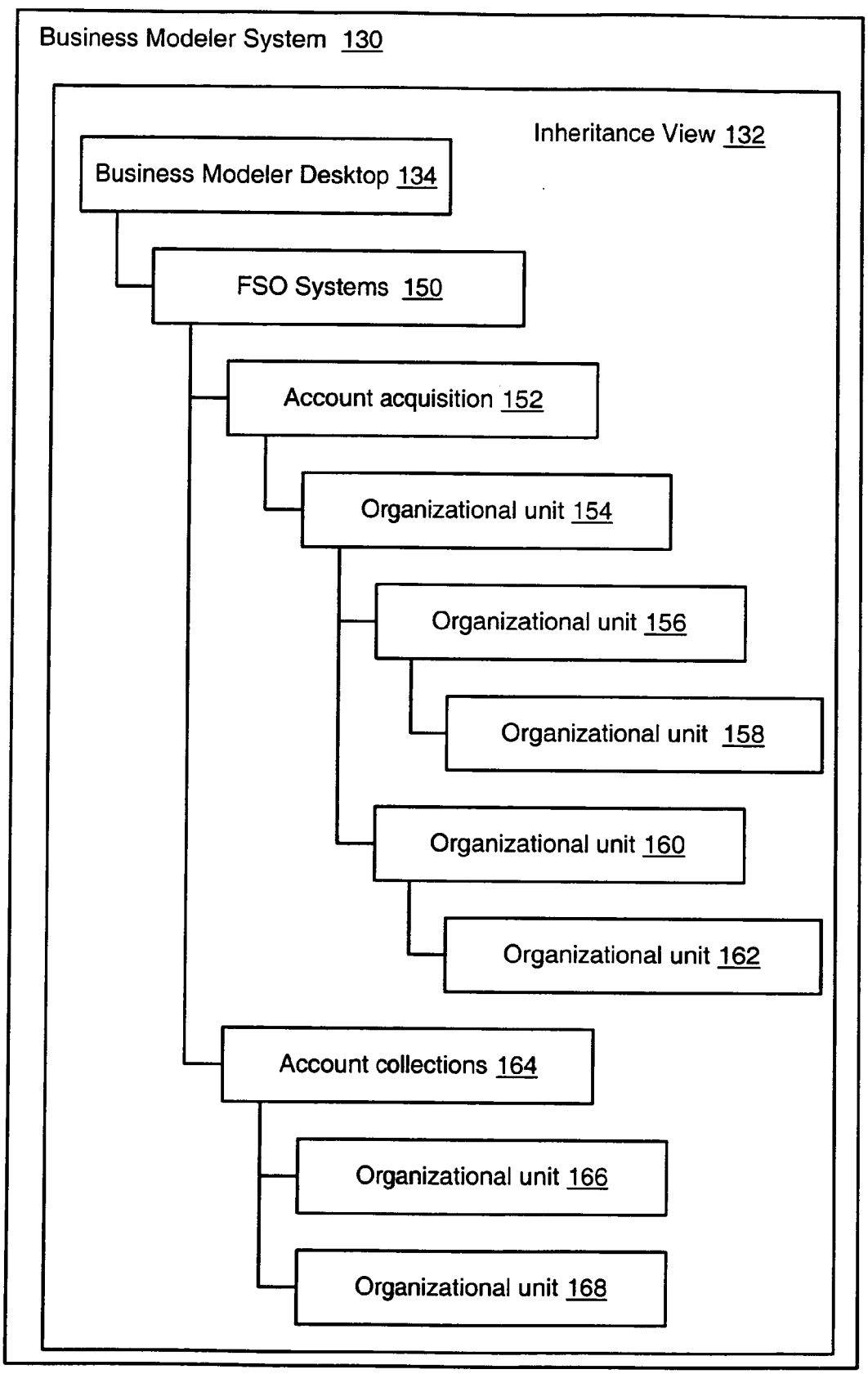
FIG. 5b illustrates one embodiment of business model objects representing organizational units in the inheritance view.

FIG. 5b—Business Model Objects Representing One Embodiment of Organizational Units in the Inheritance View FIG. 5b shows an expanded view of FSO systems 150. Shown as children of the FSO systems 150 are the account acquisition system 152 and the account collections system 164. Organizational unit objects in the inheritance view may be created as children of systems. Shown as children of the account collections system 164 are organizational unit 166 and organizational unit 168. Shown as children of the account acquisition system 152 are organizational unit 154 and organizational unit 160. Organizational unit 154 and organizational unit 160 may not be of the same object type as account acquisition system 152, and thus may not inherit any properties from account acquisition system 152. However, an organizational unit may be able to reference its ancestors, and therefore may be able to reference shared objects created at a higher level as described for FIG. 5a. Organizational unit 154 is shown to have one child organizational unit 156. Note that other object types may also be added as children of organizational units. Organizational unit 156 is shown to have one child organizational unit 158. Organizational unit 160 is shown to have one child organizational unit 162.

As organizational units 154, 156, and 158 are of the same type, organizational units lower on the tree may inherit property values from their ancestor organizational units. Thus, organizational unit 158 may inherit property values from organizational units 154 and 156. An organizational unit may not inherit property values from its descendents. Thus, organizational unit 154 may not inherit property values from organizational units 156 or 158. A business model object may not inherit property values from siblings or siblings' descendents. Thus, organizational unit 160 may inherit property values from its ancestor organizational unit 154, but may not inherit property values from its sibling organizational unit 156 or organizational unit 156's child organizational unit 158. An object may be able to reference siblings or a sibling's descendents. Thus, organizational unit 160 may be able to reference property values of organizational units 156 and 158. Security features of business model objects may also be used to regulate referencing among business model objects. For example, security properties for a business model object may be set to deny referencing of one or more properties to siblings. Thus, security properties for organizational unit 160 may be set to prohibit organizational unit 156 from referencing organizational unit 160's properties.

Figure 5C:
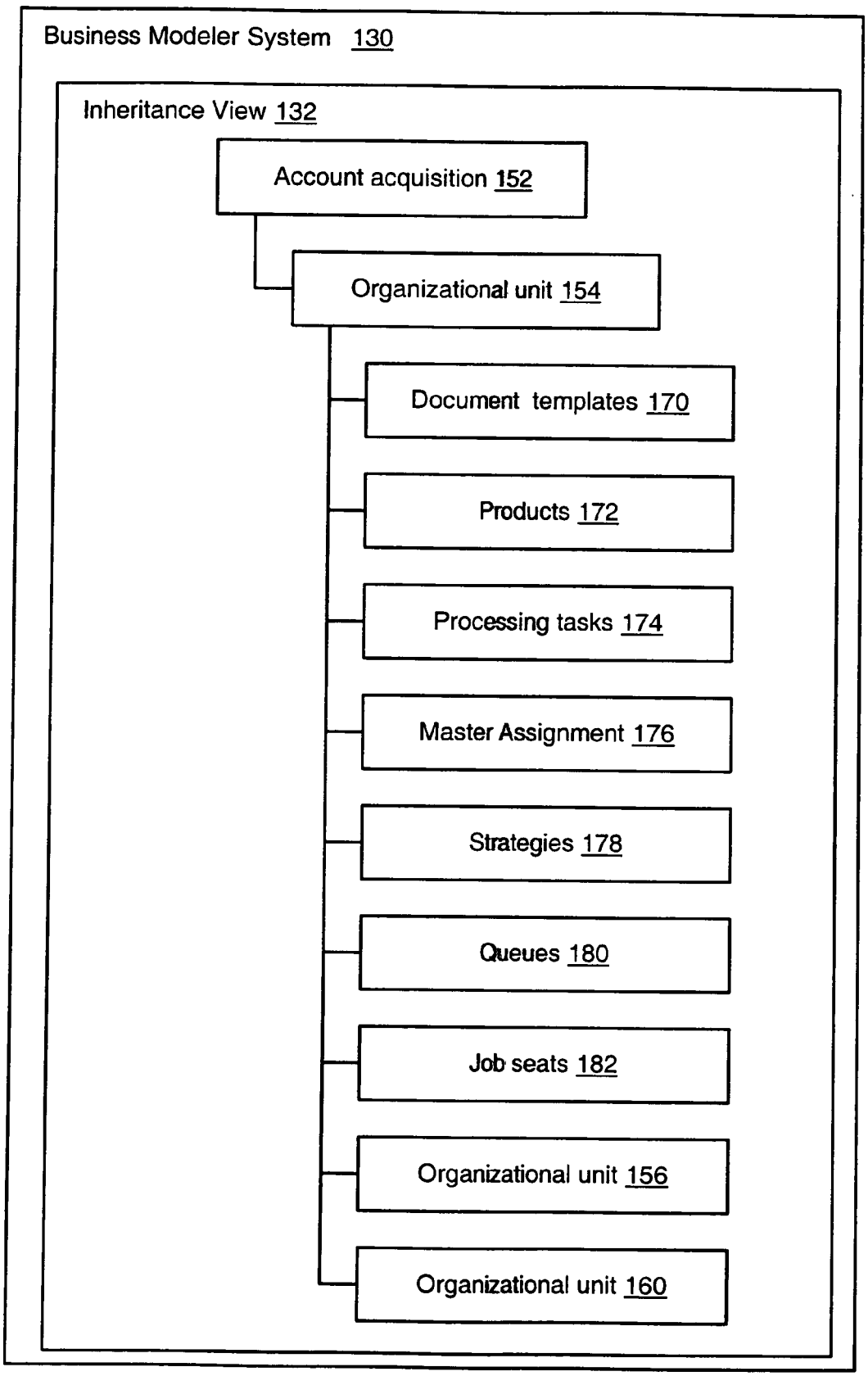
FIG. 5c illustrates one embodiment of an account acquisition organizational unit in the inheritance view.

FIG. 5c—One Embodiment of an Account Acquisition Organizational Unit in the Inheritance View FIG. 5c shows an expanded organizational unit 154 with child business model objects in the inheritance view. In one embodiment, to create a new child business model object under an existing business model object, the existing business model object may be selected in the object view window and the new object menu selection 458 shown in FIG. 3b applied to the selected business model object. Referring again to FIG. 5c, organizational unit 154 may include document templates 170, products 172, processing tasks 174, master assignment 176, strategies 178, queues 180, and job seats 182. Also shown are unexpanded child organizational units 156 and 160.

Figure 5D:
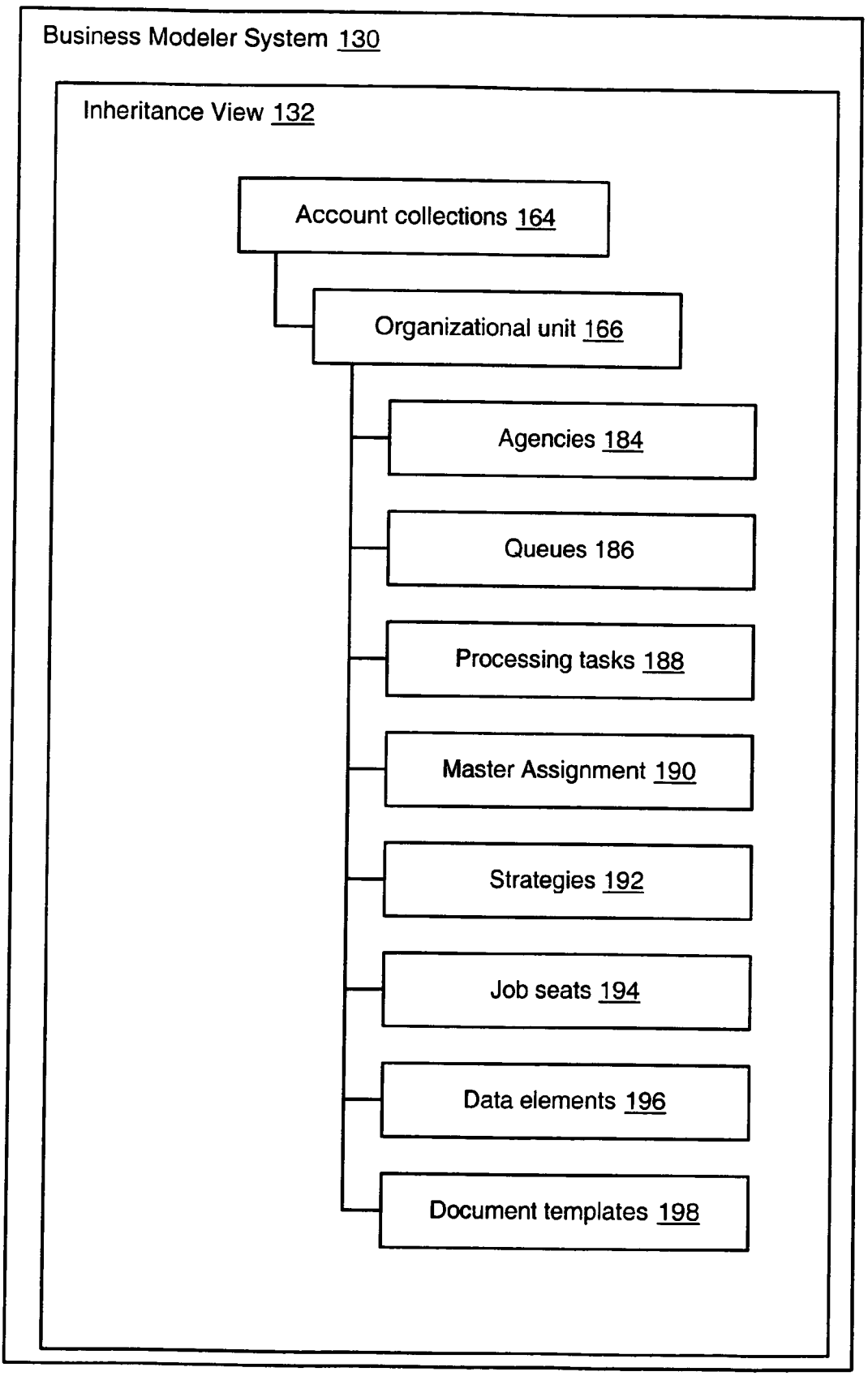
FIG. 5d illustrates one embodiment of an account collections organizational unit in the inheritance view.

FIG. 5d—One Embodiment of an Account Collections Organizational Unit in the Inheritance View FIG. 5d shows an expanded organizational unit 166 with several child business model objects in the inheritance view. Organizational unit 166 may include agencies 184, queues 186, processing tasks 188, master assignment 190, strategies 192, job seats 194, data elements 196, and document templates 198.

Figure 6A:
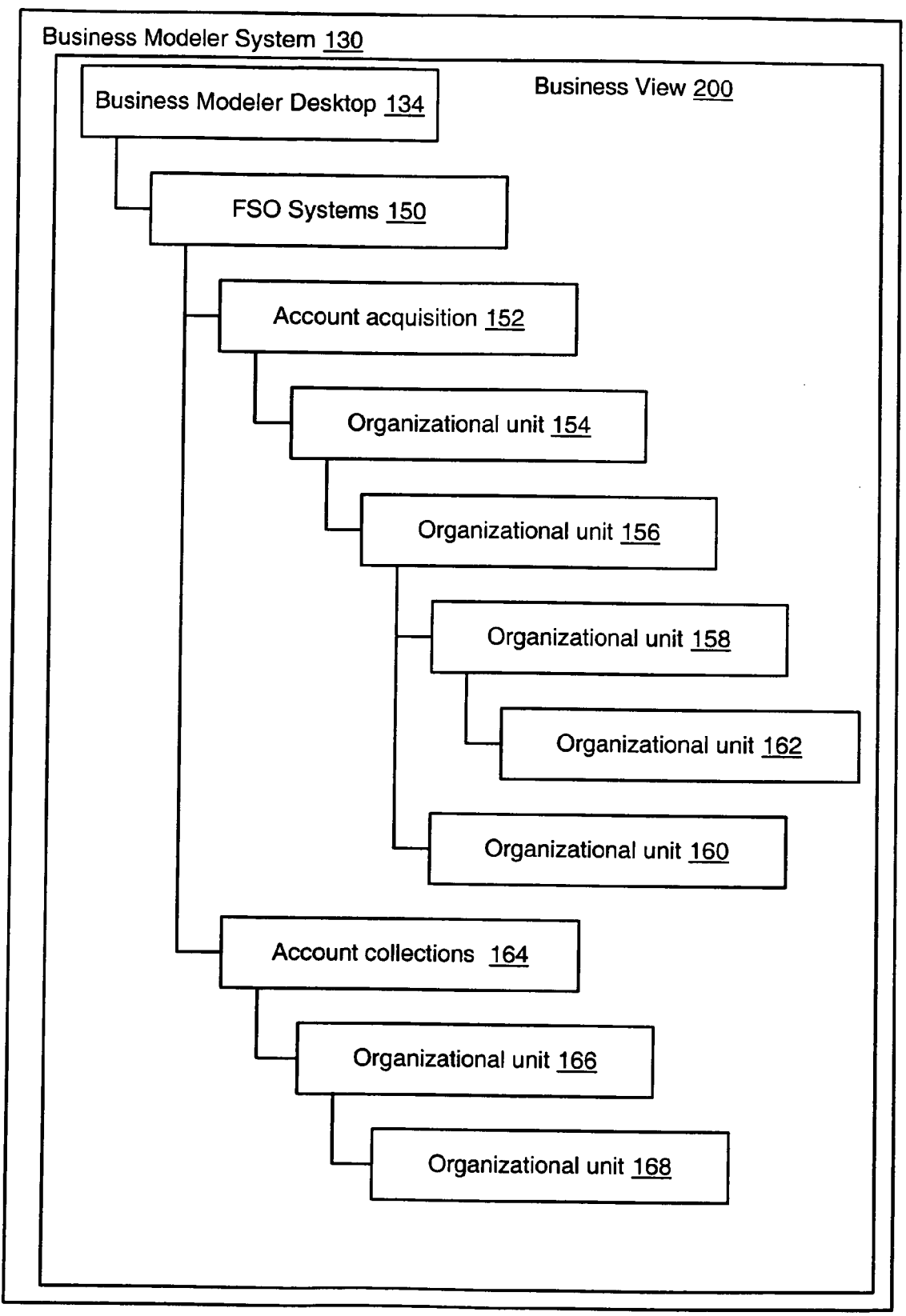
FIG. 6a illustrates one embodiment of business model objects at the highest level of the business view.
Figure 6B:
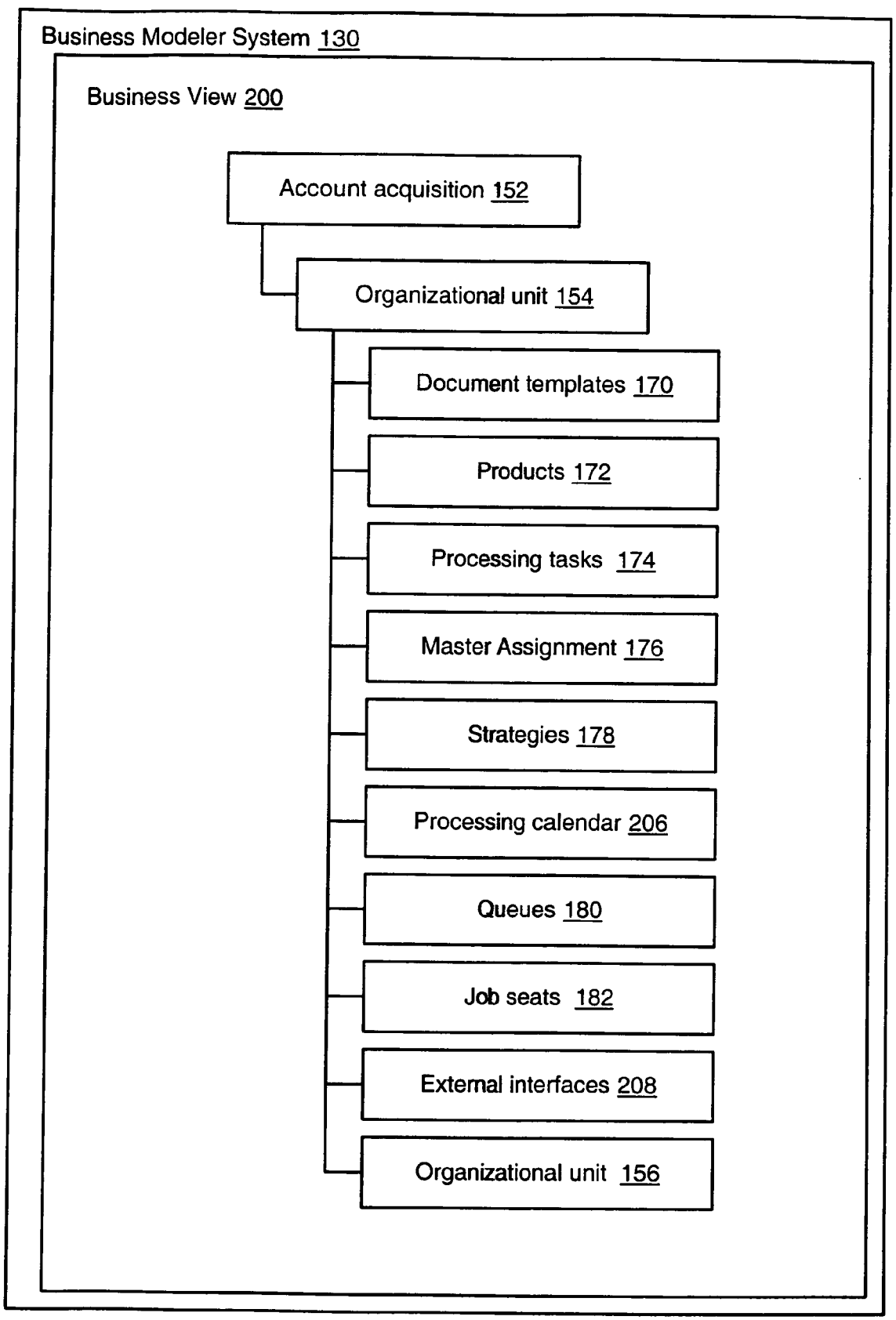
FIG. 6b illustrates one embodiment of an account acquisition organizational unit in the business view.
Figure 6C:
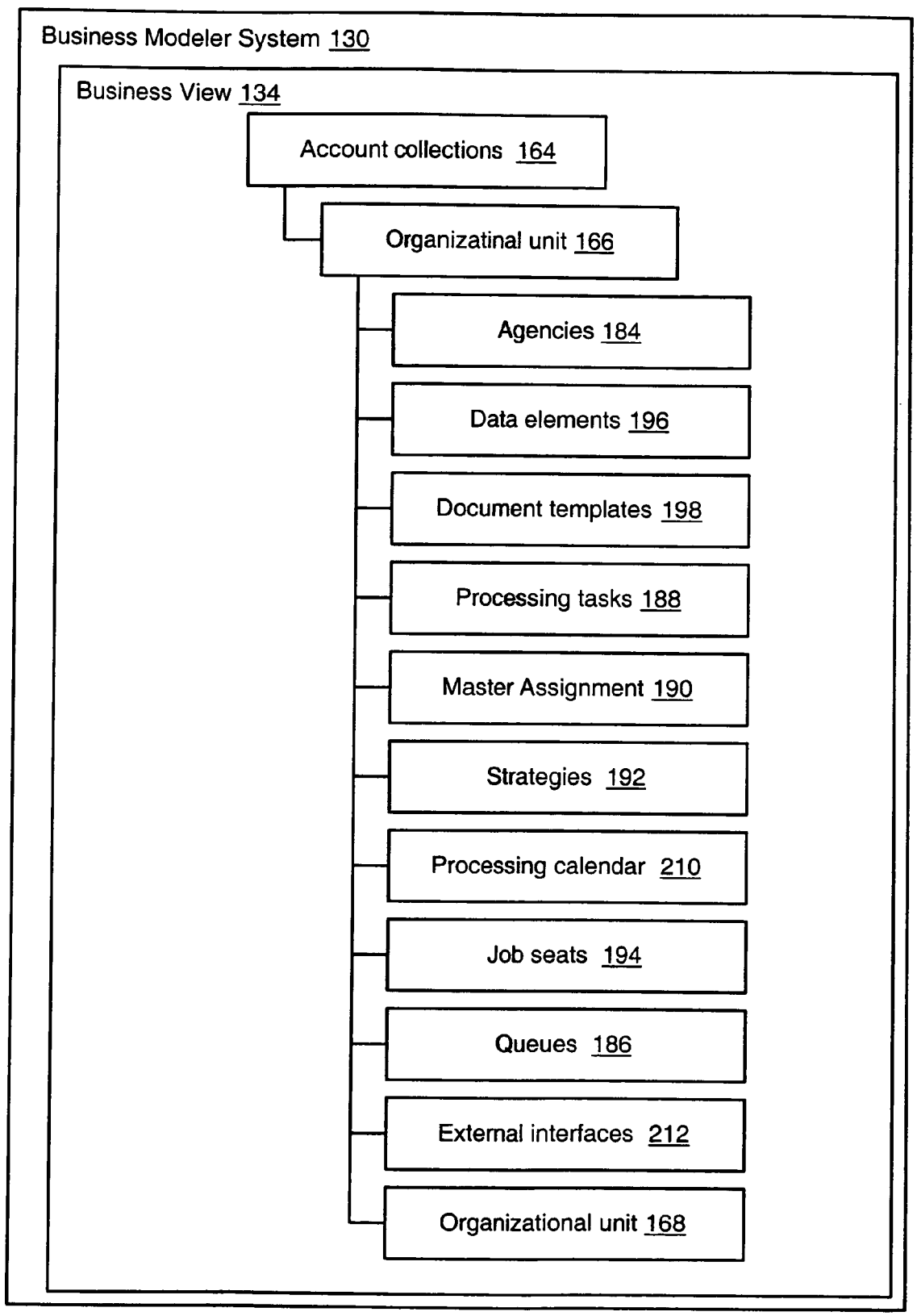
FIG. 6c illustrates one embodiment of an account collections organizational unit in the business view.

FIG. 6a—One Embodiment of Business Model Objects at the Highest Level of the Business View FIGS. 6a–6c illustrate the business relationship of business model objects in an embodiment of a business modeler system 130. The business model objects may be displayed in a business view 200 on a computer screen as described in FIG. 3a. Referring to FIG. 6a, business modeler desktop 134 may be the root object and may be the ancestor of all other business model objects in the business model. Operations that may be performed on objects in the inheritance view may also be performed in the business view. FSO systems 150 is shown expanded with its reporting account acquisition system 152 and account collections system 164 visible. The tree is expanded to show the organizational units in both systems in their reporting relationship. The organizational units shown in FIG. 5b in an inheritance relationship are shown in FIG. 6a in a business relationship. Thus, organizational unit 160 is shown reporting to organizational unit 156 rather than as a sibling of organizational unit 156, organizational unit 162 is shown reporting to organizational unit 158 rather than as a child of organizational unit 160, and organizational unit 168 is shown reporting to organizational unit 166 rather than as a sibling of organizational unit 166.

FIG. 6b—One Embodiment of an Account Acquisition Organizational Unit in the Business View FIG. 6b shows an expanded organizational unit 154 with reporting business model objects in the business view. Organizational unit 154 may include document templates 170, products 172, processing tasks 174, master assignment 176, strategies 178, processing calendar 206, queues 180, job seats 182, and external interfaces 208. Also shown is unexpanded organizational unit 156 that reports to organizational unit 154. Some objects shown in the business view as reporting to an object may be shown in the inheritance view at a different level in the hierarchical tree. Thus, sharable business model objects shown on the high-level inheritance view in FIG. 5a may be shown as reporting objects to an organizational unit object in the business view. For example, processing calendar 206 may be a shared business model object common to all organizational units.

FIG. 6c—One Embodiment of an Account Collections Organizational Unit in the Business View FIG. 6c shows an expanded organizational unit 166 with several reporting business model objects in the business view. Organizational unit 166 may include agencies 184, data elements 196, document templates 198, processing tasks 188, master assignment 190, strategies 192, processing calendar 210, job seats 194, queues 186, and external interfaces 212. Also shown is reporting organizational unit 168, which is a sibling of organizational unit 166 in the inheritance view.

Figure 7:
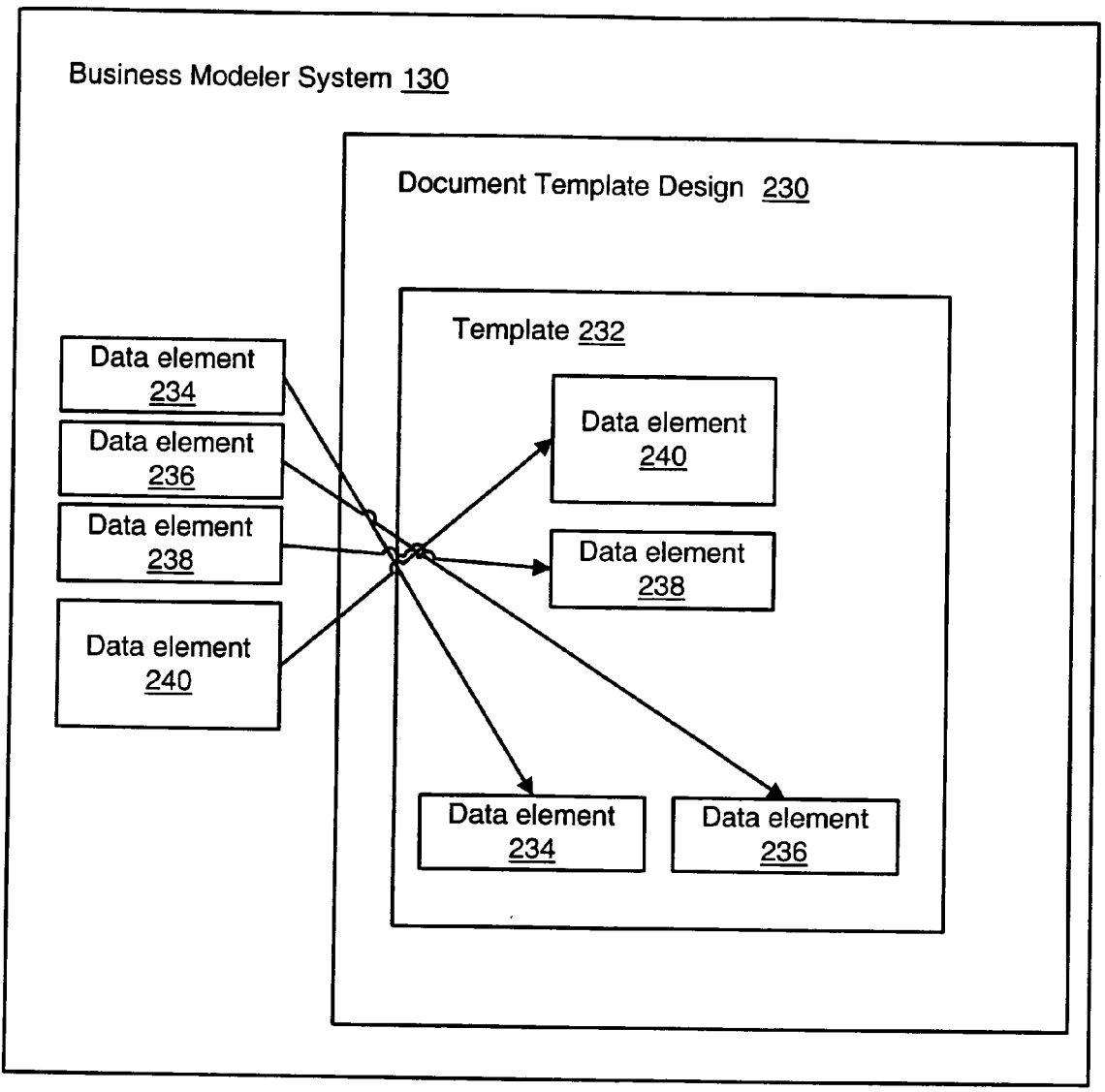
FIG. 7 illustrates an embodiment of a document template design process.

FIG. 7—One Embodiment of a Document Template Design Process

FIG. 7 shows one embodiment of a document template design process in a business modeler system 130. Business modeler system 130 may include a document template design subsystem 230. When a new document template object is created as a child of a business model object, a blank template 232 may be displayed for the document template. Data elements that are children of the business model object or that may be referenced by the business model object which is the parent of the document template are made available for adding to the blank template 232. In this example, data elements 234, 236, 238 and 240 are added as fields in template 232. The fields may include the name of the data element and a box for displaying or modifying the value of the data element. The positioning of the fields in template 232 may be how the fields will be displayed and printed in the production system. Properties of the data elements added to template 232 may determine some aspects of how the data element is displayed in the field, for example, the field width and the precision of the data element value. In one embodiment of a document template design subsystem, data elements may be selected from either the inheritance or business view and dragged and dropped onto a blank template. In one embodiment of a document template design subsystem, a position may be selected on a blank template and a data element may be selected from a list of available data elements and added to the blank template at the selected spot. Note that since a document template is an example of a business model object, the document template design subsystem may be viewed as a method for graphically defining a document template object.

Examples of document templates that may be designed with a document template design process as illustrated in FIG. 7 may include, but are not limited to: correspondence letters, product applications, and presentation templates used to display one or more incoming or outgoing data elements of external interface objects.

Figure 8A:
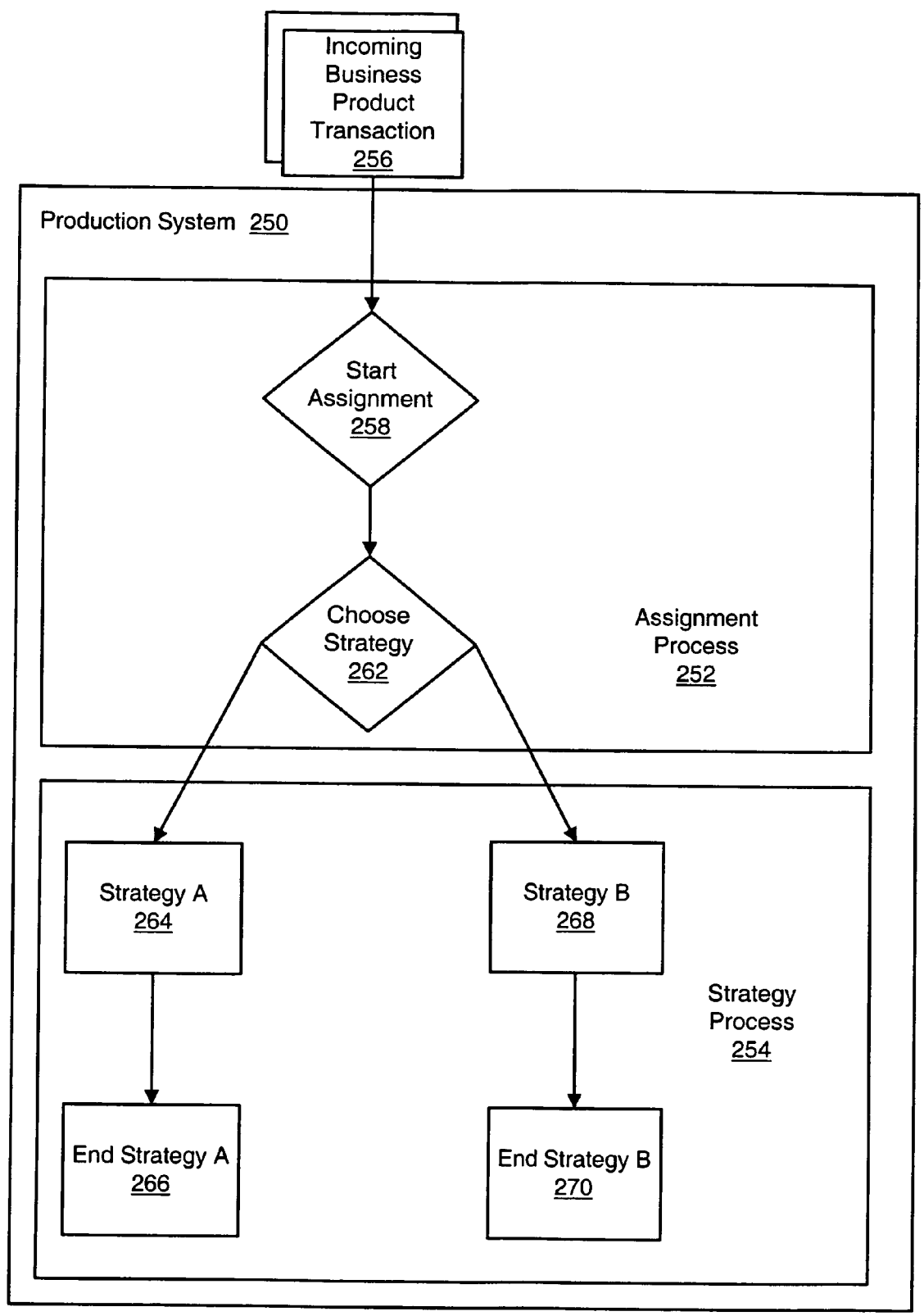
FIG. 8a illustrates high-level business product transaction processing in an embodiment of a production system.

FIG. 8a—High-Level Business Product Transaction Processing in an Embodiment of a Production System FIG. 8a illustrates at a high level how an FSO business product transaction 256 may be processed in a production system 250. Production system 250 may include an assignment process 252 and a strategy process 254. The purpose of assignment process 252 may be to choose an appropriate strategy for business product transaction 256. At step 258, assignment process 252 may gather as much information as possible about the customer associated with the business product transaction. At step 262, assignment process 252 may examine the customer information to determine which strategy is best suited for transaction 256. Once an appropriate strategy is chosen, business product transaction 256 is routed to the strategy. This example shows two possible strategies, strategy A 264 and strategy B 268. In this example, if assignment step 262 determines that strategy B 268 is the best strategy for transaction 256, transaction 256 is routed to strategy 268 for processing and final disposition. When strategy B 268 has completed processing transaction 256, transaction 256 may be passed to end strategy B 270 for cleanup. Cleanup operations may include, but are not limited to, archiving of documents, deletion of the electronic copies of the documents, and the freeing of any memory dynamically allocated during the processing of transaction 256.

Figure 8B:
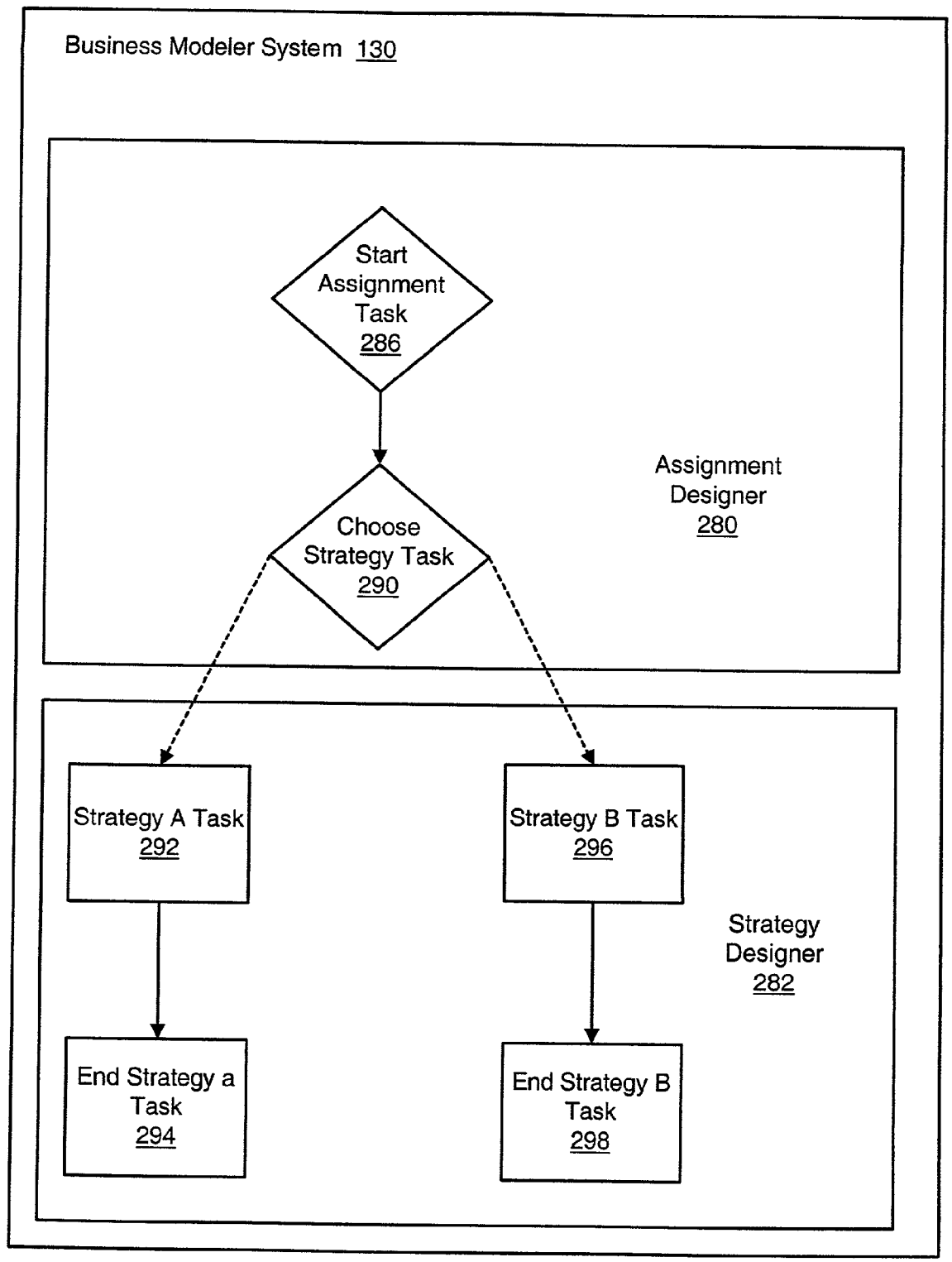
FIG. 8b illustrates how the high-level business product transaction processing may be modeled in an embodiment of a business modeler system.

FIG. 8b—Modeling High-Level Business Product Transaction Processing in an Embodiment of a Business Modeler System FIG. 8b illustrates how the high-level business product transaction processing may be modeled in an embodiment of a business modeler system 130. Business modeler system 130 may include an assignment designer subsystem 280 and a strategy designer subsystem 282. In the strategy subsystem, two strategy objects may be defined, one for strategy A and one for strategy B. A strategy A task 292 may be added to the strategy A object. The processing to be performed on a business product transaction in step 264 of the production system shown in FIG. 8a may be defined in strategy task A. An end strategy A task 294 may be added to the strategy A object to perform the cleanup operations of step 266 of the production system shown in FIG. 8a. The output of task 292 may be connected to an input node on task 294 signifying that a business product transaction is to passed from task 292 to task 294. Likewise, a strategy B task 296 and an end strategy B task 298 may be added to the strategy B object to model strategy B processing as shown in the production system of FIG. 8a.

In the assignment designer subsystem shown in FIG. 8b, a start assignment task 286 may be added to an assignment object. Task 286 may be defined to gather the customer information needed at step 258 of the production system shown in FIG. 8a. Thus, task 286 may reference one or more external interface objects to gather customer information from other computer systems and databases. The gathered information may be mapped to data elements included as fields on document templates associated with a business product transaction. A choose strategy task 290 may be added to the assignment object. Task 290 may be defined to choose among two or more strategies as required at step 262 of the production system shown in FIG. 8a. The output of task 286 may be connected to an input node on task 290 signifying that a business product transaction is to be passed from task 286 to task 290. Note that the output of a choose strategy task in the assignment designer subsystem may not be routed directly to a strategy object in the strategy designer subsystem. Strategy objects may be chosen from a list of available strategies and assigned as destinations for business product transactions on decision branches in a choose strategy task in the assignment designer subsystem.

Figure 9:
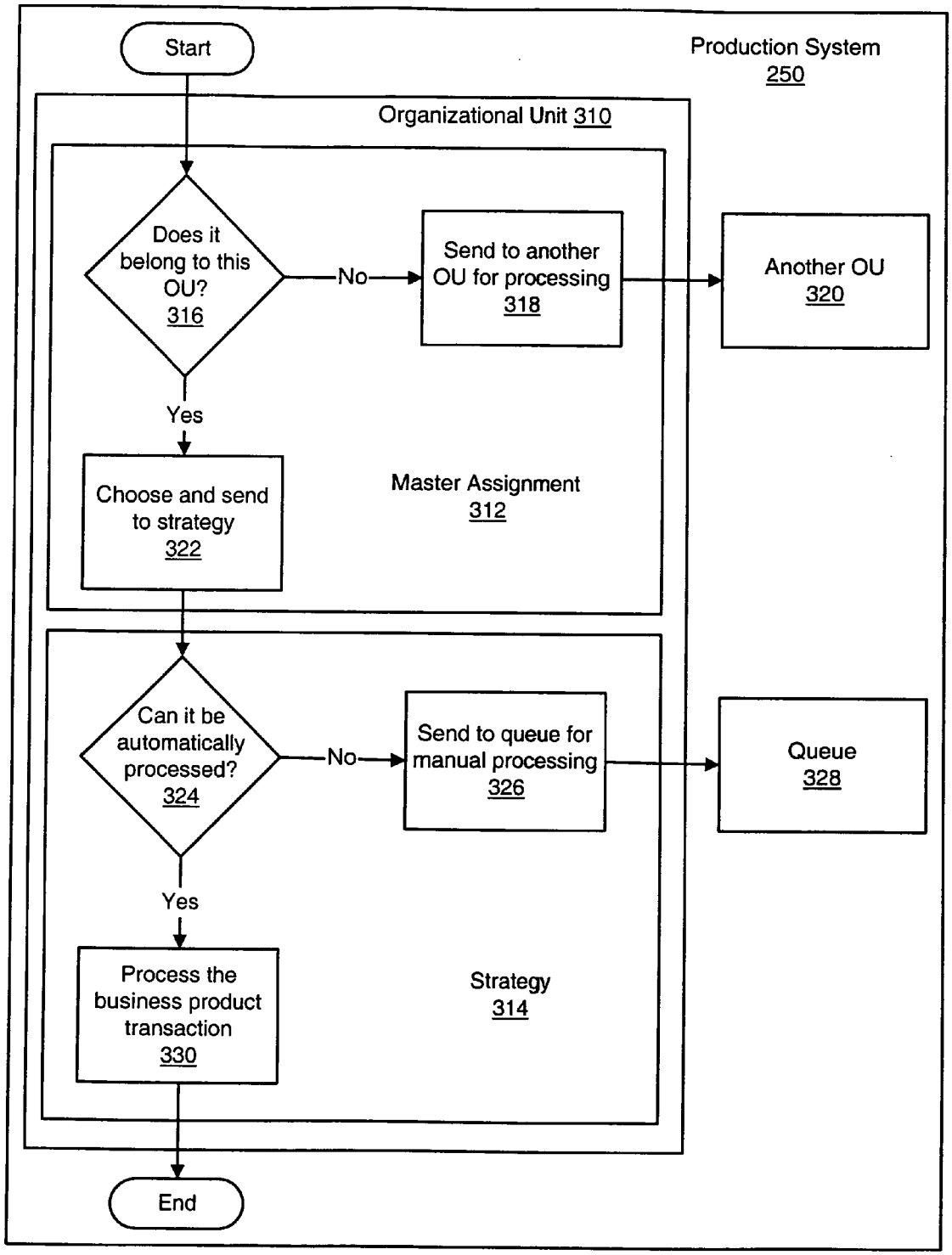
FIG. 9 illustrates a high-level assignment and strategy process in an embodiment of a production system.

FIG. 9—A High-Level Assignment and Strategy Process in an Embodiment of a Production System FIG. 9 illustrates an embodiment of a production system, showing how a business product transaction is processed in an organizational unit 310 in a production system 250 and the possible destinations of a business product transaction in the system. Organizational unit 310 may include a master assignment process 312 and a strategy process 314. At step 316 of the assignment process, the business product transaction may be examined to see if organizational unit 310 is responsible for processing this business product transaction. If organizational unit 310 is not responsible for the processing of the business product transaction, the business product transaction may be routed to another organizational unit 320 by step 318. If organizational unit 310 is responsible for processing the business product transaction, the business product transaction may be routed to step 322 for strategy selection. In step 322, the business product transaction is examined to determine which strategy available to organizational unit 310 is best suited for processing the business product transaction. The business product transaction may then be passed to strategy 314. At step 324 of strategy 314, the business product transaction is examined to see if it can be automatically processed. If the business product transaction cannot be automatically processed, it may be posted to queue 328 for manual processing by step 326. If step 324 determines the business product transaction can be automatically processed, the business product transaction may be routed to step 330 for automatic processing. Thus, in this embodiment of a production system, a business product transaction entering an organizational unit's assignment process must either end up in a strategy process or in another organizational unit's assignment process, and a business product transaction entering an organizational unit's strategy process must either end up being automatically processed in the strategy process or being posted to a queue for manual processing.

Figure 10:
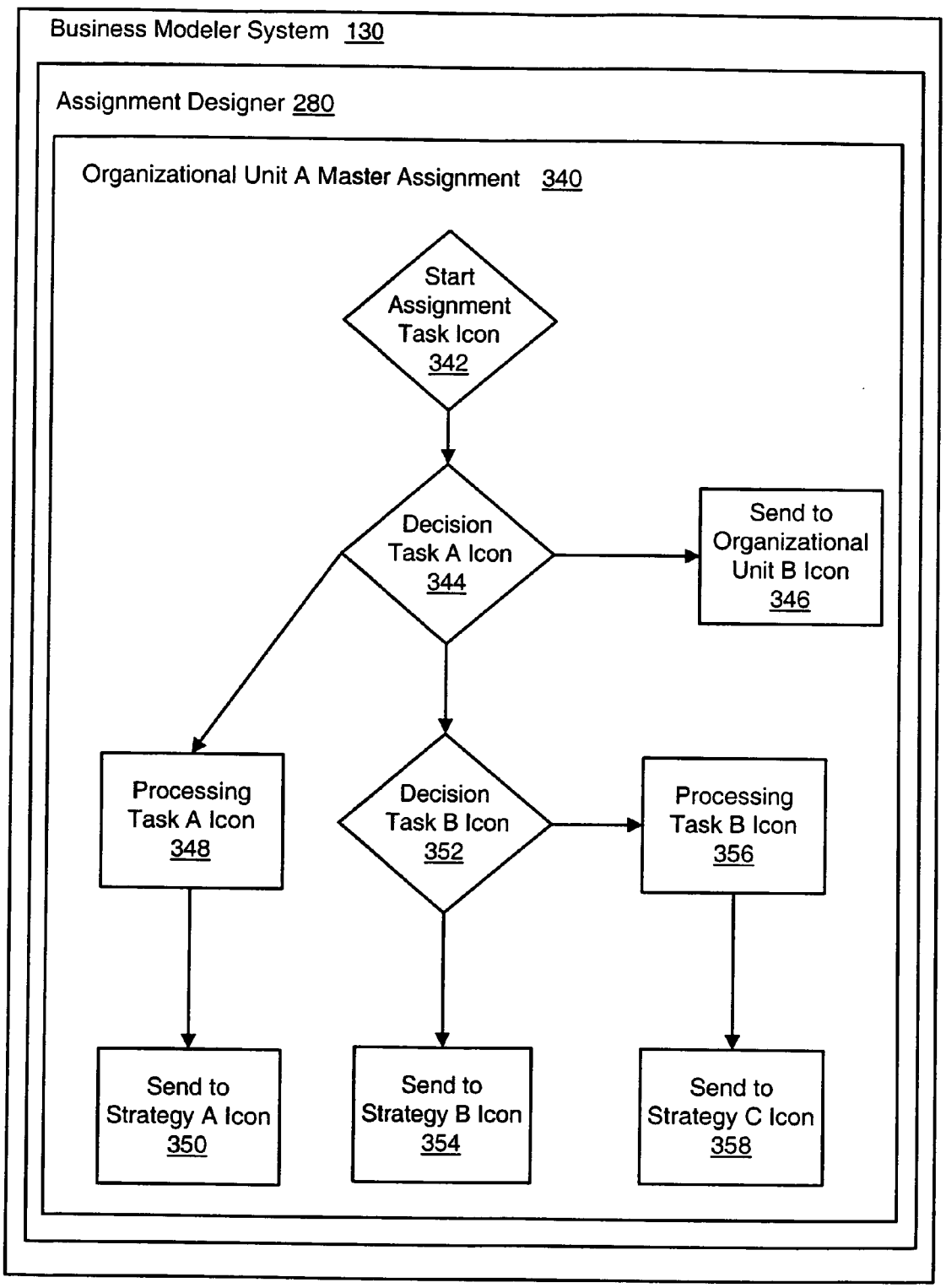
FIG. 10 illustrates an example master assignment model in an embodiment of a business modeler system.

FIG. 10—An Example Master Assignment Model in an Embodiment of a Business Modeler System FIG. 10 illustrates how an assignment process may be modeled in an embodiment of a business modeler system 130. Business modeler system 130 may include an assignment designer subsystem 280. A master assignment object may be defined as a child of organizational unit A. A master assignment design screen 340 may be opened for the master assignment object. In one embodiment, task objects may be selected from either the inheritance or business view and dragged and dropped onto master assignment design screen 340. In some embodiments, generic task objects may also be available in a generic task object list and may be added to master assignment design screen 340. Generic task objects may be predefined tasks not created or displayed in the inheritance or business views but that are available for use in assignments and strategies. In one embodiment, generic task objects are displayed as icons in a generic task window and may be dragged and dropped onto an assignment or strategy design screen. In one embodiment, generic task objects may be listed as menu choices in an add generic task menu available during assignment and strategy design. In one embodiment, a task object added to design screen 340 may appear as an icon on the design screen. The name of the task object may also be displayed. Once a task object is added to master assignment design screen 340, the task object's property sheet may be opened and properties of the task object may be resolved. An example of resolution of a task object property may be to specify the sources of data for filling in the values of data elements included in document templates.

In master assignment 340, the first task added may be start assignment task 342. Task 342 may be configured to gather data from internal (production system) and external (other system) sources. Decision task A 344 may be added to master assignment 340 and configured to evaluate one or more data elements in a business product transaction to determine the routing of the business product transaction. A send to organizational unit task 346 may be added to master assignment 340 and the property sheet of task 346 may be opened to specify what organizational unit to send a business product transaction to. In this example, the properties of task 346 are resolved to route a business product transaction to organizational unit B. An output node on task 344 is connected to an input node on task 346. On master assignment 340, the link between nodes may be signified by a line drawn between the output and input node.

Processing task A 348 and decision task B 352 may then be added to master assignment 340. Outputs from task 344 may be connected to inputs on task 348 and task 352. Send to strategy A task 350 may then be added to master assignment 340. The property sheet of task 350 may be resolved to route a business product transaction to a previously defined strategy A. Send to strategy task 354 and processing task B 356 may then be added to master assignment 340. Outputs from decision task 352 may then be connected to inputs on tasks 354 and 356. Send to strategy task 358 may be added to master assignment 340. An output from task 356 may be connected to an input on task 358. Finally, the property sheets of task 354 and 358 may be resolved to route a business product transaction to strategies B and C, respectively.

Note that the process described for FIG. 10 is used to define a master assignment object. Thus, the process may be viewed as a graphical method for defining a master assignment object. The tasks added to the master assignment object may be said to be referenced by the master assignment object.

Figure 11:
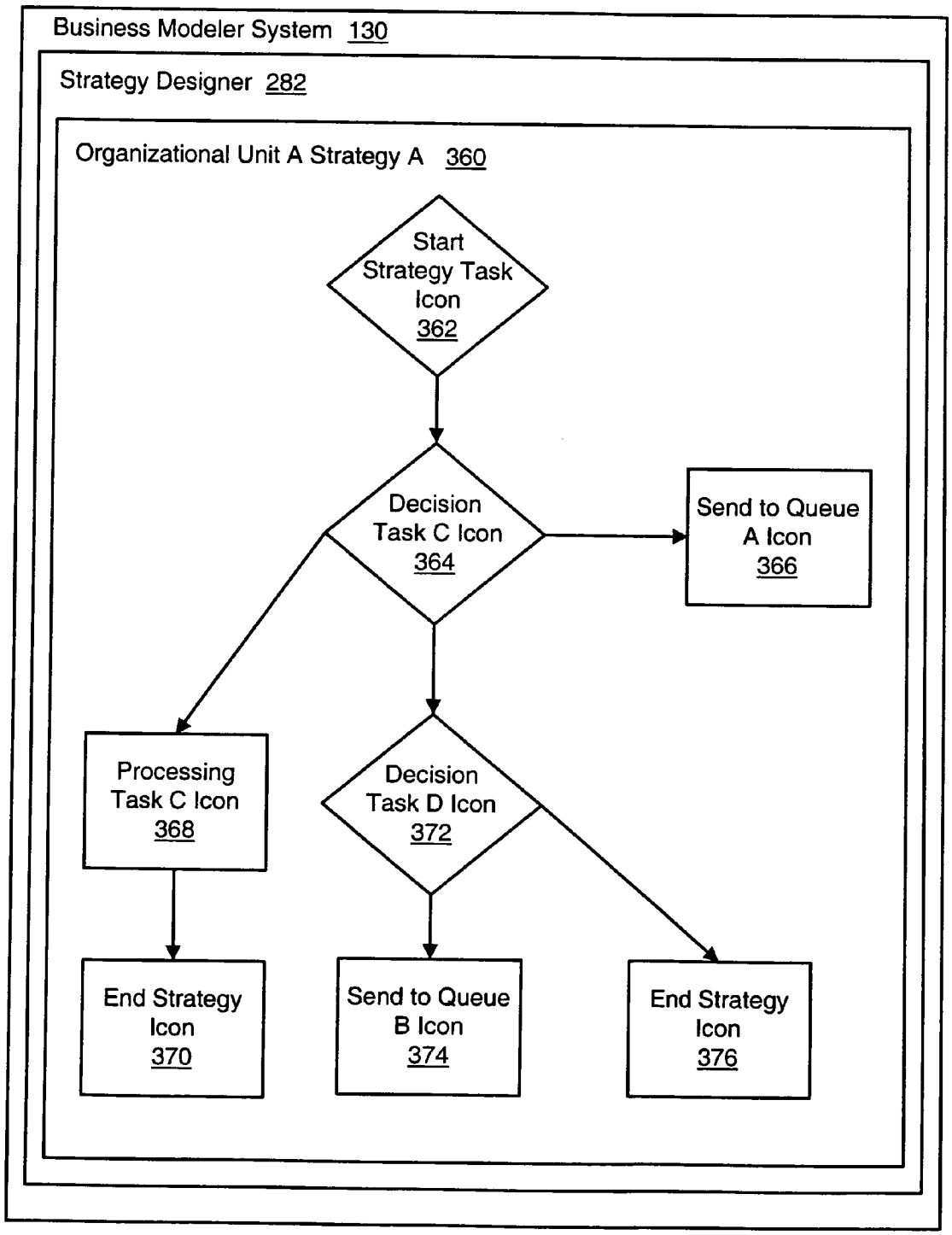
FIG. 11 illustrates an example strategy model in an embodiment of a business modeler system.

FIG. 11—An Example Strategy Model in an Embodiment of a Business Modeler System

FIG. 11 illustrates how a strategy process may be modeled in an embodiment of a business modeler system 130. Business modeler system 130 may include a strategy designer subsystem 282. A strategy object may be defined as a child of organizational unit A. A strategy design screen 360 may be opened for the strategy object. In one embodiment, task objects may be selected from either the inheritance or business view and dragged and dropped onto strategy design screen 360. In some embodiments, generic task objects may also be available in a generic task object list and may be added to strategy design screen 360.

In strategy 360, the first task added may be start strategy task 362. Task 362 may be configured to perform some initial processing on the data elements in a business product transaction. Decision task C 364 may be added to strategy 360 and configured to evaluate one or more data elements in a business product transaction to determine the routing of the business product transaction. A send to queue task 366 may be added to strategy 360 and the property sheet of task 366 may be opened to specify what queue to send a business product transaction to. In this example, the properties of task 366 are resolved to route a business product transaction to queue A. An output node on task 364 is connected to an input node on task 366.

Processing task C 368 and decision task D 372 may then be added to strategy 360. Outputs from task 364 may be connected to inputs on task 368 and task 372. End strategy 370 may then be added to strategy 360. An output from task 368 may be routed to an input on task 370. Send to queue task 374 and end strategy 376 may then be added to strategy 360. Outputs from task 372 may then be connected to inputs on tasks 374 and 376. The properties of task 374 may then be resolved to route a business product transaction to queue B.

Figure 12:
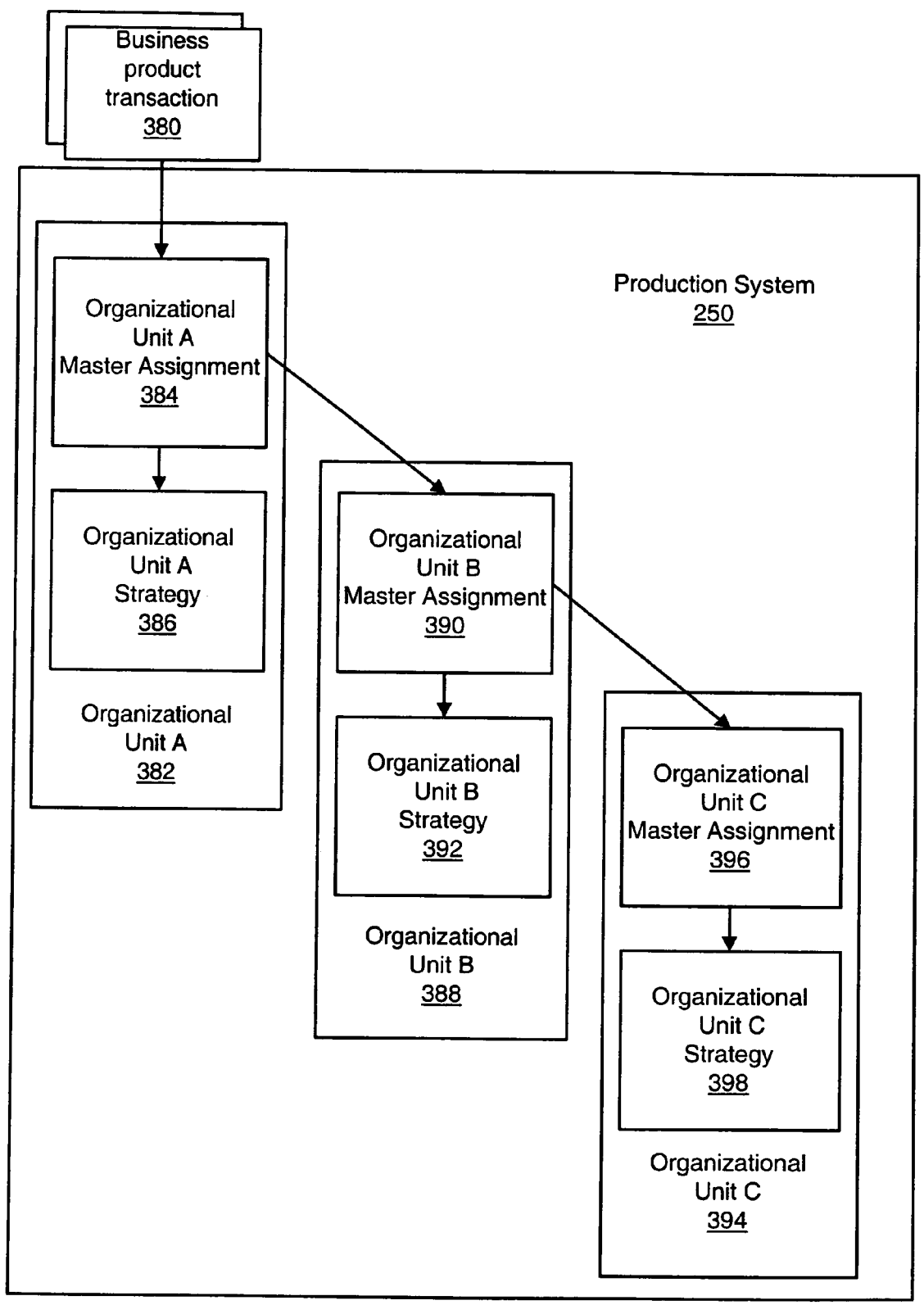
FIG. 12 illustrates the relationship among organizational units in customer processing in an embodiment of a production system.

FIG. 12—The Relationship Among Organizational Units in Customer Processing in an Embodiment of a Production System FIG. 12 shows a production system 250 in which several organizational units may be configured to process business product transactions for customers of an FSO. This illustration is used to show how linking master assignments in a business model system's assignment and strategy design subsystems may be used to model an FSO-wide business product transaction processing production system involving several organizational units. A customer's business product transaction 380 may enter the production system and may start at organizational unit A's master assignment 384. Master assignment 384 may examine business product transaction 380 to determine if organizational unit A 382 is responsible for handling transactions of this type. If organizational unit A 382 is responsible for processing transaction 380, master assignment 384 may pass transaction 380 to strategy 386 for processing. If organizational unit A 382 is not responsible for processing transaction 380, master assignment 384 may forward transaction 380 to organizational unit B 388. Organizational unit B's master assignment 390 may examine business product transaction 380 and determine that organizational B is not responsible for processing transaction 380. Master assignment 390 may forward transaction 380 to organizational unit C 394 for processing.

Figure 13:
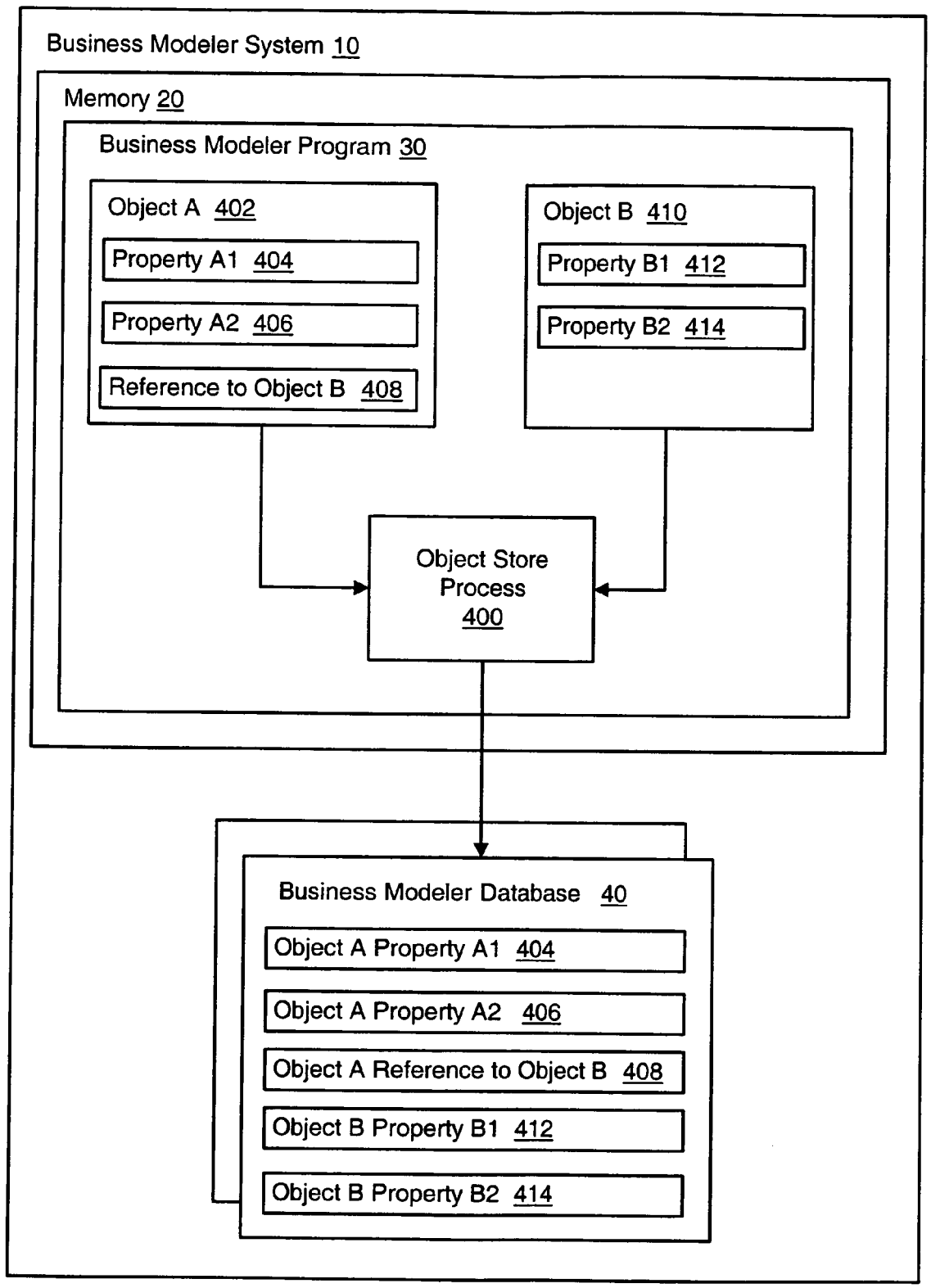
FIG. 13 illustrates an embodiment of a database store process for business modeler objects.

FIG. 13—An Embodiment of a Database Store Process for Business Modeler Objects

FIG. 13 shows an embodiment of a business modeler system similar to the one described in FIG. 1a. This embodiment includes an object store process 400 as part of business modeler program 30. Object store process 400 may take one or more business model objects currently residing in business modeler program 30's program memory and store the objects in business modeler database 40. Object store process 400 may decompose the objects into their component properties and store each property as a line or record in database 40. In this example, two objects are shown, object A 402 and object B 410. Object A 402 includes three properties. Property A1 404 and property A2 406 may be alphanumeric values such as object name, object type, numerical value, identification number, or any other property that describes object A 402. Reference to object B 408 is a special type of property. A reference property is an object property that describes the relationship an object in the business model has to another object in the business model. A reference property may describe a parent-child relationship between objects or it may describe a relationship where one object refers to another object that is not a child of the first object. In this example, reference property 408 refers to a child object B 410. Object B 410 includes two properties, property B1 412 and property B2 414. Another example of a property relationship is a send to organizational unit task which is resolved to send a business product transaction from one organizational unit's assignment map to a second organizational unit's assignment map. The first organizational unit's send to organizational unit task object may include a reference property specifying the assignment map object of the second organizational unit.

Object store process 400 is aware of the business model objects included in the business model currently loaded in business modeler program 30's memory. Object store process 400 may iterate through the objects, decompose each object into its component properties, and store the objects' properties as records in business model database 40. The object property records in business model database 40 may include enough information to reconstruct the business model and all of the business model objects included in the business model in a subsequent execution of business modeler program 30.

Figure 14:
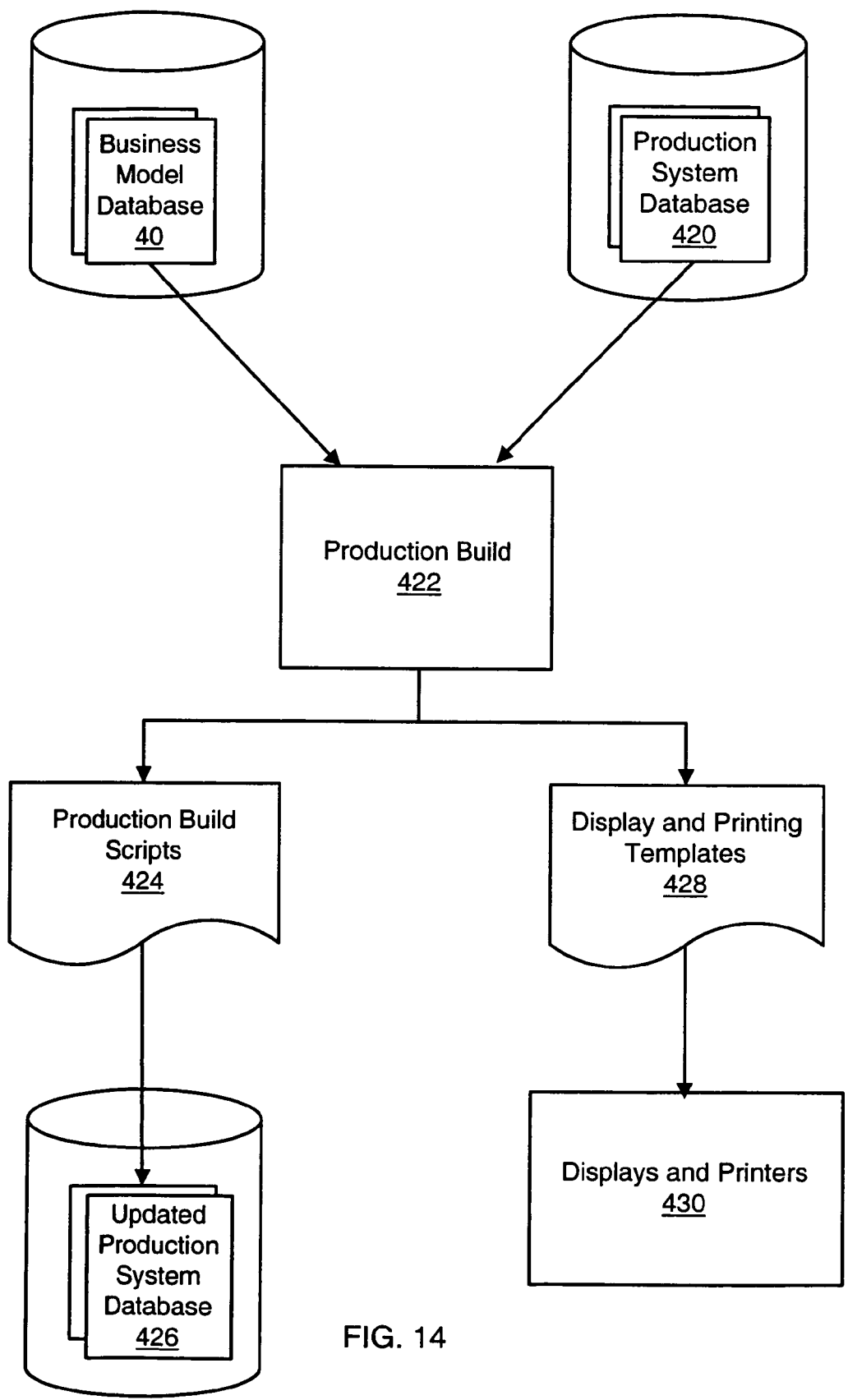
FIG. 14 illustrates an embodiment of a process for converting a business model defined in an embodiment of a business modeler into a production system database.

FIG. 14—An Embodiment of a Process for Converting a Business Model Defined in an Embodiment of a Business Modeler System into a Production System Database FIG. 14 illustrates one embodiment of a process for converting a business model defined in an embodiment of a business modeler system into a production system database. Business model database 40 may have been created or updated by a process such as that illustrated in FIG. 13. A production build program 422 may reside on the business modeler system or may reside on another system having access to the business modeler system. In one embodiment, production build 422 may be a subprogram or component of the business modeler system. In another embodiment, production build 422 may be a standalone program.

Production build 422 may include information describing the format of business model database 40 and production system database 420. In one embodiment, production build 422 may compare the business transaction processing business model described in business model database 40 with a previously implemented business transaction processing database stored in production system database 420. Production build 422 may search for differences between the new model and the previously implemented model. In one embodiment, production build 422 may create production build scripts 424 including instructions for updating production system database 420 to match the updated business model described in business model database 40. Script 424 may then be prepared for application to production system database 420 by a database administrator. Scripts 424 may then be executed to apply the updates to production system database 420. The execution of scripts 424 may be performed when the production system is offline and not accessing the database or scripts 424 may be executed when the production system is online. In another embodiment, production build 422 may directly update production system database 420, bypassing the creation of scripts 424. In yet another embodiment, a business model database 40 created in a business modeler system may be used directly as a production system database 420 without going through a production build process.

Production build 422 may also output display and printing templates 428 in response to the comparison between business model database 40 and production system database 420. Display and printing templates 428 may be used in a production system to display customer information including documents included in a business product transaction on client systems and to print documents on printers available to the production and client systems. Display and printing templates 428 may have a one-to-one correspondence to document template objects defined in the business modeler system.

Figure 15:
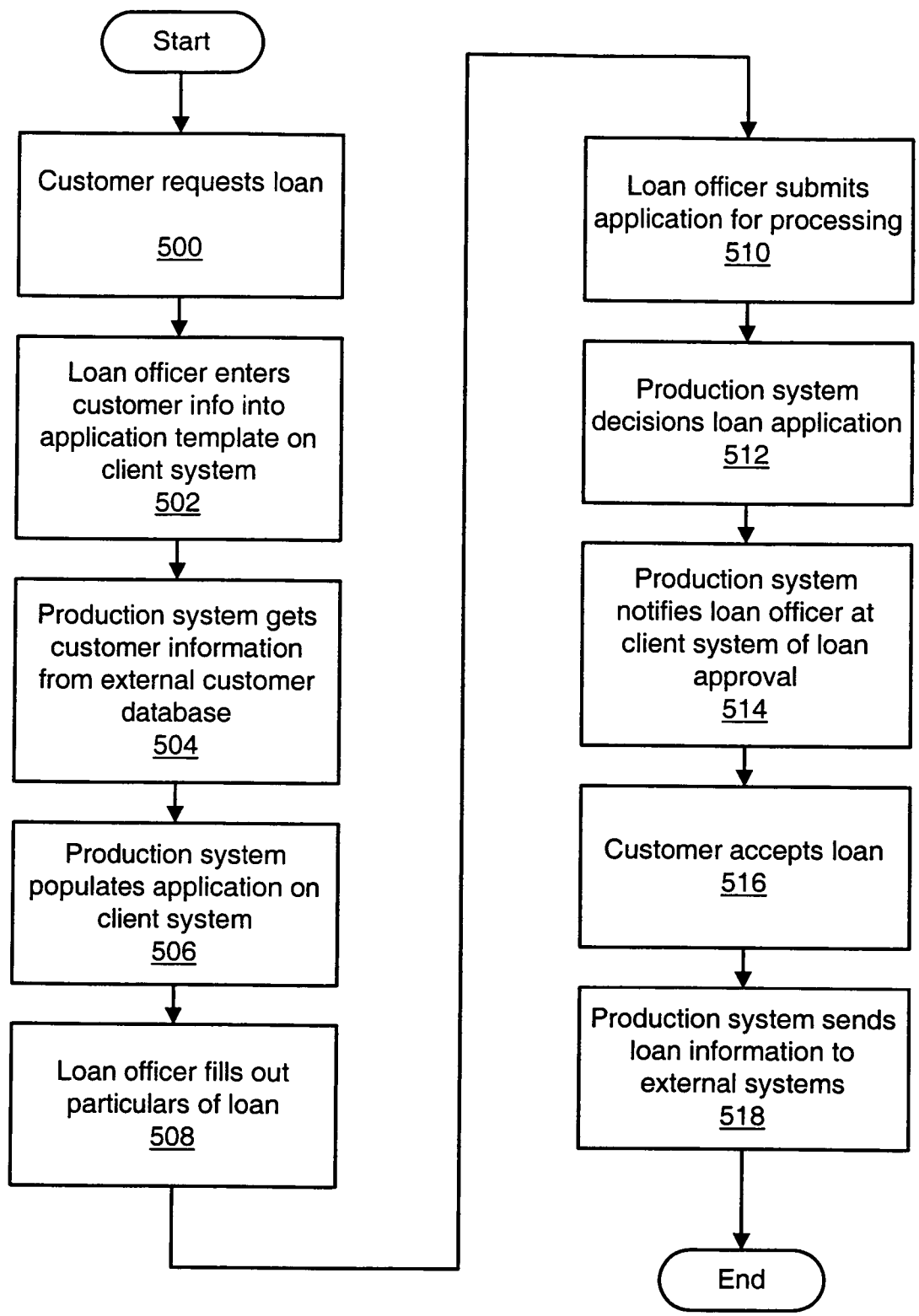
FIG. 15 is a flowchart describing an example of a business product transaction processing flow in an embodiment of a production system that was modeled in an embodiment of a business modeler system.

FIG. 15—A Flowchart Describing an Example of a Business Product Transaction Processing Flow in an Embodiment of a Production System that was Modeled in an Embodiment of a Business Modeler System FIG. 15 shows a flowchart of a business product transaction processing example in an embodiment of a production system that was modeled in an embodiment of a business modeler system. The example illustrates a typical example of a customer applying for and being approved for a loan. In step 500, the customer enters the FSO office and requests a loan. In step 502, a loan officer sitting at a client system in the production environment brings up a loan application template on the client system screen and enters basic customer information such as name and social security number, and submits the loan application to the production system. In step 504, the production system uses the customer information from the loan application to gather existing information on the customer. This may include sending a request to search for the customer in the FSO's customer database over an external interface. In step 506, the production system may populate the loan application with customer information received from external sources via external interfaces and present the populated loan application to the loan officer on the client system. In step 508, the loan officer may then fill out more information specific about this loan for this customer. In step 510, the loan officer submits the completed application to the production system for processing. The production system then may evaluate all the information gathered about the customer, score the customer's application for this loan, and decide that the loan is approved in step 512. In step 514, the production system sends a message to the client system to notify the loan officer that the loan is approved. The customer may then accept the terms of the loan and notify the loan officer, who may tell the production system the loan is accepted in step 516. In step 518, the production system may send the loan information to external FSO computer systems for loan issuance.

Figure 16:
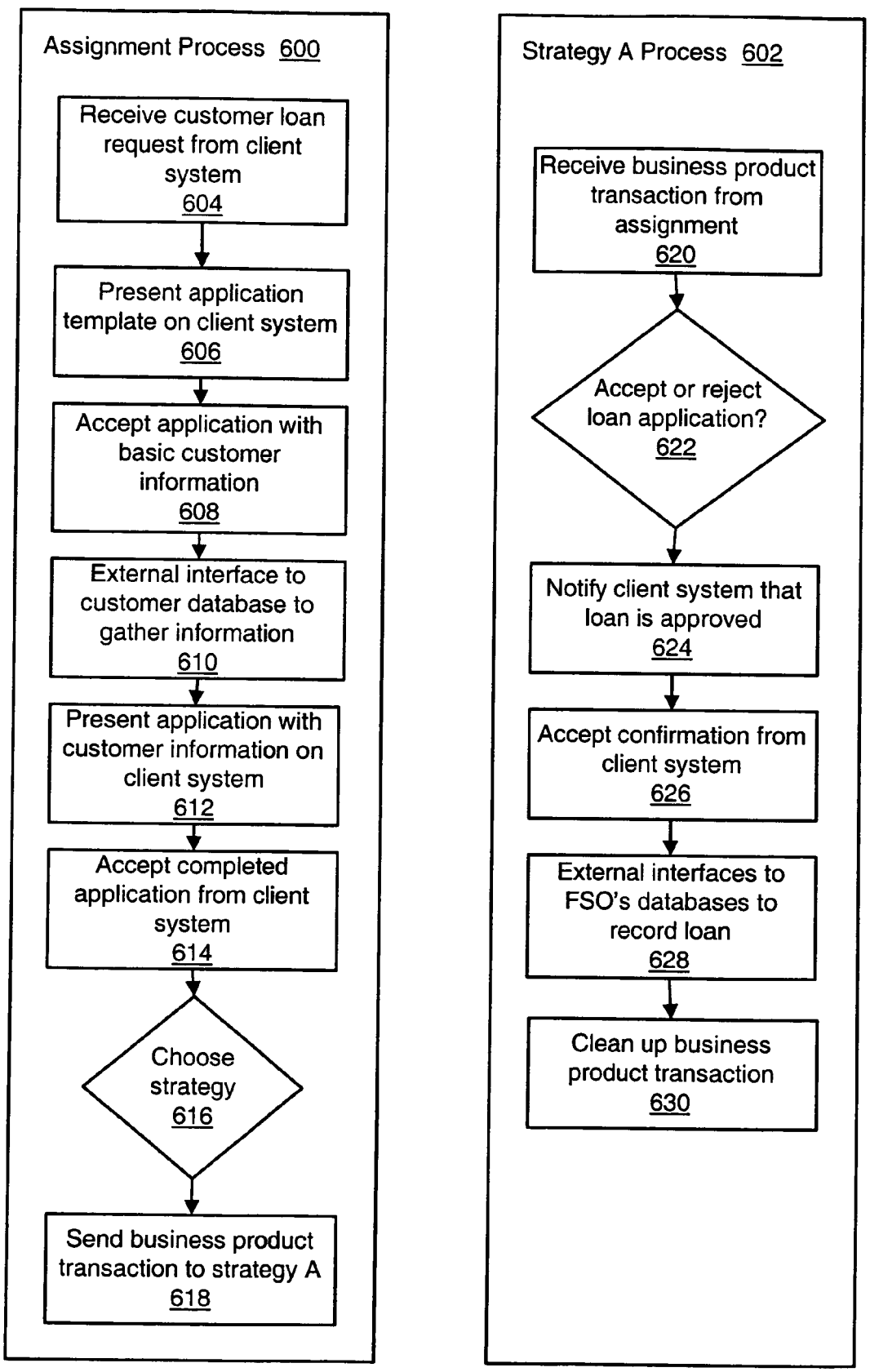
FIG. 16 illustrates how the example in FIG. 15 may be modeled in an assignment and strategy map in one embodiment of a business modeler system.

FIG. 16 Illustrates How the Example in the FIG. 15 May be Modeled in an Assignment and Strategy Map in One Embodiment of a Business Modeler System.

FIG. 16 illustrates how the example in FIG. 15 may be modeled in an assignment and strategy map in one embodiment of a business modeler system. Part of the loan application process illustrated in FIG. 15 is modeled as tasks in the assignment process 600. The rest is modeled as tasks in the strategy A process 602. This example shows the assignment process map and strategy process map as a series of simplified, sequential tasks and leaves out branches such as alternative strategies at step 616 and loan rejection at task 622.

Task 604 is configured as a starting task for assignment process 600. Assignment process 600 may be configured to process applications for a particular FSO product. Task 604 may be configured to accept an application for a product. In this example, task 604 is configured to accept a request for a loan application. Task 606 may be configured to send a loan application to a client system. Task 608 may be configured to accept a loan application with basic customer information filled in. Task 610 may be configured to invoke an external interface to the FSO's customer database to retrieve information on a customer and to map the retrieved customer information onto a loan application. Task 612 may be configured to send a partially completed loan application to a client system. Task 614 may be configured to accept a completed application from a client system. Task 616 is a decision task that may be configured to choose an appropriate strategy for a loan application based upon information on the loan application and any other customer information that is available. Task 618 may be one of several branches off task 616. Task 618 may be configured to send a loan application and all available information to a strategy, in this example strategy A 602.

Strategy process A 602 may start at task 620, which may be configured for receiving a loan application and associated customer information from an assignment process. Task 622 is a decision task, and may be configured to gather more information about a customer, perform calculations on data elements in a loan application, and score the loan application. Task 622 may then compare a score for a loan application against a loan accept/decline score constant to determine if the loan is approved. Task 624 may be one of several branches off task 622. Other branches may include a task to be invoked if a loan application is not approved. Task 624 may be configured to notify a client system that a loan application is approved. Task 626 may be configured to accept a loan acceptance confirmation message from a client system. Task 628 may be configured to invoke one or more external interfaces to FSO systems to inform the systems to implement and record a newly approved loan. Task 630 may be configured to clean up a production system by deleting any temporary files created in the production system during loan application processing.

Figure 17:
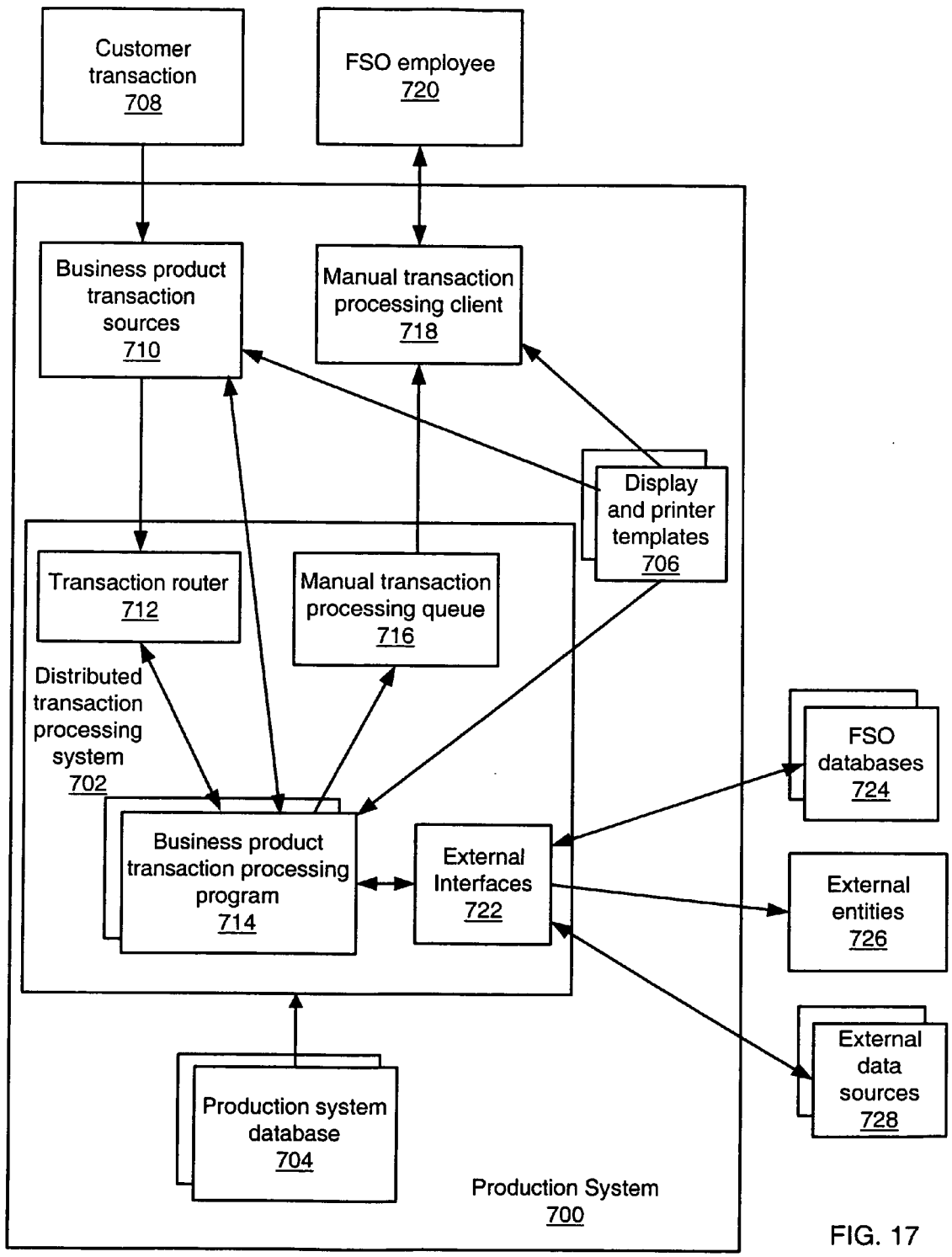
FIG. 17 is a block diagram of an embodiment of a production system illustrating the usage of a production system database.

FIG. 17—A Block Diagram of an Embodiment of a Production System Illustrating the Usage of a Production System Database FIG. 17 shows an embodiment of a production system 700 and is included to illustrate the usage of a production system database, display templates, and printer templates created by the process described in FIG. 14. This embodiment of a production system may be described as a client/server system configured to process business product transactions in a distributed, transaction-processing environment. A definition of a distributed, transaction-processing environment as used herein is a system including multiple computer systems acting as servers, wherein copies of a business product transaction processing program reside on one or more servers, and wherein a transaction router program configured to distribute transactions among the business product transaction processing programs resides on a server. A transaction may be executed by any of the business product transaction processing programs. The transaction router may choose a business product transaction processing program based upon available resources and workload. Users at client workstations may enter business product transactions into the system, and results of transaction processing may be reported to the users at the client workstations.

Referring to FIG. 17, production system 700 may include a distributed transaction processing system 702, one or more transaction sources 710, one or more manual transaction processing clients 718, a production system database 704, and display and printer templates 706. Distributed transaction processing system 702 may be configured to receive business product transactions from one or more sources or clients, perform business product transaction processing on the received transactions, and report the results of the transaction processing back to the clients. Distributed transaction processing system 702 may include a transaction router 712, one or more copies of a business product transaction processing program 714 residing on one or more servers, one or more manual transaction processing queues 716, and one or more external interfaces 722.

Business product transaction processing program 714 may include one or more implementations of processing tasks. Processing tasks perform operations on work packets. A work packet may be defined as a collection of documents associated with a particular customer's business product transaction. Examples of operations that may be performed on work packets include, but are not limited to, adding documents to a work packet, modifying data elements in the documents, performing calculations with data elements, making decisions based upon data elements, invoking external interfaces, sending work packets to queues, and sending work packets to other organizational units.

Figure 18A:
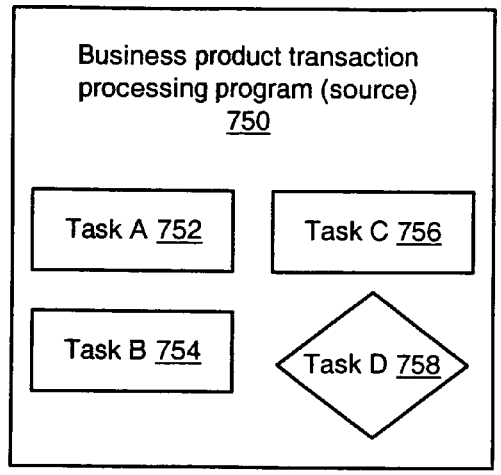
FIGS. 18a and 18b illustrate one embodiment of a data-driven business product transaction processing program.
Figure 18B:
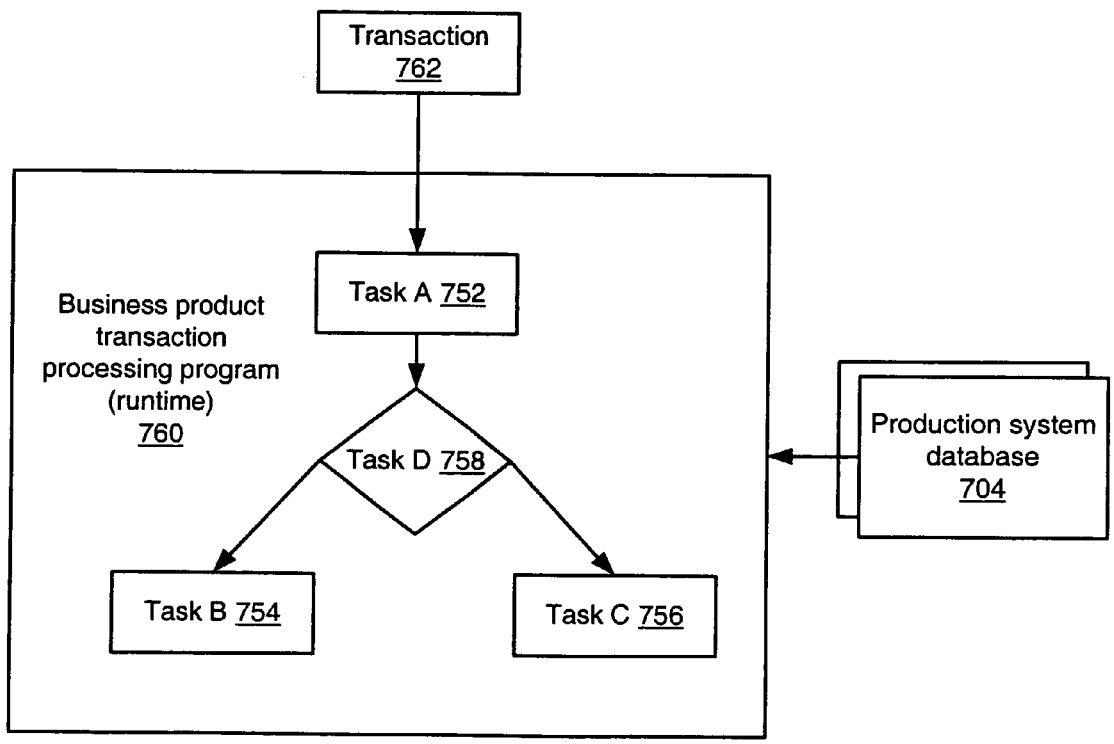

Production system 700 may be described as a data-driven system. The processing tasks included in business product transaction processing program 714 are preprogrammed into the system. However, the actual paths through the processing tasks that transactions may take while being processed by business product transaction processing program 714 are not preprogrammed. Instead, the paths through the processing tasks are dynamically defined by the contents of the production system database 704 at runtime. The formats and contents of documents, display screens, and printed output may also be defined in production system database 704 or in display and printer templates 706 and may be dynamically accessed by business product transaction processing program 714 at runtime. FIGS. 18a and 18b, described below, graphically illustrate a data-driven business product transaction processing program.

Referring to FIG. 17, a customer transaction 708 may enter production system 700 through one of several business product transaction sources. Examples of sources include, but are not limited to, an FSO employee entering data such as loan applications on a workstation, batches of transactions being fed automatically into the production system, and a customer directly initiating a transaction at a workstation or via the internet. Transaction router 712 acquires incoming business product transactions and distributes the processing of the business product transactions among the processing tasks included in the copies of the business product transaction processing program.

Transaction router 712 may begin the processing of a business product transaction by sending the business product transaction to a first processing task in business product transaction processing program 714. When the first processing task completes, it may notify transaction router 712 that it has finished. The first processing task may also notify transaction router 712 of the next processing task for the business product transaction. Transaction router 712 may then send the business product transaction to the next processing task. Processing tasks may send feedback on the processing of the business product transaction to a client workstation that was the business product transaction source 710. An FSO employee may enter additional information in response to the feedback. Processing tasks may request and receive data from one or more of the FSO's databases external to the production system through external interfaces 722. Processing tasks may also request and receive data from one or more sources external to the FSO through external interfaces 722. Examples of external data sources include, but are not limited to, credit bureaus and other FSOs. Processing tasks may also send correspondence documents to one or more external entities 726 through external interfaces 722. An example may be sending a letter to the customer associated with the business product transaction. Some processing tasks may be configured to delay the processing of the business product transaction for a length of time. An example may be delaying 30 days after sending a notice of delinquency before starting a next funds collections task.

The processing of the business product transaction continues until the transaction comes to a final resolution. If a business product transaction is successfully resolved automatically by the distributed transaction processing system 702, the results of the resolution may be reported back to the client workstation that was the business product transaction source 710. Documents associated with the business product transaction may be sent to FSO databases 724 through external interfaces 722. If a business product transaction cannot be successfully resolved automatically by the distributed transaction processing system 702, the transaction may be sent to a manual transaction processing queue 716 for manual processing by an FSO employee 720 working at manual transaction processing client workstation 718. Customer documents may be sent to an external entity if the business product transaction was not successfully resolved automatically. An example may be reporting a customer to an external collections agency for funds collection if the FSO's internal collections strategy did not succeed with the customer. After resolution of a transaction, FSO databases 724 may be updated with documents associated with the business product transaction through external interfaces 722.

FIGS. 18a and 18b—One Embodiment of a Data-Driven Business Product Transaction Processing Program FIGS. 18a and 18b illustrate one embodiment of a data-driven transaction processing program. FIG. 18a shows business product transaction processing program 750 including four tasks, task A 752, task B 754, task C 756, and decision task D 758. Tasks A through C are processing tasks and include one input for a business product transaction and one output for the business product transaction. Task D is a decision processing task and includes one input for a business product transaction and two or more outputs for the business product transaction. Tasks A through D may not be logically connected in the source code or compiled machine code of program 750. Program 750 may be defined as including a library of independent processing tasks.

Turning to FIG. 18b, at runtime business product transaction processing program 760 may access production system database 704 to determine transaction processing flow. When a transaction 762 enters program 760, a transaction type may be determined for the transaction by examining attributes of the transaction included in the transaction data. The transaction type may then be compared with records in database 704 to determine a first processing task for this transaction type. For example, a transaction may be an application for a credit card type X and may have been entered at branch office A. A first processing task for a credit card type X at branch office A may be the first task defined in the branch office's master assignment map for credit card type X.

In this example, task A 752 may be the first task. Processing task A 752 may access database 704 during execution of processing steps to read data values, data formats, or other data as required. When processing task A 752 completes its processing steps, it may access database 704 to determine the next processing task for this transaction type. In this example, decision task D 758 may be the next processing task. When decision task D completes, it may access database 704 to determine a next processing task, and may use transaction data along with the transaction type to choose among multiple possible next processing tasks for this transaction type. For example, a decision task may compare a customer's age to a customer age limit stored in database 704, send the transaction to task B 754 if the customer is under 30, or send the transaction to task C 756 if the customer is 30 or above.

FIG. 19—An Illustration of One Embodiment of a Flow Designer Window

FIG. 19 illustrates one embodiment of a flow designer window that may be displayed on a computer screen to provide an interface to an executing flow designer program as described in the flowcharts of FIG. 2b and FIG. 2c. In this embodiment, the flow designer window may include a palette 900, a task toolbar 902, and an edit toolbar 904. A palette, as used herein, is a blank portion of a computer display screen on which process maps may be created; for example, a process map may be created by placing icons which represent business objects such as task objects onto a palette, and joining the icons to build an assignment or strategy process flow. Task toolbar 902 may include one or more task icons representing the types of task objects available for this flow design process. In one embodiment, a different set of types of task object icons may be displayed in toolbar 902 for designing assignment maps than for designing strategy maps. Task object icons 908, 910, 912, and 914 represent examples of task object icons of different types that may appear in task toolbar 902.

Palette 900 may be used to display and edit assignment and strategy maps. Task object icons may be selected from task toolbar 902 and added to palette 900. A task object icon may be resolved by selecting the task object icon and opening the property sheet for the task object. Added task object icons may include one or more arrows or output links 916 for connecting one task object icon to another task object icon. The connection of task object icons in this manner defines the processing flow in assignment and strategy maps. In this illustration, one copy of each task object type 908, 910, 912, and 914 have been added and linked. Task object icon 908 illustrates a task object type with one output link, such as a calculation task object. Task object 910 illustrates a task object type with more than one output link, such as decision task objects. Task object 922 illustrates another task object type with one output link, but where the output link is not yet connected to another task object. Task objects 924 and 926 illustrate task object types with no output links, such as completion task objects. Task objects 924 and 926 are also used to illustrate that more than one object of a particular type may be added to a map.

In one embodiment, circular links among objects may not be allowed. For example, in FIG. 19, task object 922 may not be linked to task object 918. In one embodiment, task objects may linked to only one output link from another task object. For example, in FIG. 19, the output link of task object 922 may not be connected to task object 924, since an output link from task object 920 is already connected to task object 924.

Edit toolbar 904 may include one or more edit tool icons 906. Different edit tools may be selected to perform editing tasks on the map currently displayed in template 900. Examples of edit tools include, but are not limited to: a delete tool for deleting one or more selected task objects on a map, a clear links tool to remove the links from one or more selected task objects on a map, grid and alignment tools for aligning task objects on a map, and a validate tool for validating the map. Validating a map may include verifying that all output links are attached to a task object, that all task objects are linked to at least one other task object, and that the properties of all task objects have been resolved.

Various embodiments further include receiving or storing instructions and/or data implemented in accordance with the foregoing description upon a carrier medium. Suitable carrier media include memory media or storage media such as magnetic or optical media, e.g., disk or CD-ROM, as well as signals such as electrical, electromagnetic, or digital signals, conveyed via a communication medium such as networks and/or a wireless link.

Although the system and method of the present invention have been described in connection with several embodiments, the invention is not intended to be limited to the specific forms set forth herein, but on the contrary, it is intended to cover such alternatives, modifications, and equivalents as can be reasonably included within the spirit and scope of the invention as defined by the appended claims.

What is claimed is:

1. A method for defining a process map for processing a financial service organization business product transaction, the method comprising:
  displaying a plurality of task objects on a computer display screen;
  displaying a process map design palette on the computer display screen;
  selecting a first task object from the displayed plurality of task objects;

adding the first task object to the process map design palette; and storing the process map in a business model database;

wherein the process map stored in the business model database is configured for translation into a financial service organization production system database, wherein the financial service organization production system database is configured for use in the financial service organization production system, and wherein the financial service organization production system is configured to process business product transactions between a financial service organization and a financial service organization customer.

2. The method of claim 1, wherein selecting the first task object comprises moving a cursor over the first task object.

3. The method of claim 2, wherein adding the first task object to the process map design palette comprises moving the selected first task object onto the process map design palette.

4. The method of claim 1, further comprising:
selecting a second task object from the displayed plurality of task objects; and
adding the second task object to the process map design palette.

5. The method of claim 4, wherein the method further comprises defining a processing path between the first task object and the second task object, wherein the processing path describes a path for business product transactions to be passed from the first processing task to the second processing task in the financial service organization production system.

6. The method of claim 5, wherein the first task object comprises one or more output links, and wherein defining the processing path between the first task object and the second task object comprises connecting a first output link of the first task object to the second task object.

7. The method of claim 6, further comprising:
selecting a third task object from the displayed plurality of task objects;
adding the third task object to the process map design palette; and
defining a processing path between the first task object and the third task object;
wherein defining the processing path between the first task object and the third task object comprises disconnecting the first output link of the first task object from the second task object and connecting the first output link of the first task object to the third task object.

8. The method of claim 5, further comprising:
selecting a third task object from the displayed plurality of task objects;
adding the third task object to the process map design palette; and
defining a processing path between the first task object and the third task object;
wherein the first task object is a decision task object configured to pass a business product transaction to one of the first and second tasks objects as a function of data relating to the financial service organization customer associated with the business product transaction.

9. The method of claim 1, wherein the first task is an invoke external interface task.

10. A system for processing FSO transactions, the system comprising:
a computer program;
a computer system;
wherein the computer program is executable on the computer system to execute the method of:
displaying a plurality of task objects on a computer display screen;
displaying a process map design palette on the computer display screen;
selecting a first task object from the displayed plurality of task objects;
adding the first task object to the process map design palette; and
storing the process map in a business model database;
wherein the process map stored in the business model database is configured for translation into a financial service organization production system database, wherein the financial service organization production system database is configured for use in the financial service organization production system, and wherein the financial service organization production system is configured to process business product transactions between a financial service organization and a financial service organization customer.

11. The system of claim 10, wherein selecting the first task object comprises moving a cursor over the first task object.

12. The system of claim 11, wherein adding the first task object to the process map design palette comprises moving the selected first task object onto the process map design palette.

13. The system of claim 10, further comprising:
selecting a second task object from the displayed plurality of task objects; and
adding the second task object to the process map design palette.

14. The system of claim 13, wherein the method further comprises defining a processing path between the first task object and the second task object, wherein the processing path describes a path for business product transactions to be passed from the first processing task to the second processing task in the financial service organization production system.

15. The system of claim 14, wherein the first task object comprises one or more output links, and wherein defining the processing path between the first task object and the second task object comprises connecting a first output link of the first task object to the second task object.

16. The system of claim 15, further comprising:
selecting a third task object from the displayed plurality of task objects;
adding the third task object to the process map design palette; and
defining a processing path between the first task object and the third task object;
wherein defining the processing path between the first task object and the third task object comprises disconnecting the first output link of the first task object from the second task object and connecting the first output link of the first task object to the third task object.

17. The system of claim 14, further comprising:
selecting a third task object from the displayed plurality of task objects;
adding the third task object to the process map design palette; and
defining a processing path between the first task object and the third task object;
wherein the first task object is a decision task object configured to pass a business product transaction to one of the first and second tasks objects as a function of data relating to the financial service organization customer associated with the business product transaction.

18. The system of claim 10, wherein the first task is an invoke external interface task.

19. The system of claim 10, wherein the computer system comprises a display device coupled to the computer system to display data.

20. The system of claim 19, wherein the display device is a display screen.

21. The system of claim 10, wherein the computer system comprises a user input device coupled to the computer system to enter data.

22. The system of claim 21, wherein the user input device is a mouse or a keyboard.

23. A carrier medium comprising program instructions, wherein the program instructions are executable by a computer system to implement the method of:
    displaying a plurality of task objects on a computer display screen;
    displaying a process map design palette on the computer display screen;
    selecting a first task object from the displayed plurality of task objects;
    adding the first task object to the process map design palette; and
    storing the process map in a business model database;
    wherein the process map stored in the business model database is configured for translation into a financial service organization production system database, wherein the financial service organization production system database is configured for use in the financial service organization production system, and wherein the financial service organization production system is configured to process business product transactions between a financial service organization and a financial service organization customer.

24. The carrier medium of claim 23, wherein selecting the first task object comprises moving a cursor over the first task object.

25. The carrier medium of claim 24, wherein adding the first task object to the process map design palette comprises moving the selected first task object onto the process map design palette.

26. The carrier medium of claim 23, further comprising:
    selecting a second task object from the displayed plurality of task objects; and
    adding the second task object to the process map design palette.

27. The carrier medium of claim 26, wherein the method further comprises defining a processing path between the first task object and the second task object, wherein the processing path describes a path for business product transactions to be passed from the first processing task to the second processing task in the financial service organization production system.

28. The carrier medium of claim 27, wherein the first task object comprises one or more output links, and wherein defining the processing path between the first task object and the second task object comprises connecting a first output link of the first task object to the second task object.

29. The carrier medium of claim 28, further comprising:
    selecting a third task object from the displayed plurality of task objects;
    adding the third task object to the process map design palette; and
    defining a processing path between the first task object and the third task object;
    wherein defining the processing path between the first task object and the third task object comprises disconnecting the first output link of the first task object from the second task object and connecting the first output link of the first task object to the third task object.

30. The carrier medium of claim 27, further comprising:
    selecting a third task object from the displayed plurality of task objects;
    adding the third task object to the process map design palette; and
    defining a processing path between the first task object and the third task object;
    wherein the first task object is a decision task object configured to pass a business product transaction to one of the first and second tasks objects as a function of data relating to the financial service organization customer associated with the business product transaction.

31. The carrier medium of claim 23, wherein the first task is an invoke external interface task.

32. The carrier medium of claim 23, wherein the carrier medium is a memory medium.

* * * * *